Dec. 25, 1962  S. J. GARTNER  3,069,749
ASSEMBLING APPARATUS AND METHODS
Filed Jan. 29, 1954  43 Sheets-Sheet 1

INVENTOR
STANLEY J. GARTNER
BY
ATTORNEY

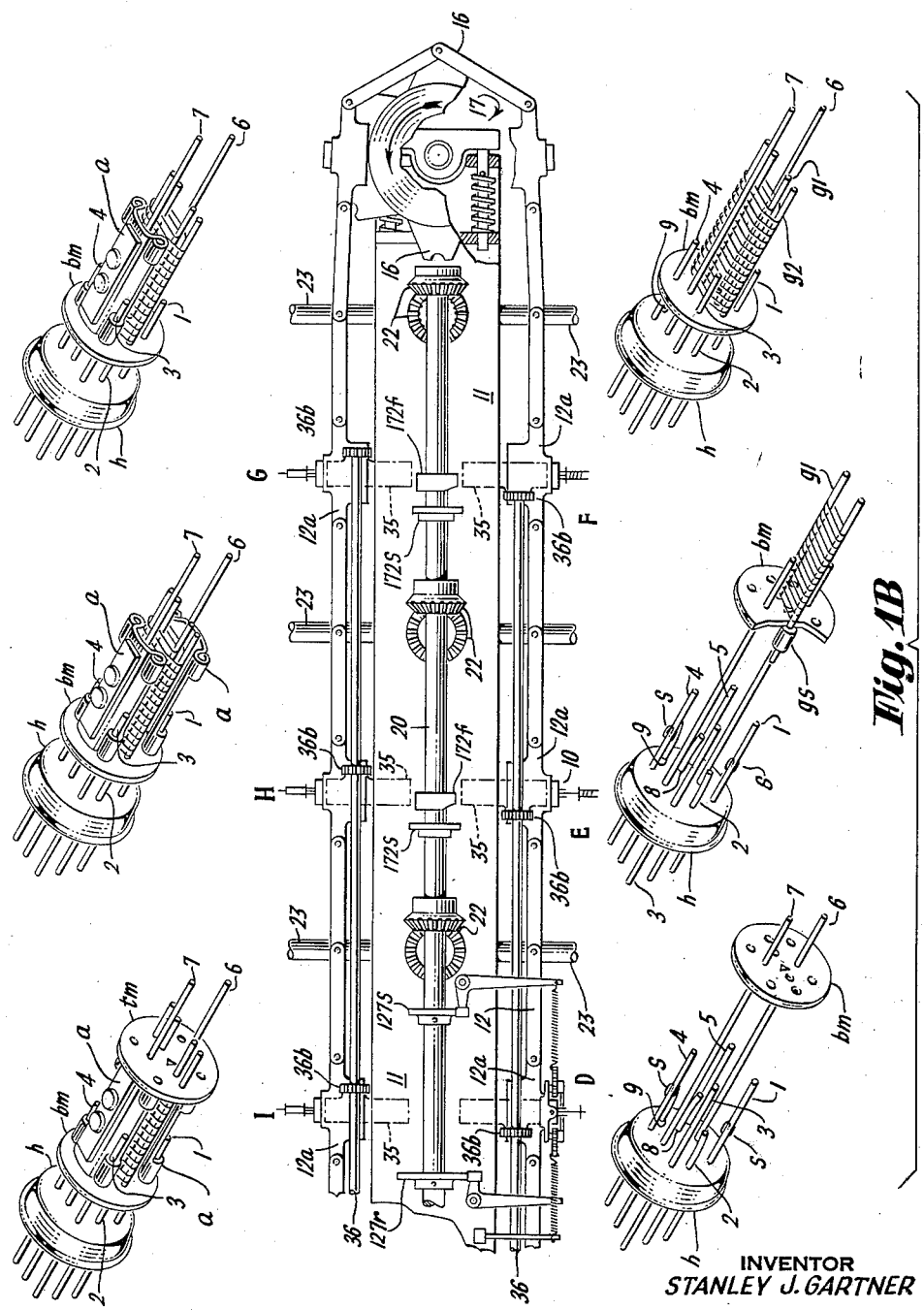

Dec. 25, 1962  S. J. GARTNER  3,069,749
ASSEMBLING APPARATUS AND METHODS
Filed Jan. 29, 1954  43 Sheets-Sheet 3
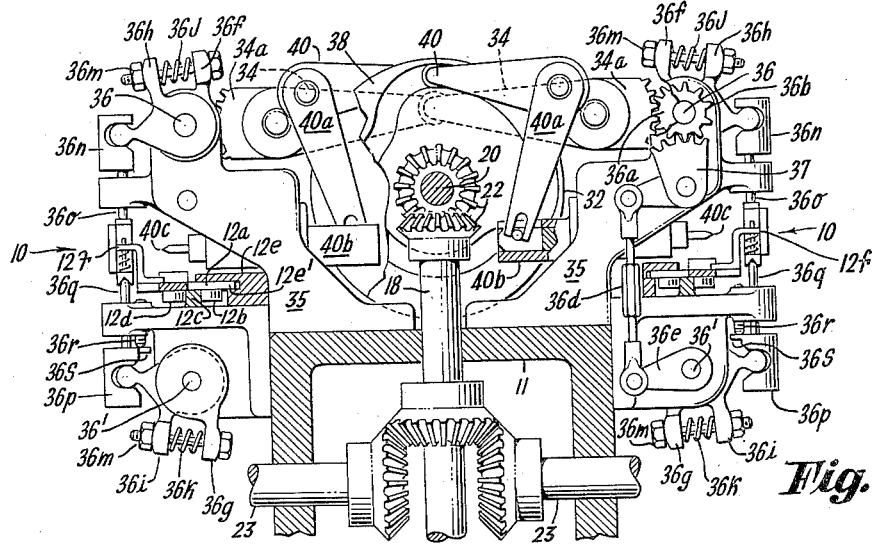
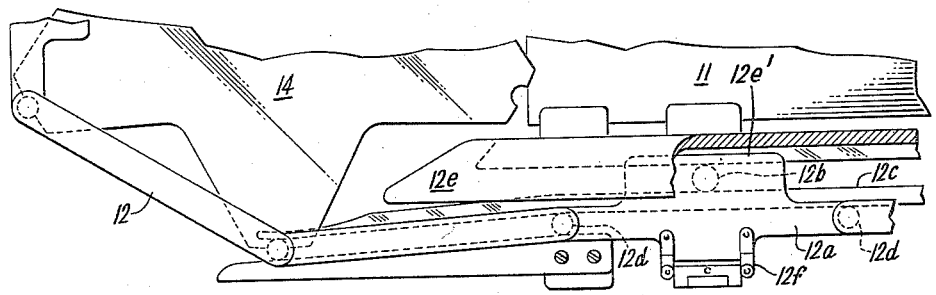
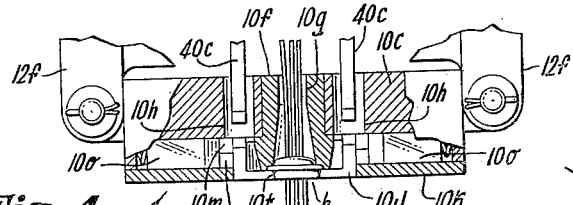
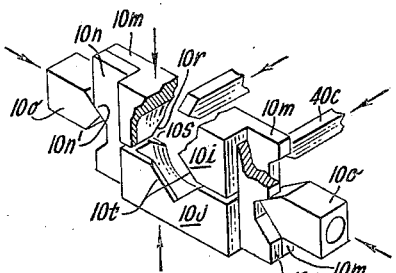
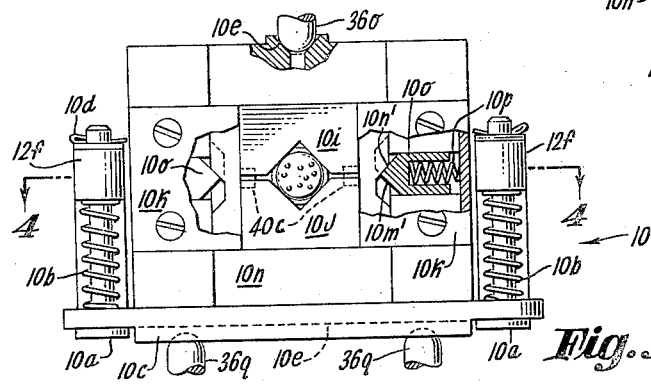
INVENTOR
STANLEY J. GARTNER
BY
ATTORNEY Dec. 25, 1962  S. J. GARTNER  3,069,749
ASSEMBLING APPARATUS AND METHODS
Filed Jan. 29, 1954  43 Sheets-Sheet 4

INVENTOR
STANLEY J. GARTNER
BY
ATTORNEY

Dec. 25, 1962  S. J. GARTNER  3,069,749
ASSEMBLING APPARATUS AND METHODS
Filed Jan. 29, 1954  43 Sheets-Sheet 5
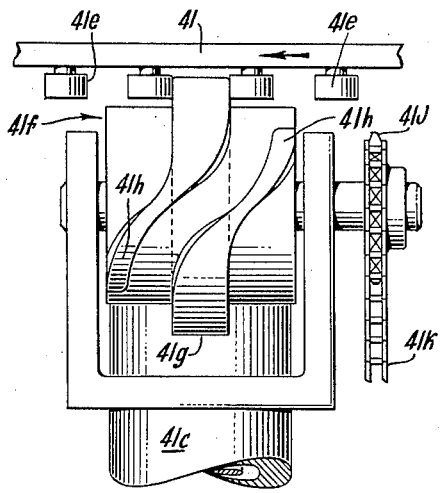
Fig. 7
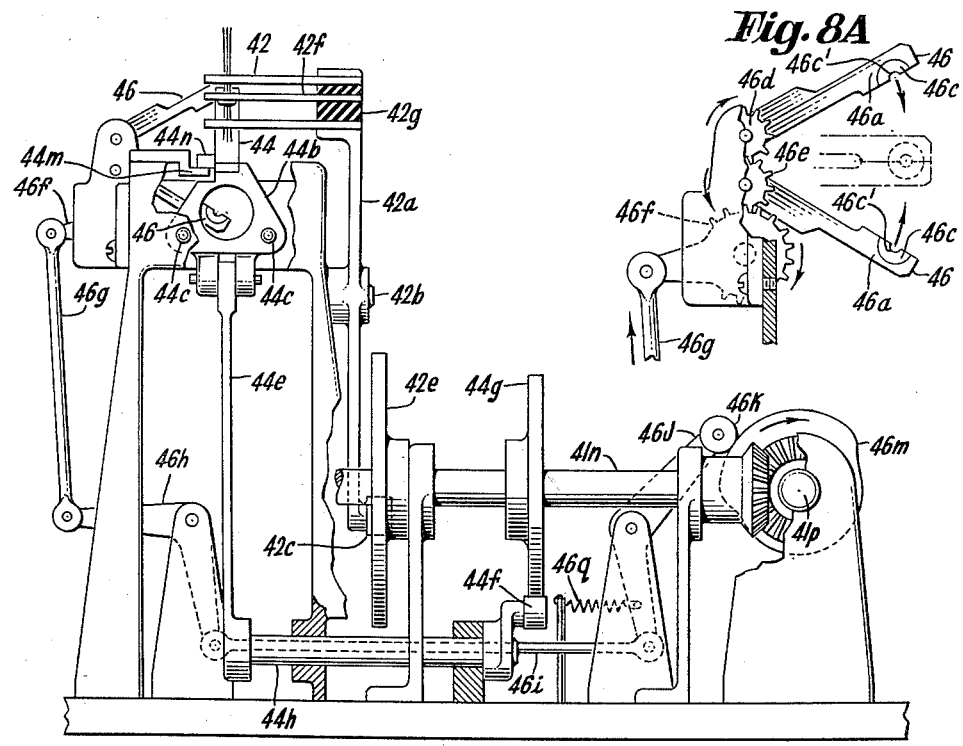
Fig. 8A
Fig. 8
INVENTOR
STANLEY J. GARTNER
BY
ATTORNEY Dec. 25, 1962 S. J. GARTNER 3,069,749
ASSEMBLING APPARATUS AND METHODS
Filed Jan. 29, 1954 43 Sheets-Sheet 6
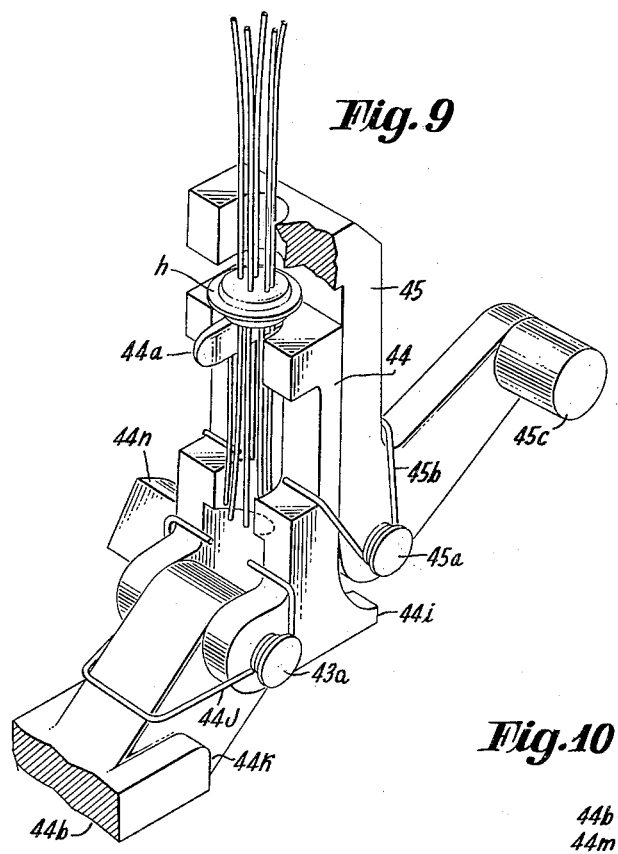
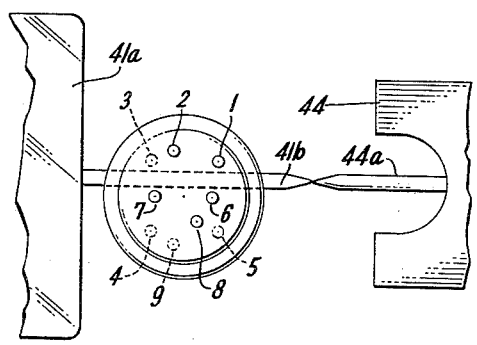
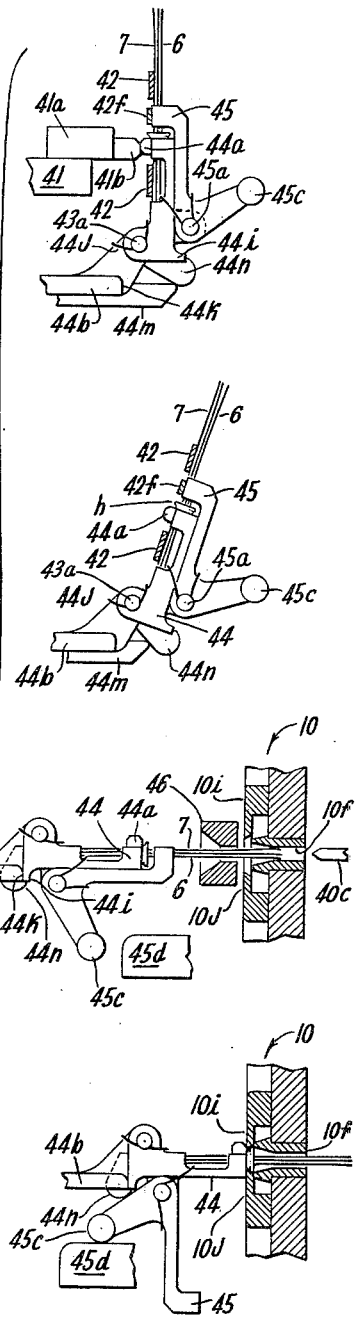
INVENTOR
STANLEY J. GARTNER
BY
*Paul S. Martin*
ATTORNEY Dec. 25, 1962 S. J. GARTNER 3,069,749
ASSEMBLING APPARATUS AND METHODS
Filed Jan. 29, 1954 43 Sheets-Sheet 7

INVENTOR
STANLEY J. GARTNER
BY
Paul S. Martin
ATTORNEY

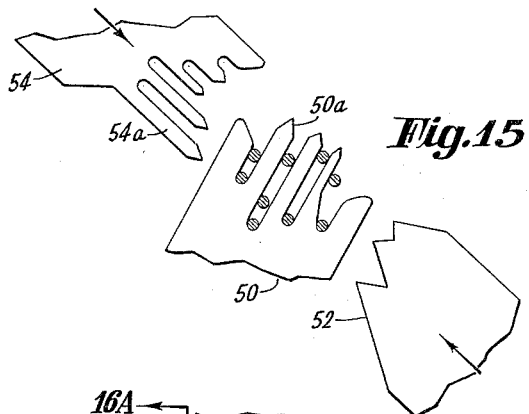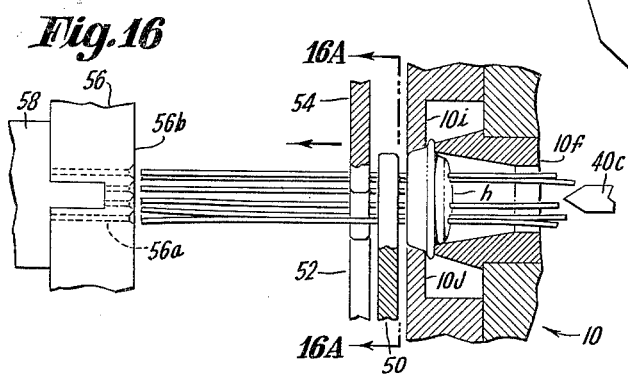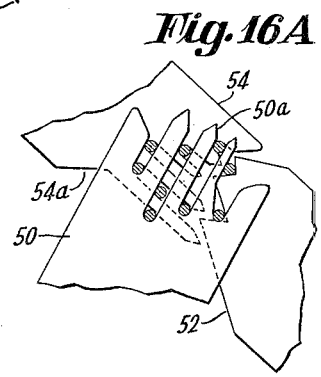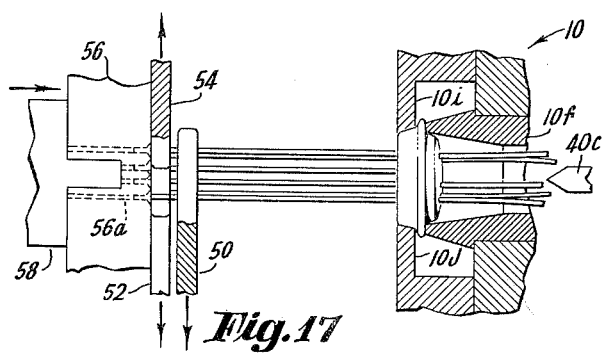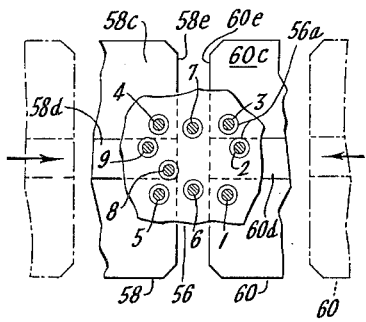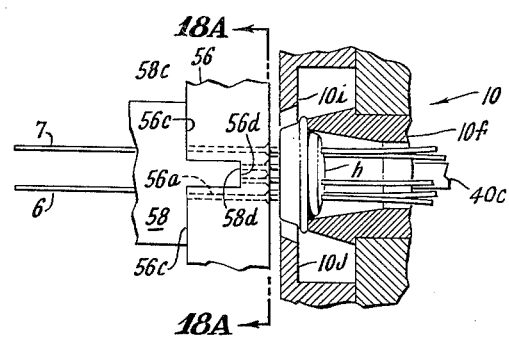

Dec. 25, 1962  S. J. GARTNER  3,069,749
ASSEMBLING APPARATUS AND METHODS
Filed Jan. 29, 1954  43 Sheets-Sheet 10
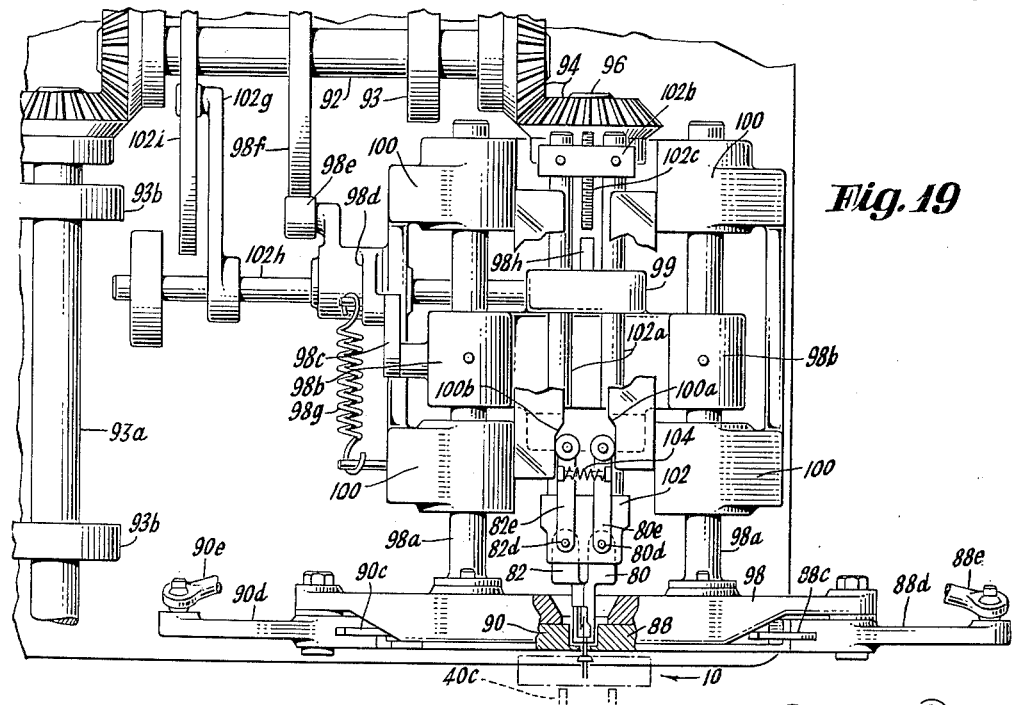
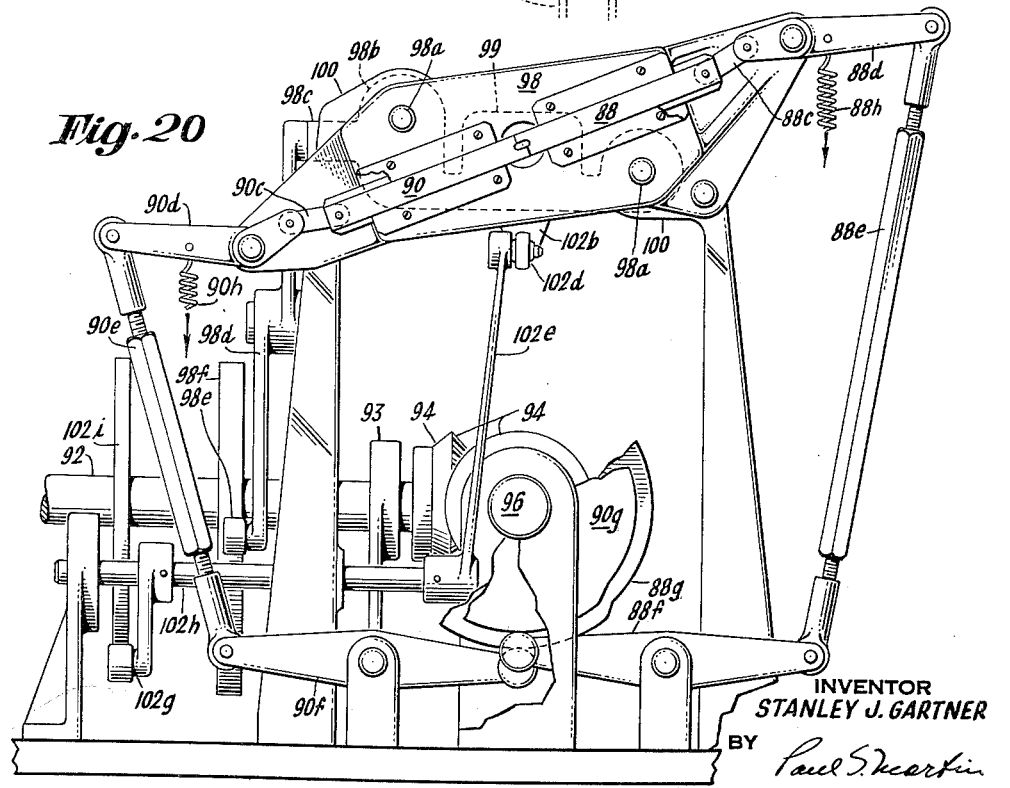
INVENTOR
STANLEY J. GARTNER
BY
Paul S. Martin
ATTORNEY Dec. 25, 1962   S. J. GARTNER   3,069,749
ASSEMBLING APPARATUS AND METHODS
Filed Jan. 29, 1954   43 Sheets-Sheet 11

INVENTOR
STANLEY J. GARTNER
BY Paul S. Martin
ATTORNEY

INVENTOR
STANLEY J. GARTNER
BY
ATTORNEY

Dec. 25, 1962   S. J. GARTNER   3,069,749
ASSEMBLING APPARATUS AND METHODS
Filed Jan. 29, 1954   43 Sheets-Sheet 15
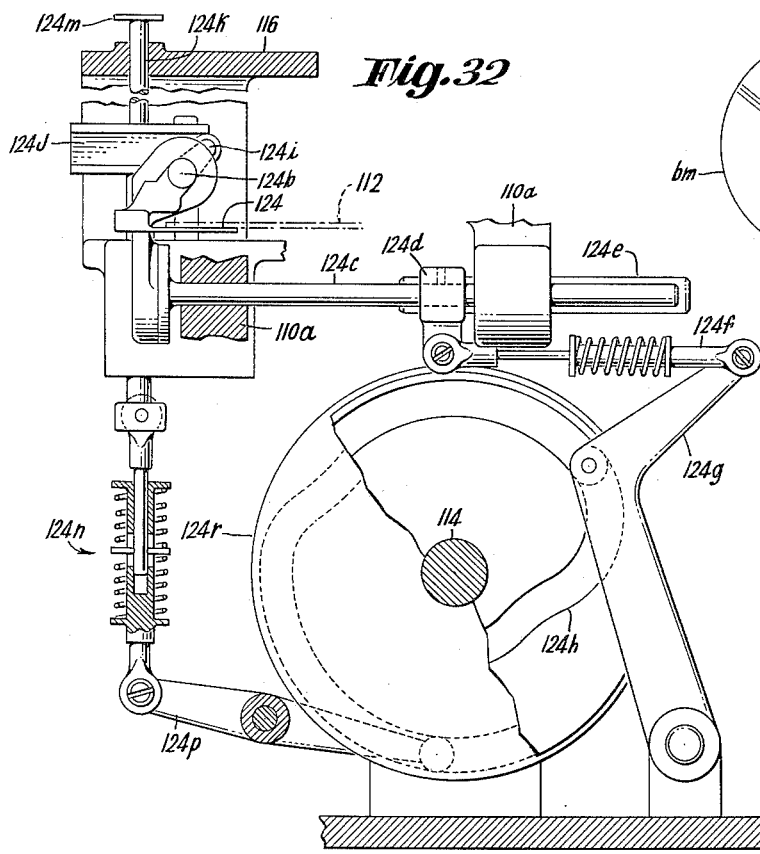
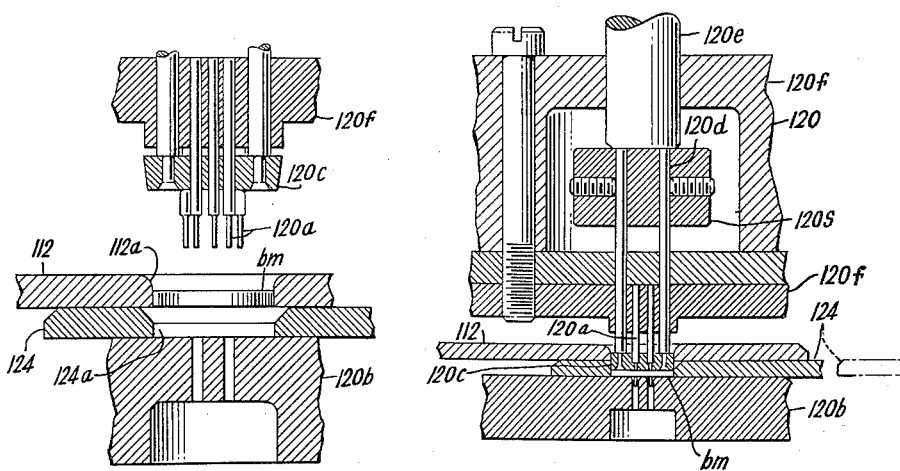
INVENTOR
STANLEY J. GARTNER
BY Paul S. Martin
ATTORNEY Dec. 25, 1962 S. J. GARTNER 3,069,749
ASSEMBLING APPARATUS AND METHODS
Filed Jan. 29, 1954 43 Sheets-Sheet 16

INVENTOR
STANLEY J. GARTNER
BY Paul S. Martin
ATTORNEY

Dec. 25, 1962 S. J. GARTNER 3,069,749
ASSEMBLING APPARATUS AND METHODS
Filed Jan. 29, 1954 43 Sheets-Sheet 17

INVENTOR
STANLEY J. GARTNER
BY Paul S. Martin
ATTORNEY

Dec. 25, 1962 S. J. GARTNER 3,069,749
ASSEMBLING APPARATUS AND METHODS
Filed Jan. 29, 1954 43 Sheets-Sheet 18
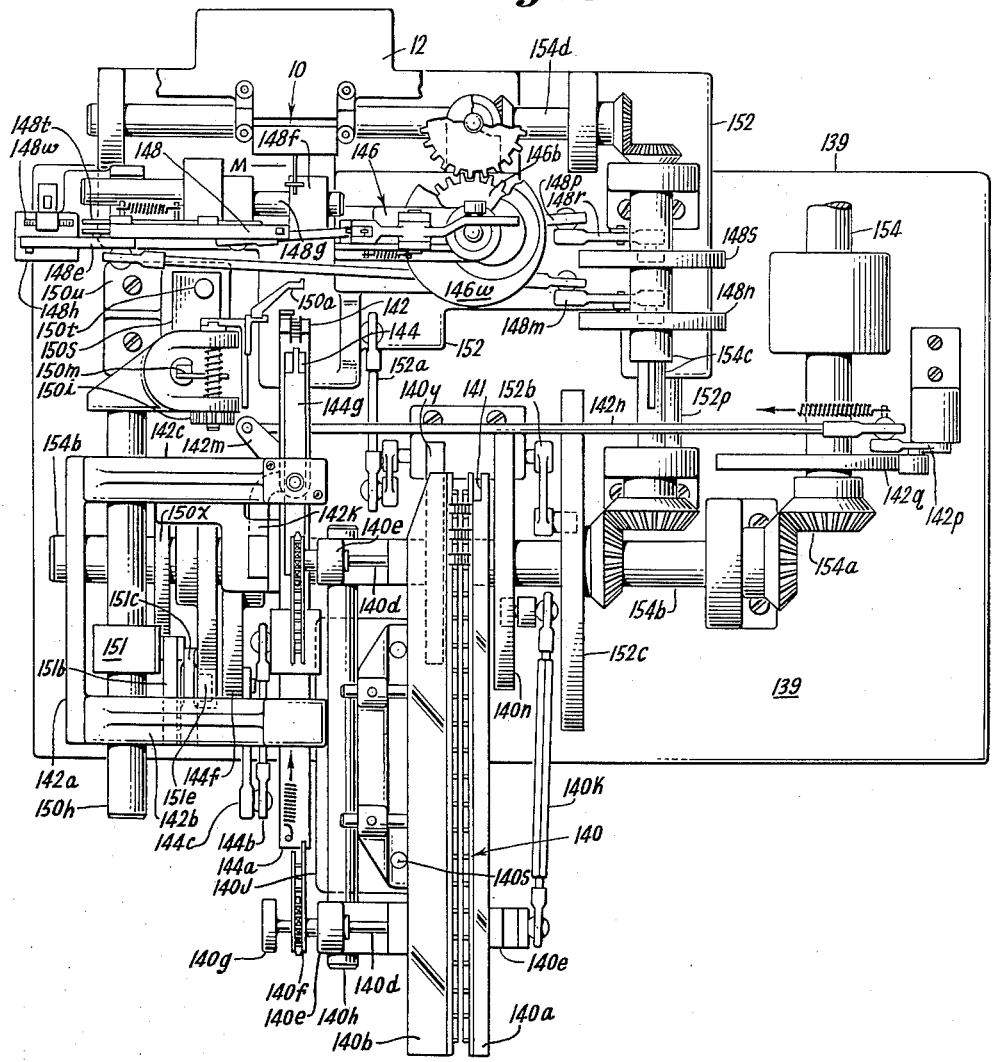
INVENTOR
STANLEY J. GARTNER
BY
ATTORNEY Dec. 25, 1962 S. J. GARTNER 3,069,749
ASSEMBLING APPARATUS AND METHODS
Filed Jan. 29, 1954 43 Sheets-Sheet 19
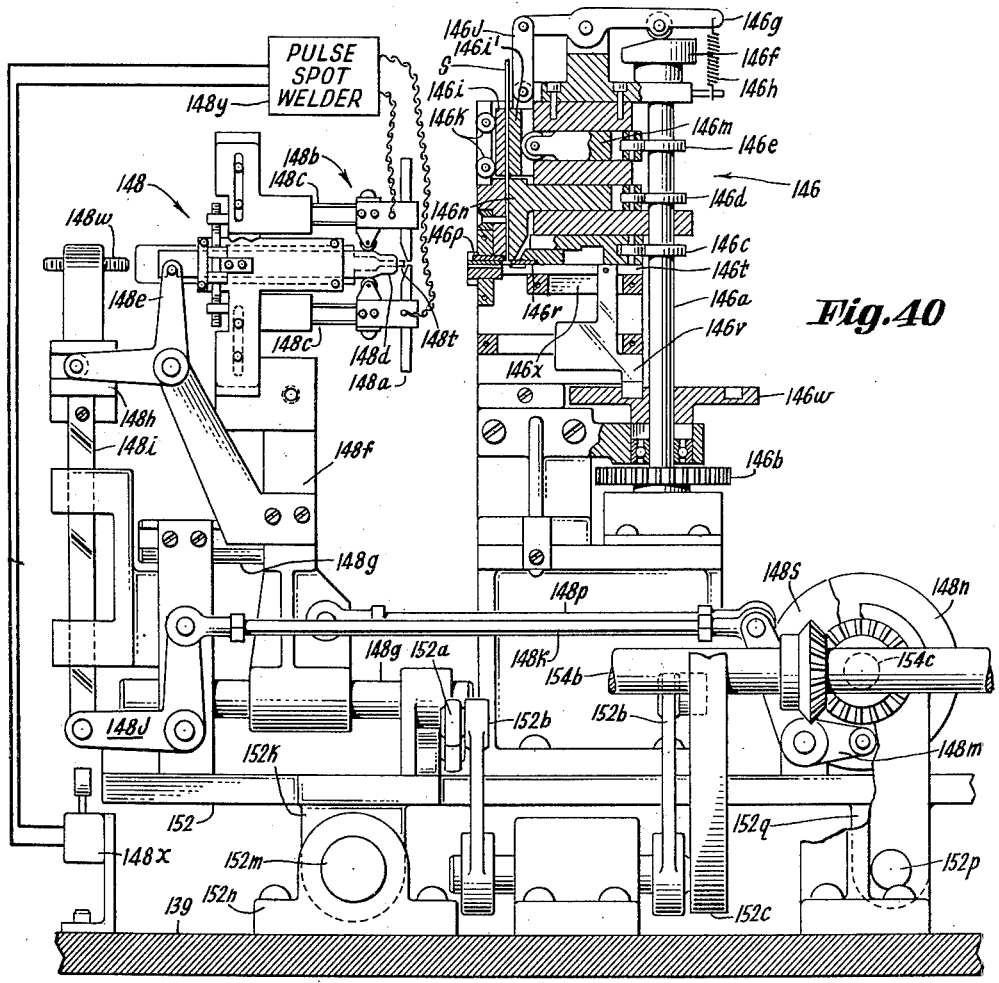
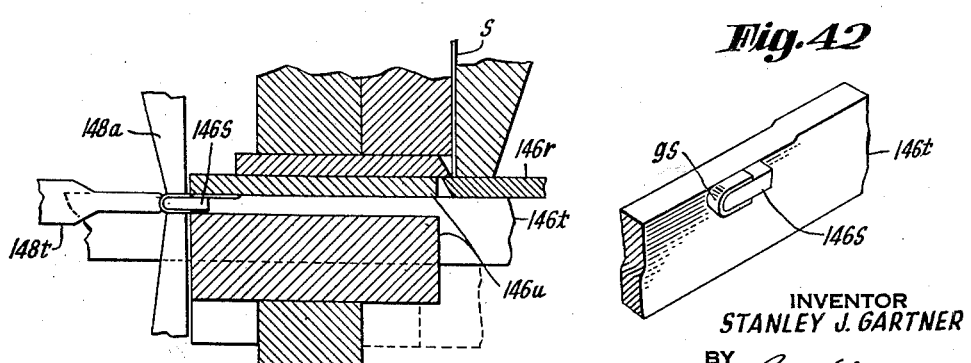
INVENTOR
STANLEY J. GARTNER
BY
Paul S. Martin
ATTORNEY Dec. 25, 1962     S. J. GARTNER     3,069,749
ASSEMBLING APPARATUS AND METHODS
Filed Jan. 29, 1954     43 Sheets-Sheet 20

INVENTOR
STANLEY J. GARTNER
BY
*Paul S. Martin*
ATTORNEY

Dec. 25, 1962 S. J. GARTNER 3,069,749
ASSEMBLING APPARATUS AND METHODS
Filed Jan. 29, 1954 43 Sheets-Sheet 21

INVENTOR
STANLEY J. GARTNER
BY
ATTORNEY

Dec. 25, 1962  S. J. GARTNER  3,069,749
ASSEMBLING APPARATUS AND METHODS
Filed Jan. 29, 1954  43 Sheets-Sheet 22
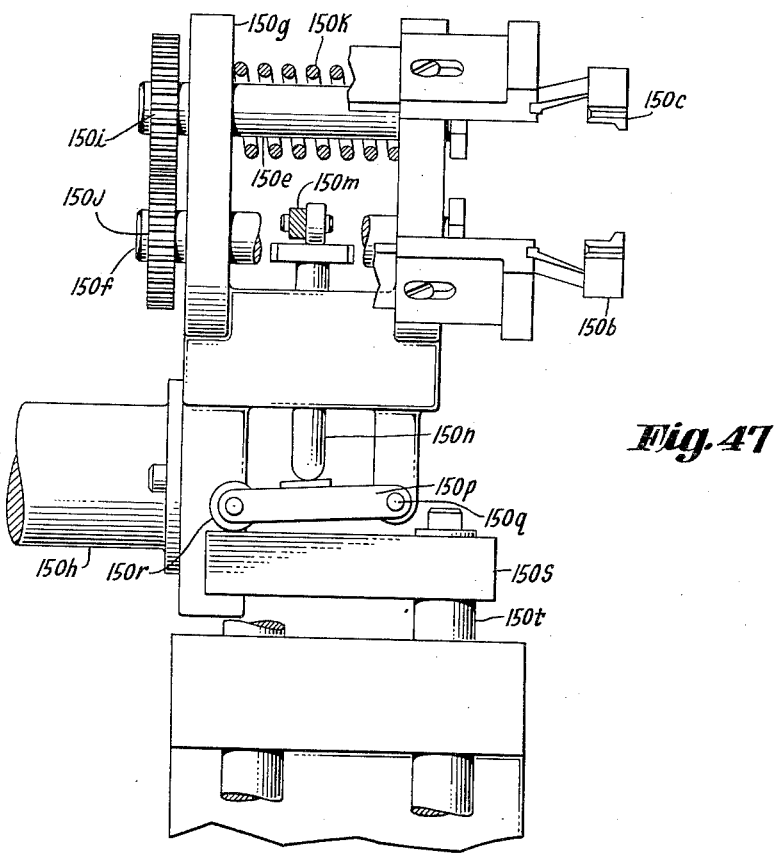
Fig. 47
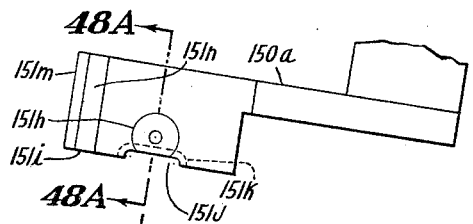
Fig. 48
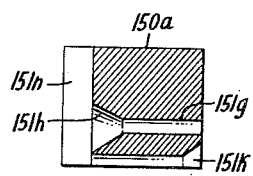
Fig. 48A
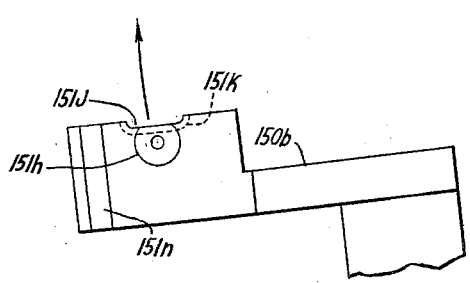
INVENTOR
STANLEY J. GARTNER
BY
Paul S. Martin
ATTORNEY Dec. 25, 1962 S. J. GARTNER 3,069,749
ASSEMBLING APPARATUS AND METHODS
Filed Jan. 29, 1954 43 Sheets-Sheet 23
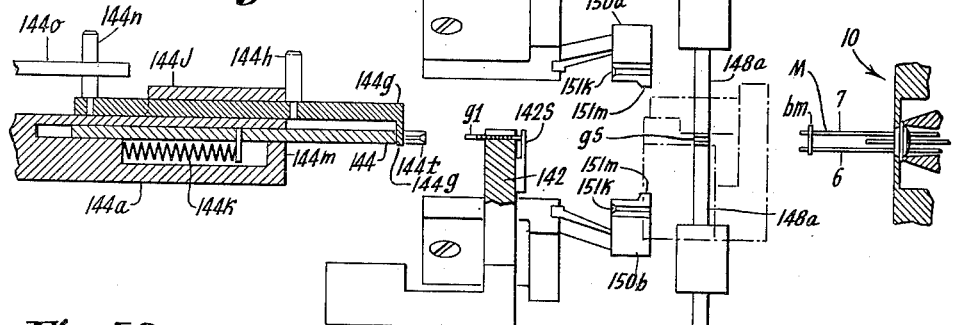
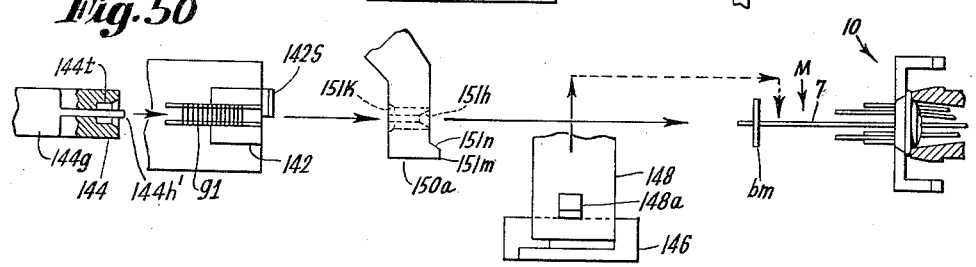
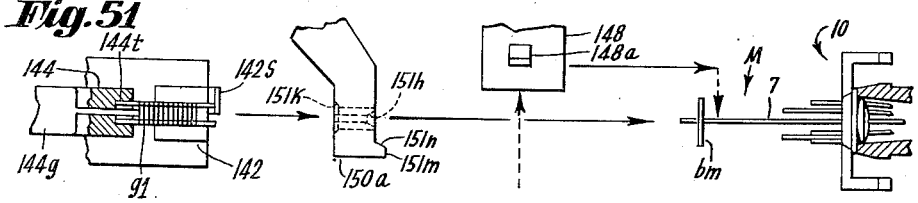
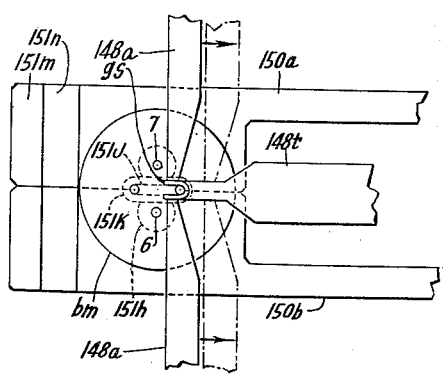
INVENTOR
STANLEY J. GARTNER
BY
ATTORNEY Dec. 25, 1962 S. J. GARTNER 3,069,749
ASSEMBLING APPARATUS AND METHODS
Filed Jan. 29, 1954 43 Sheets-Sheet 24

INVENTOR
STANLEY J. GARTNER
BY
*Paul S. Martin*
ATTORNEY

Dec. 25, 1962 S. J. GARTNER 3,069,749
ASSEMBLING APPARATUS AND METHODS
Filed Jan. 29, 1954 43 Sheets-Sheet 26

INVENTOR
STANLEY J. GARTNER
BY
ATTORNEY

Dec. 25, 1962 S. J. GARTNER 3,069,749
ASSEMBLING APPARATUS AND METHODS
Filed Jan. 29, 1954 43 Sheets-Sheet 27

INVENTOR
STANLEY J. GARTNER
BY Paul S. Martin
ATTORNEY

Dec. 25, 1962 S. J. GARTNER 3,069,749
ASSEMBLING APPARATUS AND METHODS
Filed Jan. 29, 1954 43 Sheets-Sheet 28

INVENTOR
STANLEY J. GARTNER
BY
Paul S. Martin
ATTORNEY

Dec. 25, 1962  S. J. GARTNER  3,069,749
ASSEMBLING APPARATUS AND METHODS
Filed Jan. 29, 1954  43 Sheets-Sheet 29
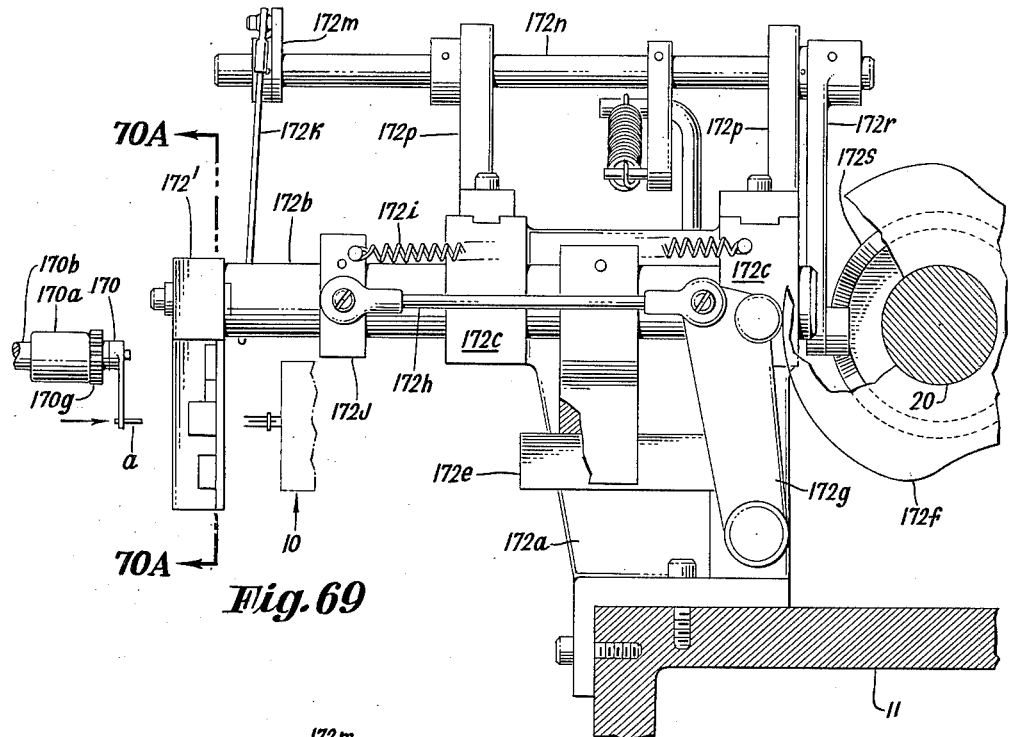
Fig. 69
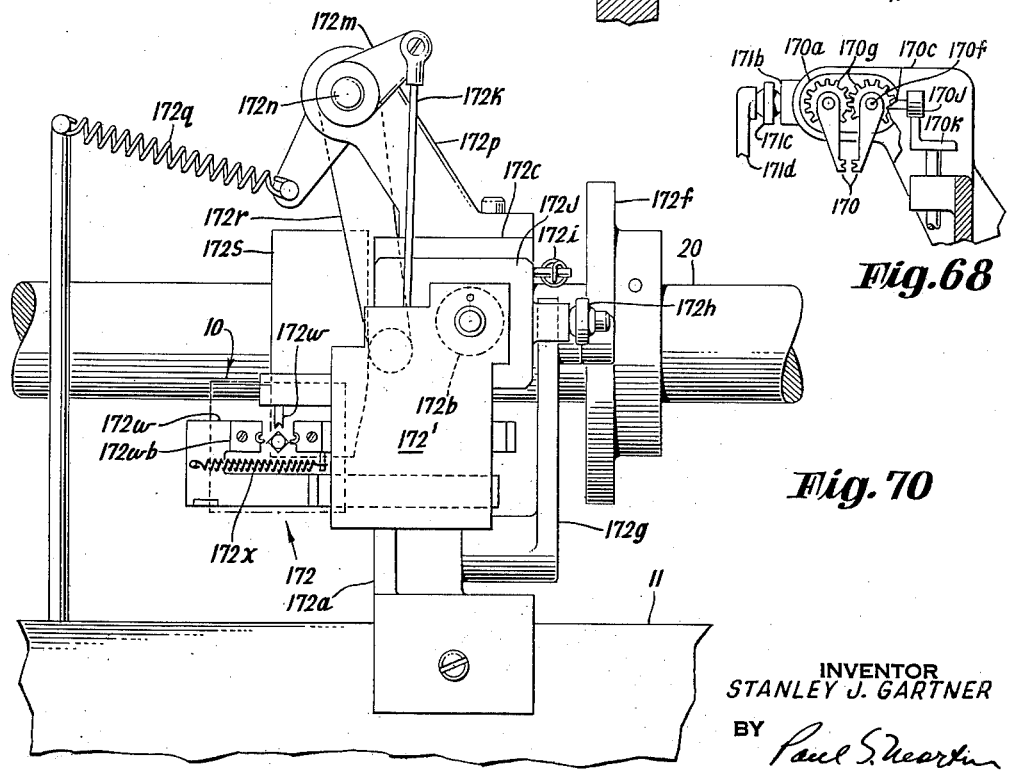
Fig. 68
Fig. 70
INVENTOR
STANLEY J. GARTNER
BY
ATTORNEY Dec. 25, 1962 S. J. GARTNER 3,069,749
ASSEMBLING APPARATUS AND METHODS
Filed Jan. 29, 1954 43 Sheets-Sheet 30

INVENTOR
STANLEY J. GARTNER
BY Paul S. Martin
ATTORNEY

Dec. 25, 1962 S. J. GARTNER 3,069,749
ASSEMBLING APPARATUS AND METHODS
Filed Jan. 29, 1954 43 Sheets-Sheet 31
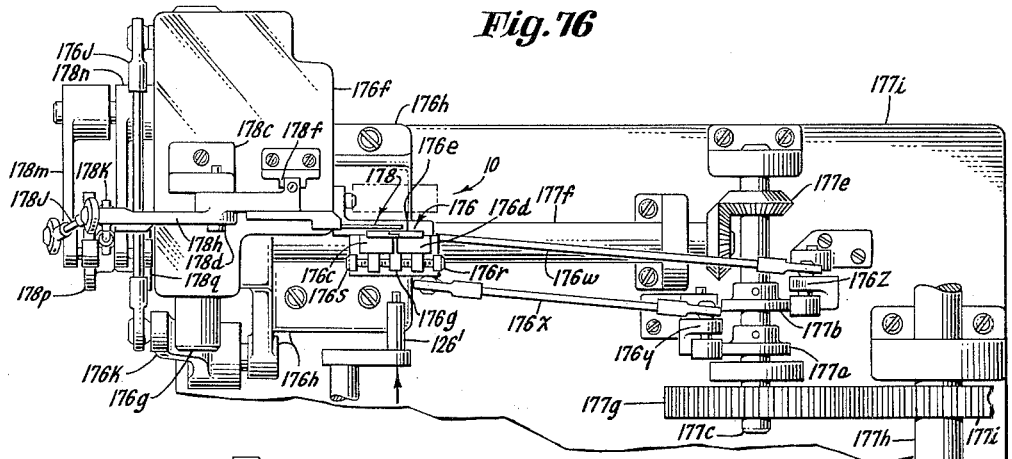
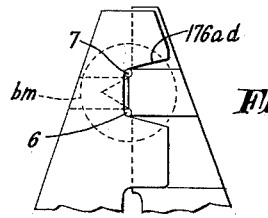
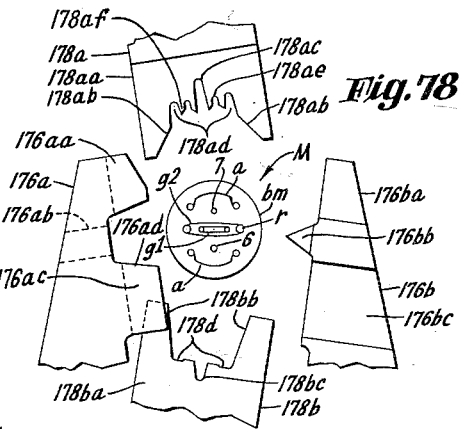
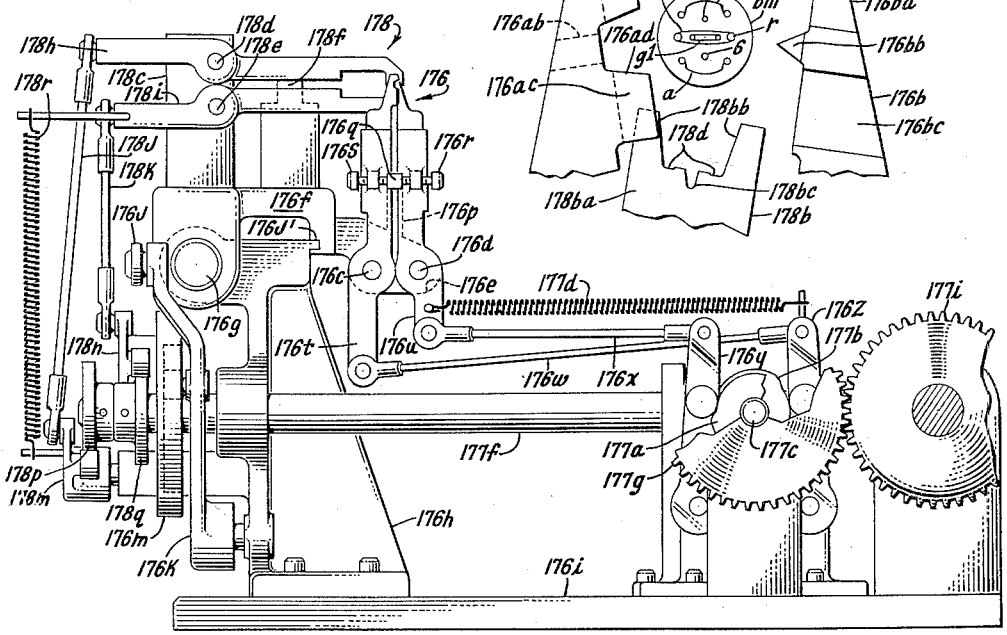
INVENTOR
STANLEY J. GARTNER
BY
Paul S. Martin
ATTORNEY Dec. 25, 1962 S. J. GARTNER 3,069,749
ASSEMBLING APPARATUS AND METHODS
Filed Jan. 29, 1954 43 Sheets-Sheet 32
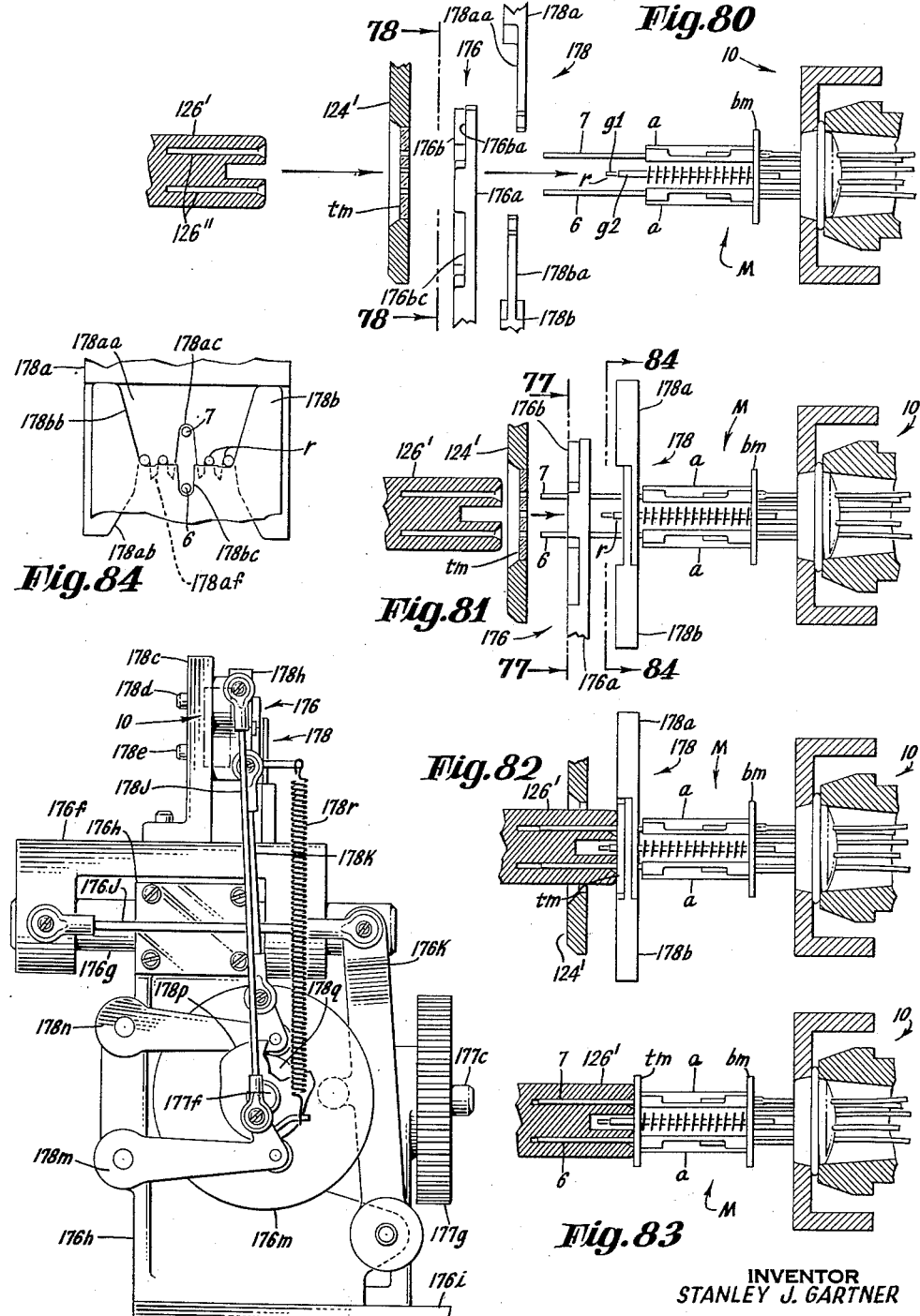
INVENTOR
STANLEY J. GARTNER
BY
ATTORNEY Dec. 25, 1962  S. J. GARTNER  3,069,749
ASSEMBLING APPARATUS AND METHODS
Filed Jan. 29, 1954  43 Sheets-Sheet 33
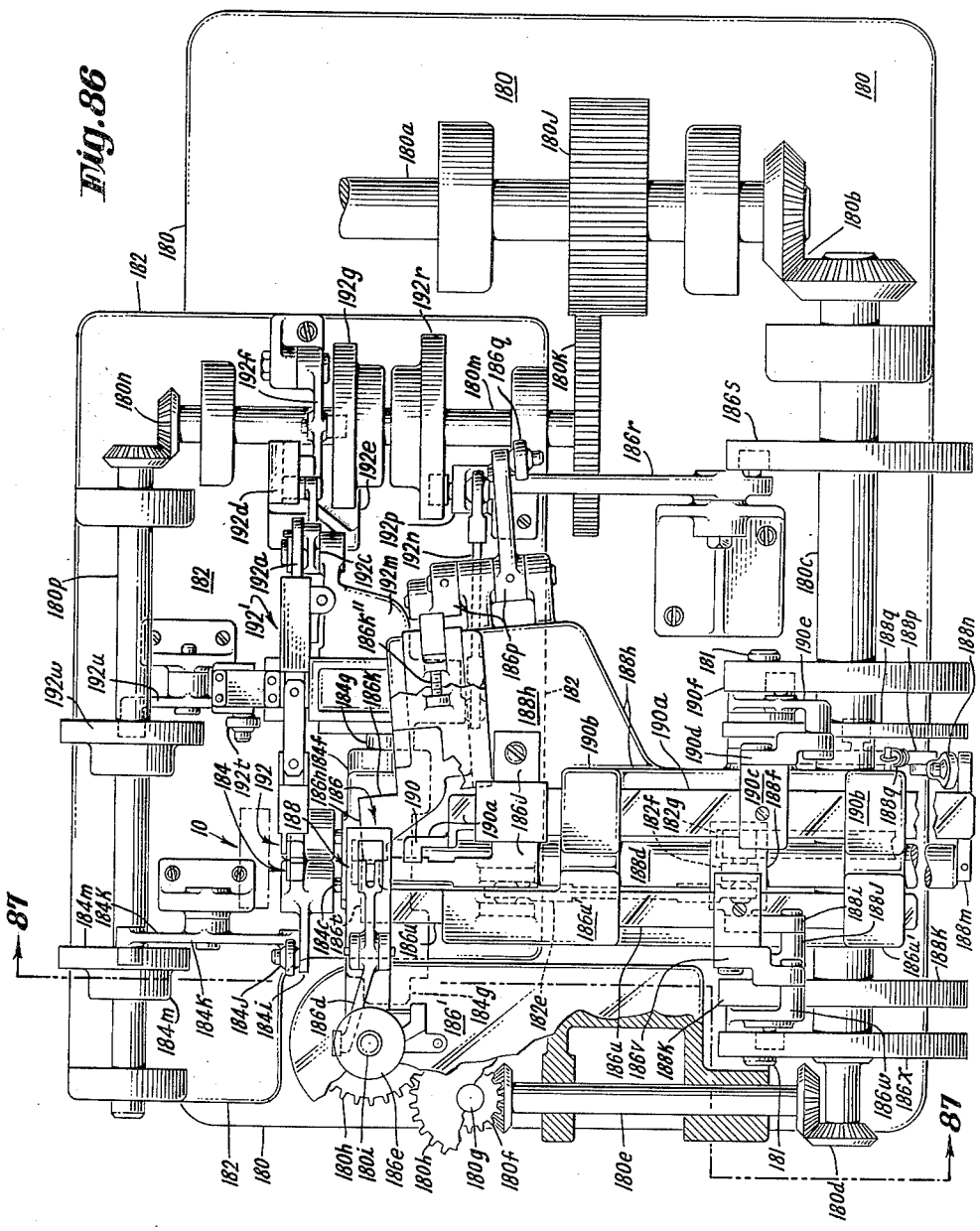
INVENTOR
STANLEY J. GARTNER
BY
ATTORNEY Dec. 25, 1962  S. J. GARTNER  3,069,749
ASSEMBLING APPARATUS AND METHODS
Filed Jan. 29, 1954  43 Sheets-Sheet 34
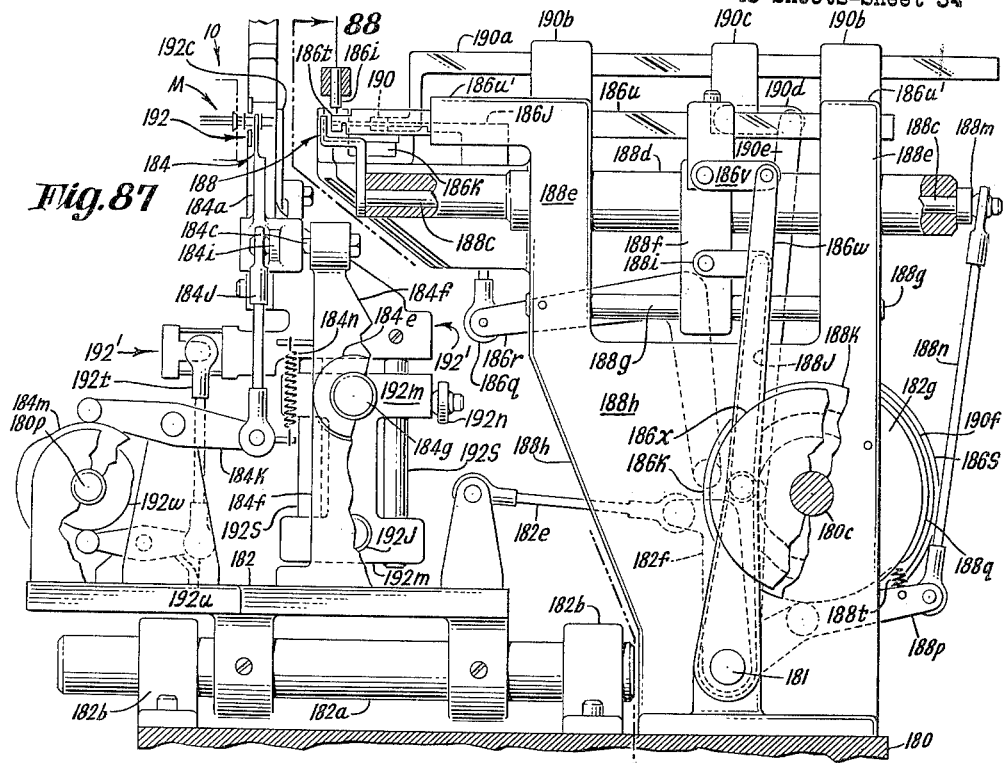
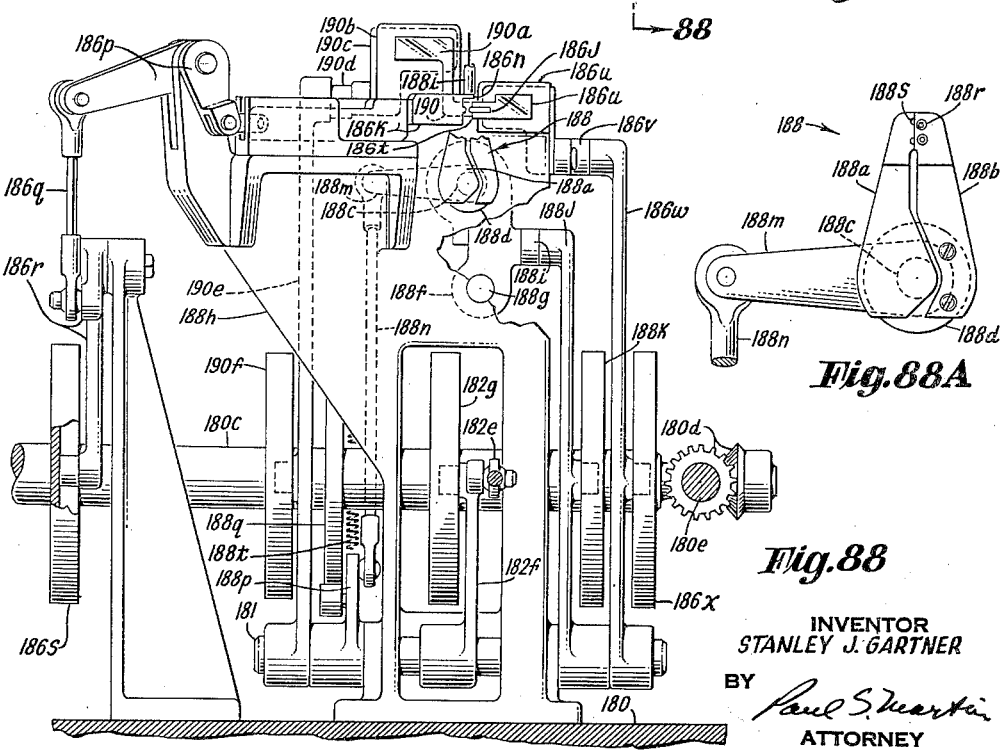
INVENTOR
STANLEY J. GARTNER
BY
Paul S. Martin
ATTORNEY

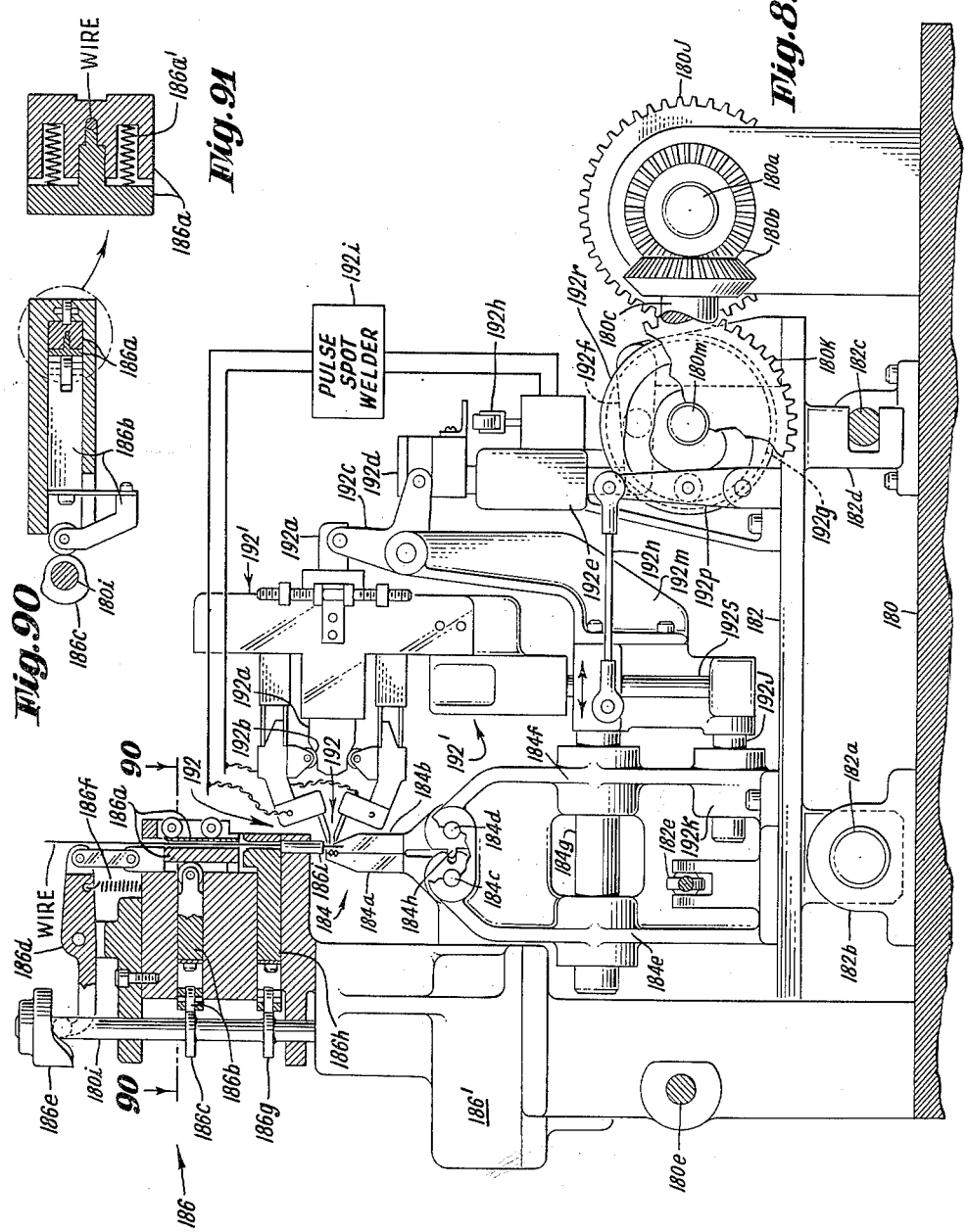

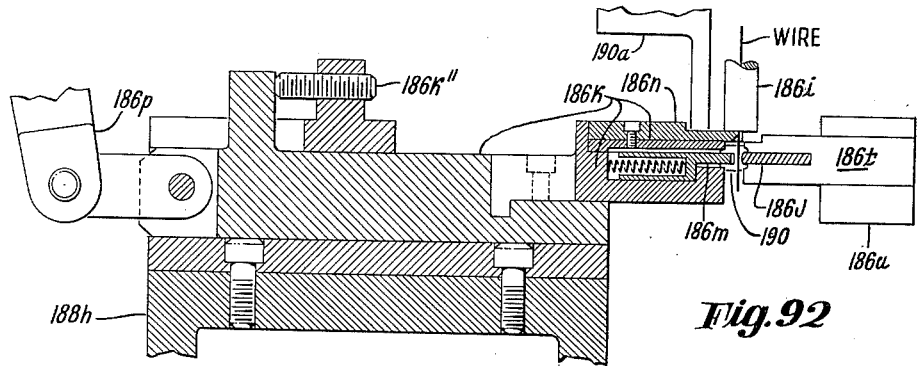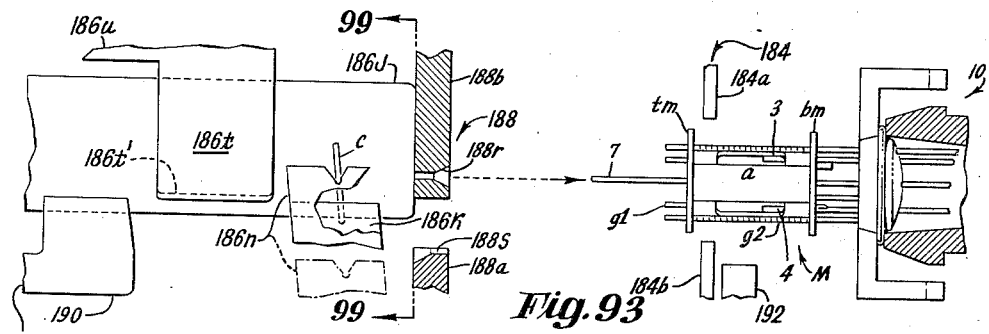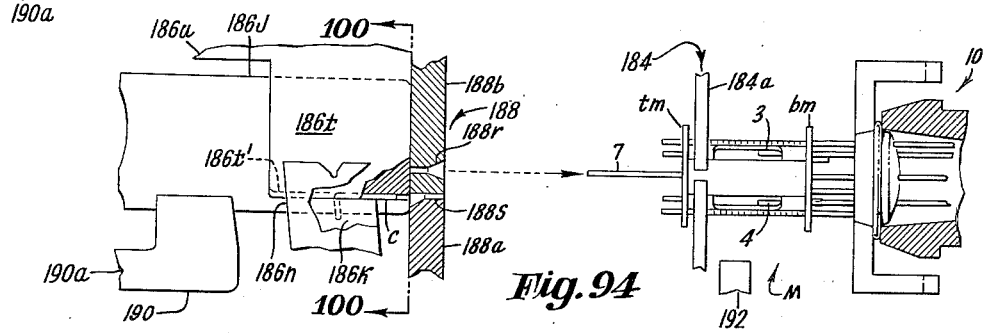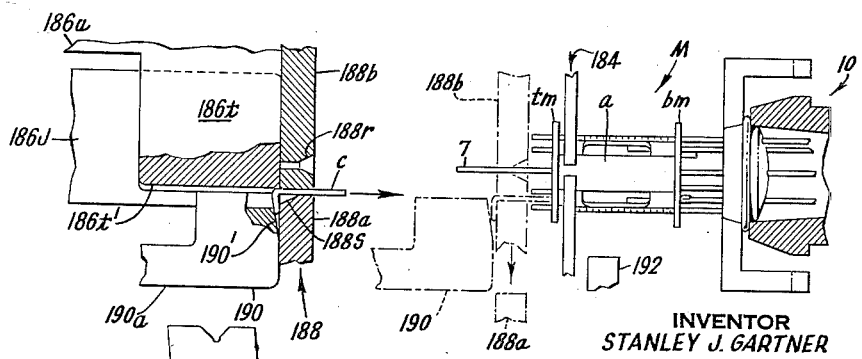

Dec. 25, 1962 S. J. GARTNER 3,069,749
ASSEMBLING APPARATUS AND METHODS
Filed Jan. 29, 1954 43 Sheets-Sheet 37

INVENTOR
STANLEY J. GARTNER
BY Paul S. Martin
ATTORNEY

Dec. 25, 1962  S. J. GARTNER  3,069,749
ASSEMBLING APPARATUS AND METHODS
Filed Jan. 29, 1954  43 Sheets-Sheet 38

INVENTOR
STANLEY J. GARTNER
BY
ATTORNEY

Dec. 25, 1962  S. J. GARTNER  3,069,749
ASSEMBLING APPARATUS AND METHODS
Filed Jan. 29, 1954  43 Sheets-Sheet 39

INVENTOR
STANLEY J. GARTNER
BY
ATTORNEY

Dec. 25, 1962  S. J. GARTNER  3,069,749
ASSEMBLING APPARATUS AND METHODS
Filed Jan. 29, 1954  43 Sheets-Sheet 40

INVENTOR
STANLEY J. GARTNER
BY
ATTORNEY

Dec. 25, 1962 S. J. GARTNER 3,069,749
ASSEMBLING APPARATUS AND METHODS
Filed Jan. 29, 1954 43 Sheets-Sheet 41

INVENTOR
STANLEY J. GARTNER
BY
ATTORNEY

Dec. 25, 1962 S. J. GARTNER 3,069,749
ASSEMBLING APPARATUS AND METHODS
Filed Jan. 29, 1954 43 Sheets-Sheet 42

INVENTOR
STANLEY J. GARTNER
BY
ATTORNEY

Dec. 25, 1962  S. J. GARTNER  3,069,749
ASSEMBLING APPARATUS AND METHODS
Filed Jan. 29, 1954  43 Sheets-Sheet 43

INVENTOR
STANLEY J. GARTNER
BY
ATTORNEY

United States Patent Office 3,069,749
Patented Dec. 25, 1962

3,069,749
ASSEMBLING APPARATUS AND METHODS
Stanley J. Gartner, Emporium, Pa., assignor, by mesne assignments, to Sylvania Electric Products Inc., Wilmington, Del., a corporation of Delaware
Filed Jan. 29, 1954, Ser. No. 406,930
64 Claims. (Cl. 29—25.2)

The present invention relates generally to methods and apparatus for automatically assembling parts, particularly the component parts of a mount or electrode assembly of an electronic tube or the like.

During the several decades of technical development and commercial exploitation of vacuum tubes and the like there has been a persistent need for improved methods of assembly and for automatic assembling apparatus for the electrodes of such devices. Some early machines were devised that were adapted to assemble simple types of mounts but even these were unsuccessful to my knowledge.

For many years, tubes have included many electrodes, and with the development of the hearing aid and the proximity fuze, the dimensions of many types of tubes have been greatly reduced. It will be recognized that as mounts are made progressively smaller, manual assembly without deforming the delicate electrodes becomes progressively more difficult. In the event that a mount is assembled imperfectly, perhaps including a deformed electrode, the defective nature of the mount may not be detected until after the mount is sealed in its envelope as finally exhausted and completed. At this stage, it is revealed as defective after it represents a far greater expenditure than is represented by the mount itself. In other words, manual assembly techniques tend to deform the electrodes in such a way that defective mounts are often detected after the tube construction has advanced to an expensive stage. The methods and apparatus provided by the present invention vastly reduce this tendency to deform electrodes; and any deformation produced occasionally is so prominent as to be immediately detected and the mount can be rejected while still representing comparatively small cost.

It is accordingly an important object of the present invention to provide new and improved methods and apparatus for automatically assembling electronic tube mounts and the like. A further object is to automatically assemble electrodes of even small and complicated mounts in rapid, precise and automatic routine.

In the illustrative embodiment of the invention detailed below, the electrodes are assembled in proper mutual relationship. The mount as finished in the disclosed embodiment includes a "stem" on which the electrode assembly is supported, the stem consisting of a glass button or header through which are sealed a set of wires. These serve as terminal connectors and mechanical supports of the electrodes later assembled on the wires. The header usually serves as the end of a tube envelope.

Stems are ordinarily prepared in molding machines which locate the wires in the glass header with relatively broad tolerance. A feature of the present invention is in the "tailoring" or trimming of the leads to accurately determined lengths; and a further feature is in the adjustment of the lead positions to close tolerance, for consistent and reliable operation of the assembling machine and further to assure consistent, accurate duplication of the automatically assembled mounts. In accomplishing this purpose, the machine handles the stems and is effective to adjust the way in which the stems are held so as to perfect the positioning of the wires; and that effect is further enhanced by devices which trim certain of the wires to critical lengths spaced from the glass portion and to bend certain of the wires, where necessary, into the optimum pattern on which the remainder of the operations depend.

The machine includes a conveyor which carries a number of work holders from each of a series of stations to the next, step-wise. Because of the small dimensions of the illustrative mount being assembled and the consequent close tolerances involved, it is important that the conveyor should consistently advance the work holders to an accurate position in each station. Ordinary conveyor mechanisms, such as the usual chain conveyor, tend to introduce slack and in this way tend to defeat the objective of accurate transport of the work holders. A feature of this invention resides in a conveyor having unusually large links, and correspondingly, having relatively few links. A subsidiary feature relates to the conveyor that is disposed about a pair of sprockets, one of which is movable to and from the other so as to accommodate the travel of the large links about those sprockets. The use of an odd number of links minimizes the motion of the movable sprocket, and the consequent impacts on the frame and in the drive are minimized.

In the illustrative machine, the previously molded glass-and-wire stems are loaded manually onto a conveyor plate with rough preliminary orientation. A feature of the invention resides in the techniques and mechanisms for handling the glass-and-wire stem during its transfer from the initial feed plate to the work holders of the main conveyor, so as to preserve and improve the initial orientation and to effect this transfer in a simple manner well suited to specialized forms of stems.

The completed mount in this illustrative disclosure involves parallel insulated discs, customarily of pierced mica, which fix the spacing between the electrodes precisely. As previously mentioned, the wires of the stem are adjusted in the machine, into an accurate pattern. In this illustrative machine an important feature is in the provision of a piercing die for forming the holes in the mica while each mica is held in the very element utilized to transfer and apply the mica to stem wires, and in the case of the top mica, to certain of the electrodes.

That portion of the machine which locates the stem in the work-holder and trims the wires to critical lengths constitutes a useful combination; but if the machine accomplished no more, it might well be considered uneconomical. Ordinarily, stems are manually inserted into a trimming die. An important feature of this invention is in not merely trimming the stem leads, but accomplishing the further mount-assembly operations on the stem as trimmed and oriented in the trimming operation. The consistent orientation of the stems and the consistent trimming of the leads at a uniform distance from the work-holder establishes a uniform condition of the stem utilized in assembly of the additional parts, with consistent accuracy and success.

The first mica to be assembled has an accurate pattern of pierced holes. Certain stem wires enter certain of the pierced holes in the mica when the mica is assembled to the stem. Those wires are then engaged and utilized in subsequent assembling operations, to pick up and accurately locate the mica so that electrodes may automatically be assembled to the mica, with portions of those electrodes extending through additional pierced holes in the mica. The mica is oriented indirectly.

A further feature of the present invention resides in the insertion of the side rods of the usual helically wound grid into holes pierced in a mica after the mica is on the stem wires. This is accomplished by applying the mica to the stem wires at an intermediate position, by supplying and to supply thrust-resisting backing for the mica while inserting the grid, and finally by pushing the grid and mica all the way to the short wires on the stem. A further feature resides in the welding of a grid stop to one of the grid side rods so as to prevent appreciable shifting of the grid in the completed tube, and to accomplish this despite extremely small dimensions involved in the illustrative mount to which the invention is applied. This is accomplished when the mica is at an intermediate position (such that both sides of the mica are easily accessible) and after grid insertion. The stop is applied to the grid side rod with the mica in this position, and thereafter the mica and grid subassembly is advanced to its final position on the stem wires. The welding tools serve not only to weld, but to transport the grid stop to position and to furnish thrust resistance behind the mica during insertion of the grid.

A further feature of the invention resides in the assembly of a second grid telescopically about the first while the first mica is in the intermediate position and with the side rods of the second grid penetrating the prepared holes in the mica, and thereafter advancing the subassembly of two grids and the mica to the final position on the wires of the stem.

In the illustrative disclosure, it will be seen that the two grids function with two long stem wires as electrodes of a pentode; and a two-part anode in the form of two preformed anode plates is automatically assembled to the mount thus far completed.

In this machine, a second mica is applied to the projecting ends of the electrodes opposite the first mica; and a further part is assembled to the mount to lock the mica in place and to interconnect the parts of a two-part anode. One of those electrodes that penetrates the top mica is seized and oriented for indirectly orienting the top mica in this assembling operation, a feature that is found in another form in the grid-mounting stations.

A desirable minimum number of welding operations is effected for permanently retaining the assembly of the electrodes and other parts in the initial accurate configuration produced by the uniformly repeated operations of the machine.

Included in several stations are various important forms of tools which, like the gathering tools in the cutting station, embrace the parts of the partial mount while a further component is advanced into place. An especially useful and novel form of gathering tool used in combination with assembling mechanisms in several of the stations involves jaws which close on each other and, when closed, present a pattern of apertures with flared openings facing the stem holder. They advance on and receive the stem wires, and having established orientation desired for an assembly operation, are laterally separated and withdrawn. Certain split tools have flared openings facing toward the stem and flared openings facing away from the stem. These advance on the stem to receive and orient a pattern of wires while also acting to direct a further part, such as a grid or an anode part, in a precise path toward the partial mount. These and further detailed yet important features of the invention will be better appreciated from the specific description of the various tools involved.

In the event of misoperation, it may happen that a mount is deformed by the apparatus. Such deformed mount is prominently defective and is readily detected upon inspection and rejected as it emerges from the machine, long before it can reach the envelope sealing and evacuating stage of manufacture of electron tubes. This is a valuable aspect of the invention. The mount as it emerges at the assembling stage of tube manufacture can be rejected at low cost if it should be found defective. In contrast, manually assembled mounts with no prominent visual defect are assembled into completed, sealed and exhausted tubes, and at this completed stage there is a very substantial rate of rejection. The rate of rejection of completed tubes containing mounts prepared under the present invention is sharply reduced.

Further features of novelty will be appreciated from the illustrative disclosure that follows. It will naturally be understood that certain aspects and features of the described embodiment may be omitted as required and that certain features are useful in other combinations. However, the entire organization is admirably adapted to achieve the broad purpose of assembling and uniting the electrodes of a mount, particularly in assembling numerous electrodes of a subminiature mount. In the detailed disclosure, reference is made to the accompanying drawings forming part of the present disclosure. In the drawings:

FIGS. 1A and 1B are a plan view of an illustrative mount machine embodying features of the present invention, including the work conveyor and portions of the coordinating drive and cam mechanisms of the various work stations, showing in greatly enlarged perspective the progress of a typical mount during passage through the several work stations of the machine but omitting those stations;

FIG. 2 is an elevation in cross-section along the line 2—2 of FIG. 1 but at larger scale, showing the jaw-opening mechanisms for the stem blocks or work holders and the drive mechanism of the several stations of the machines;

FIG. 2A is a portion of FIG. 1A at larger scale showing details of the link conveyor for the stem block and the guide mechanisms for maintaining the stem block along a predetermined path during travel through successive stations;

FIG. 3 is an enlarged fragmentary elevation, with parts broken away and sectioned, showing the details of the work holder or stem block;

FIG. 4 is a sectional view taken substantially along the line 4—4 of FIG. 3 and looking in the direction of the arrows;

FIG. 5 is a perspective view, with parts broken away, of the stem block illustrated in FIGS. 3 and 4;

FIG. 6 is an elevation, certain parts sectioned and broken away, showing portions of the mechanism of FIG. 1A together with the stem-loading mechanism at station A of FIG. 1A;

FIG. 7 is an enlarged fragmentary elevation, viewed generally from the line 7—7 of FIG. 6 and looking in the direction of the arrows showing the turret indexing mechanism;

FIG. 8 is an elevation, with some parts broken away and shown in section taken substantially along the line 8—8 of FIG. 6 and looking in the direction of the arrows showing the details of transfer fingers for displacing successive stems from the feed turret onto a two part transfer member;

FIG. 8A is an elevation showing the details of a split funnel guide interposed between the transfer member and the stem block in FIG. 6;

FIG. 9 is a perspective view showing the details of the two part transfer member of FIG. 6 with a stem loaded therein ready for transfer;

FIG. 10 is a four stage progressive illustration of the transfer member of FIG. 6 in successive positions of movement from receiving a stem at the feed turret to delivering the stem through the split guide to the stem block;

FIG. 10A is an enlarged fragmentary plan view showing a stem on the feed turret together with part of the transfer member, as viewed just prior to the first diagrammatic showing of FIG. 10;

Figure 1A:
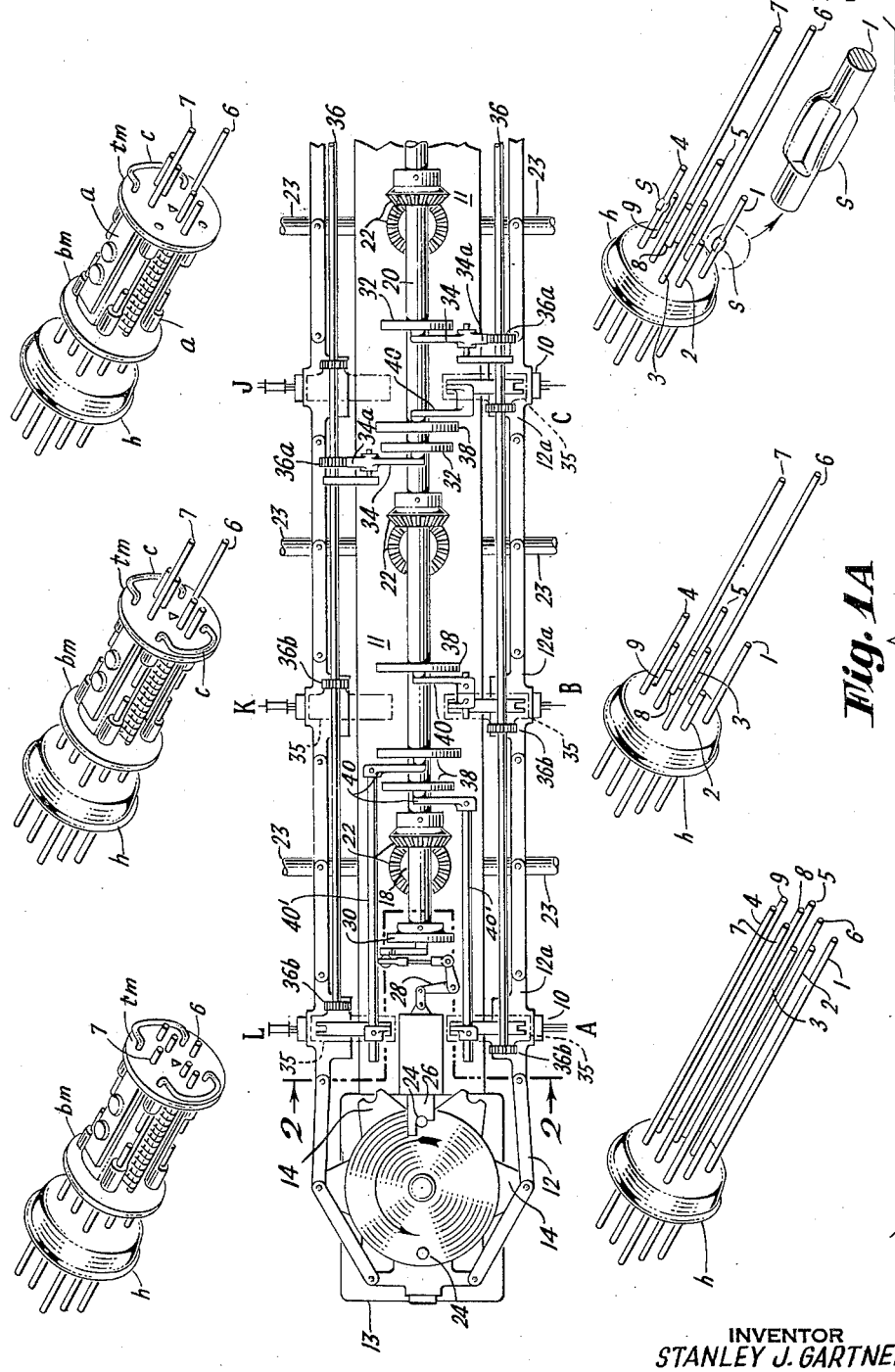
Figure 11:
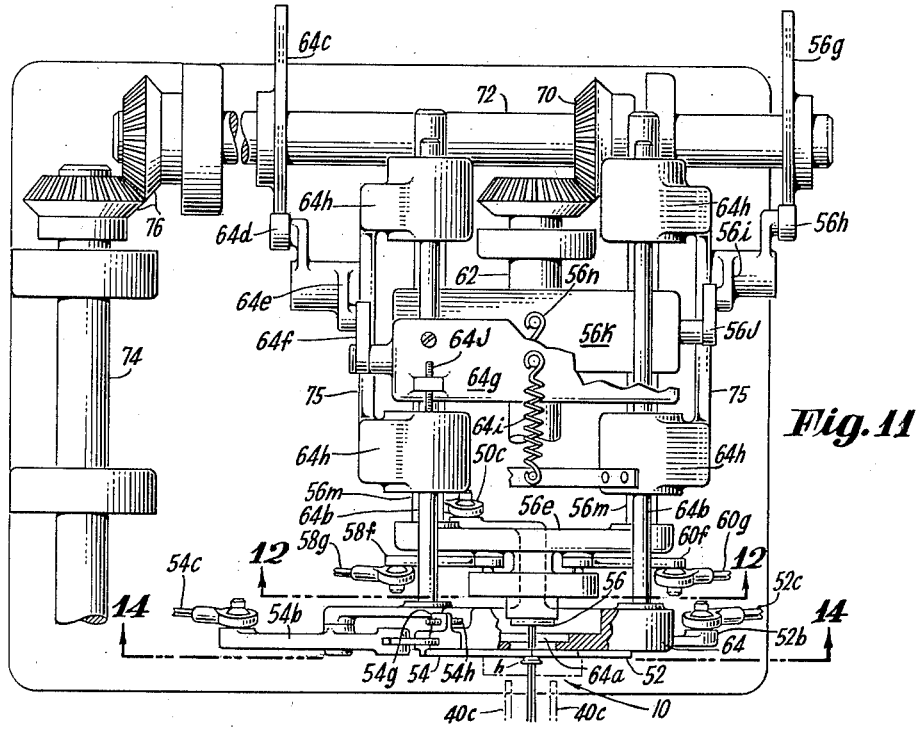
FIG. 11 is a plan view with parts broken away and sectioned showing the operating mechanisms and the general arrangement of the mechanism in the lead-trimming station B of FIG. 1A.
Figure 12:
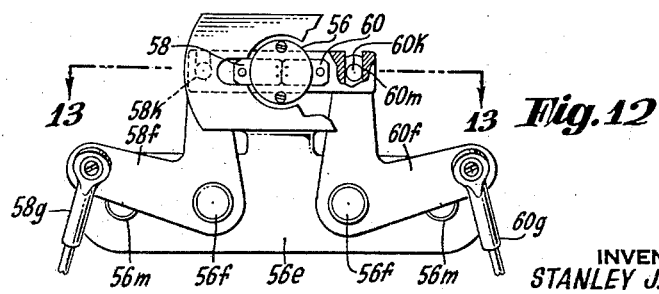
FIG. 12 is a detail view, with parts broken away and sectioned, taken along the line 12—12 of FIG. 11 and looking in the direction of the arrows, showing details of the stationary cutting die and movable cutting tools.
Figure 14:
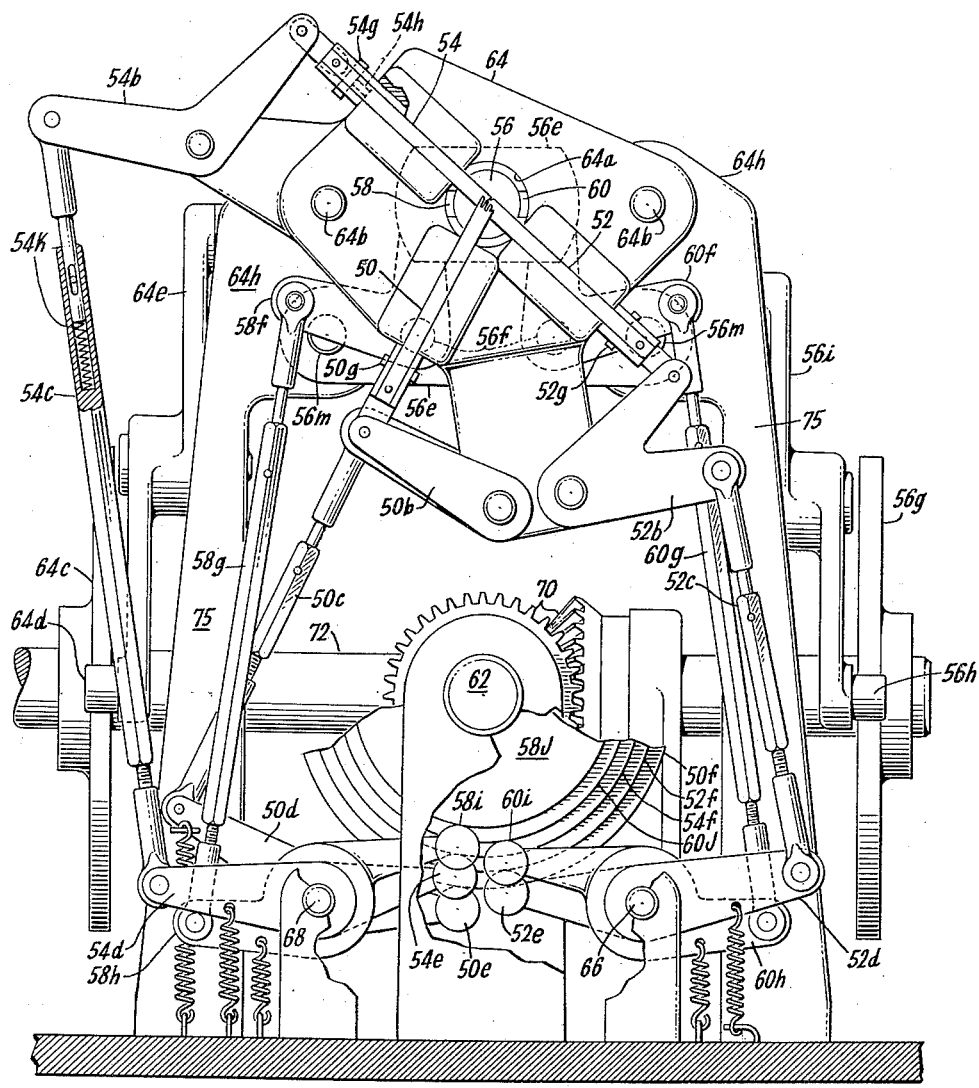
Figure 21:
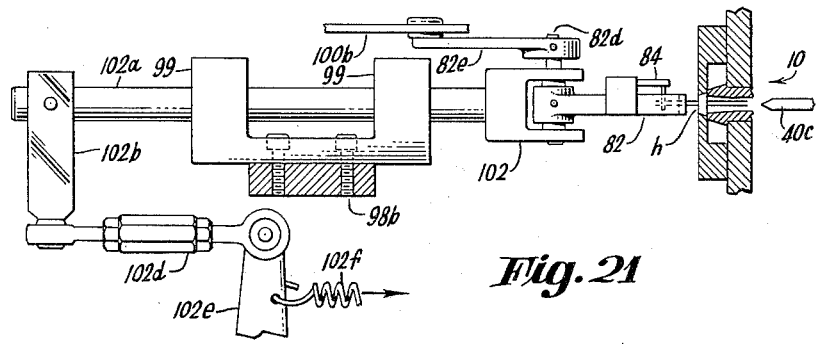
Figure 23:
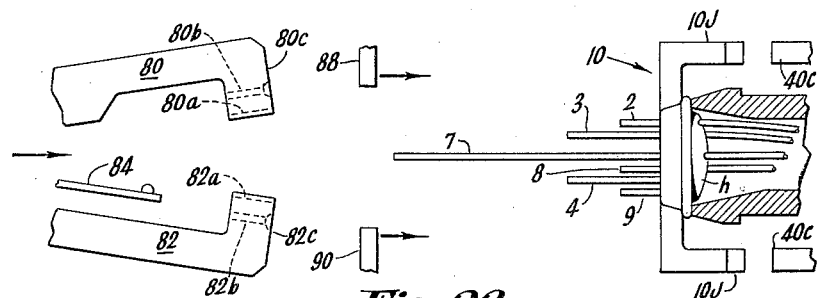
Figure 22:
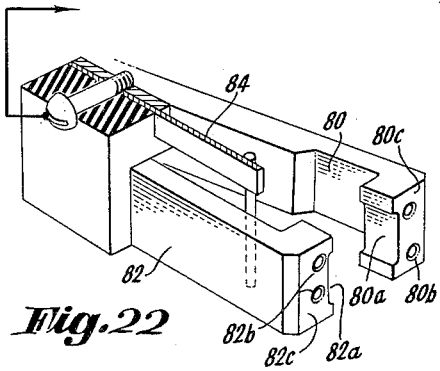
Figure 24:
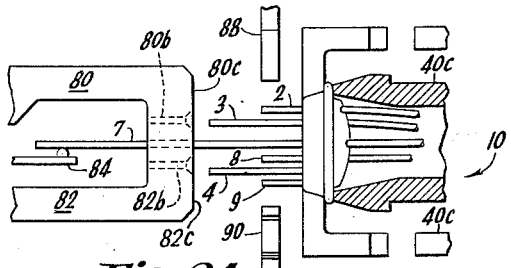
Figure 25:
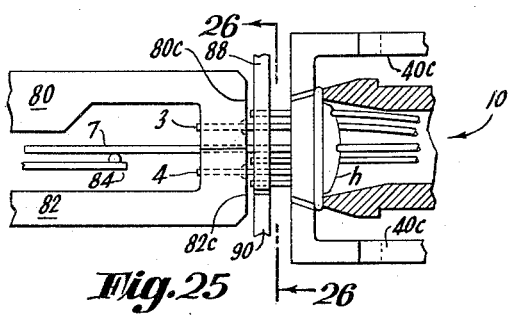
Figure 26:
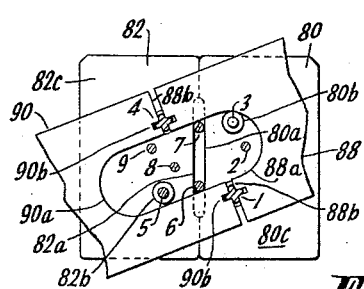
Figure 27:
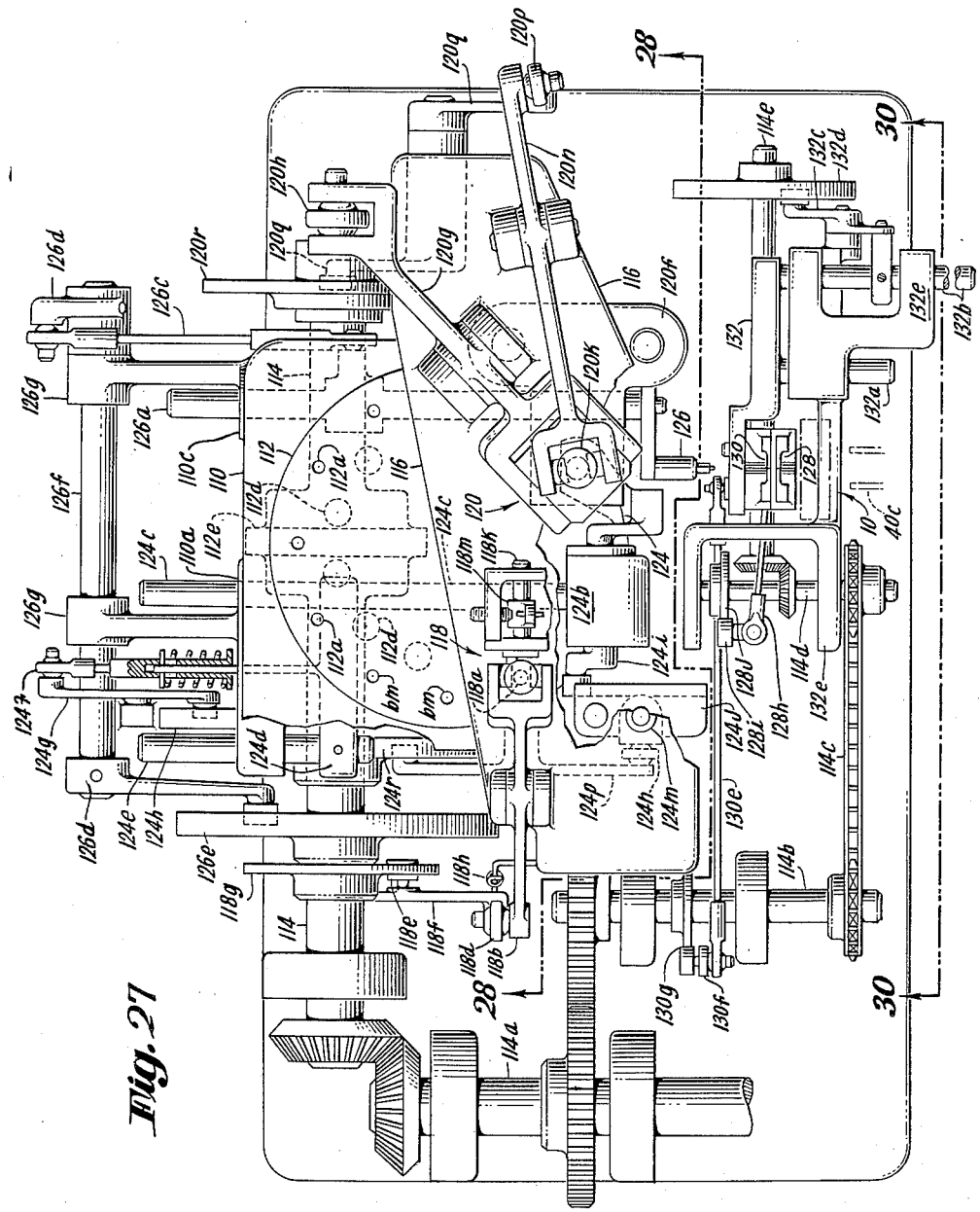
Figure 28:
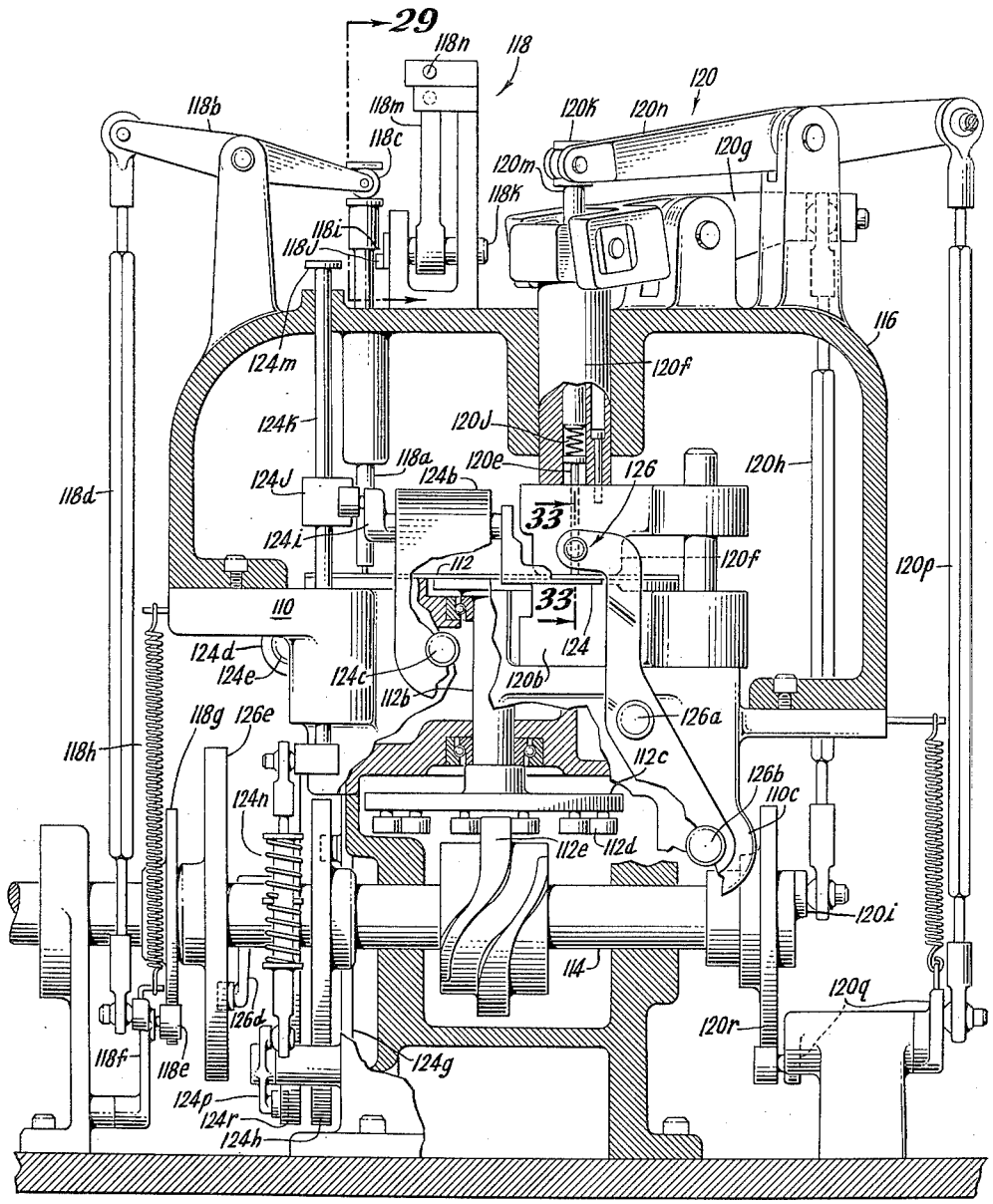
Figure 29:
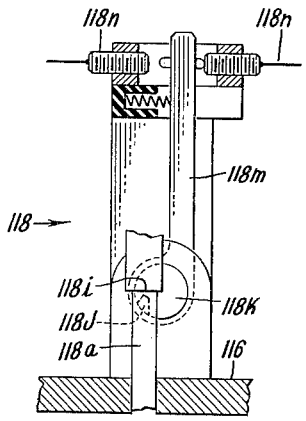
Figure 31:
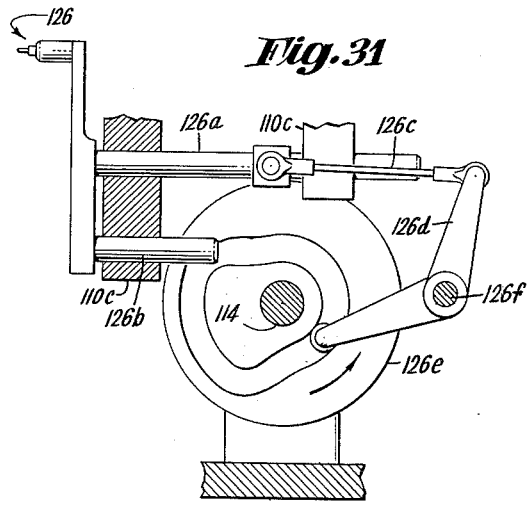
Figure 30:
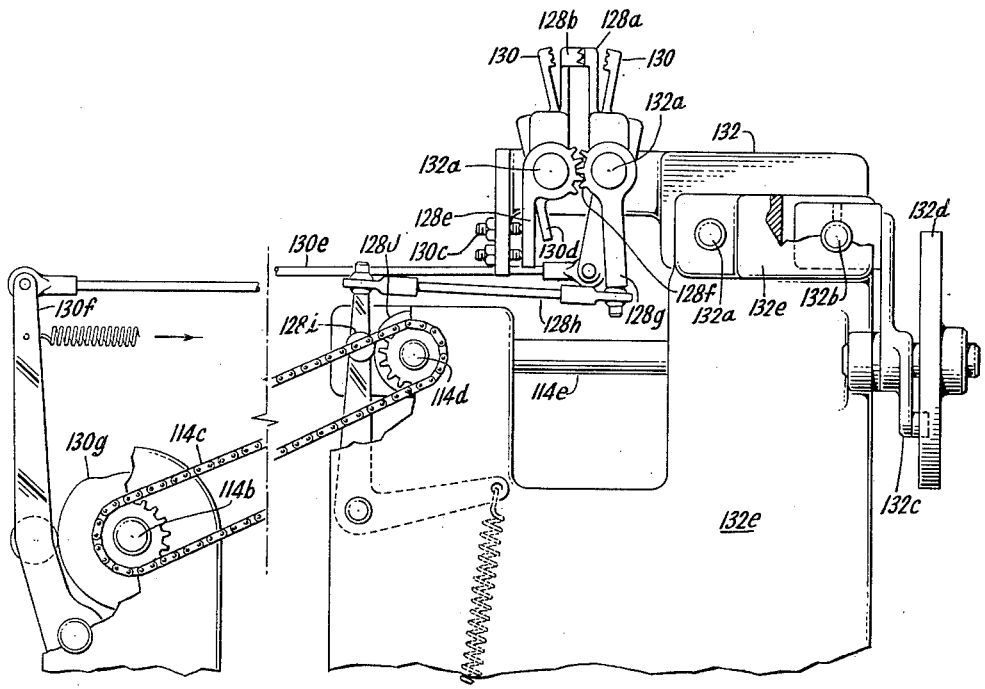
Figure 36:
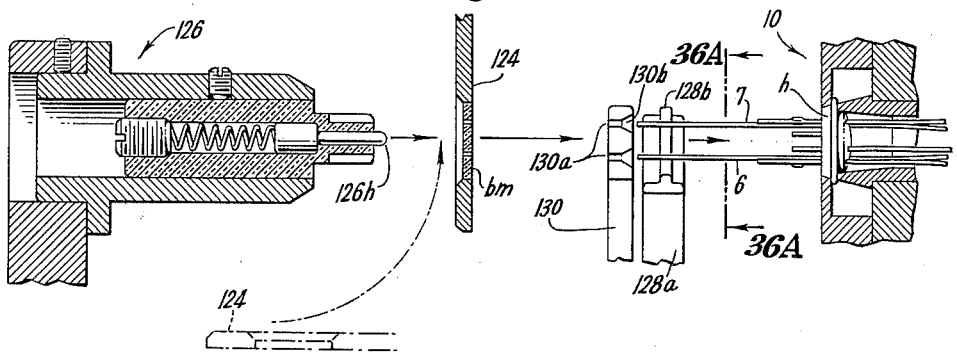
Figure 36A:
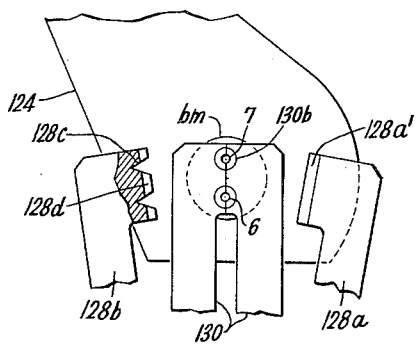
Figure 37:
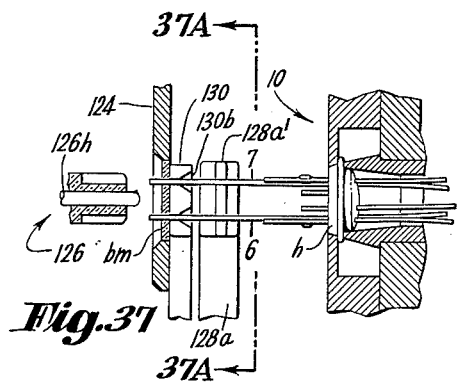
Figure 37A:
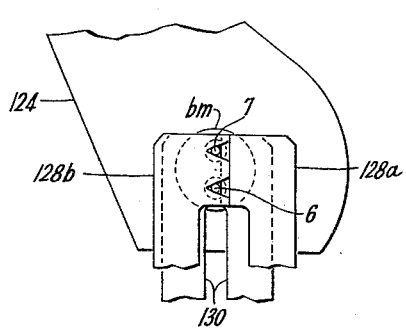
Figure 38:
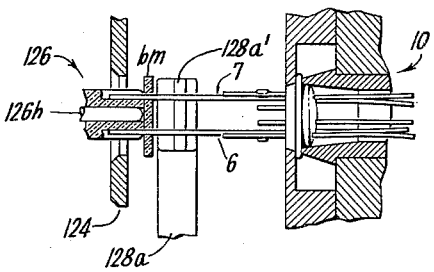
Figure 38A:
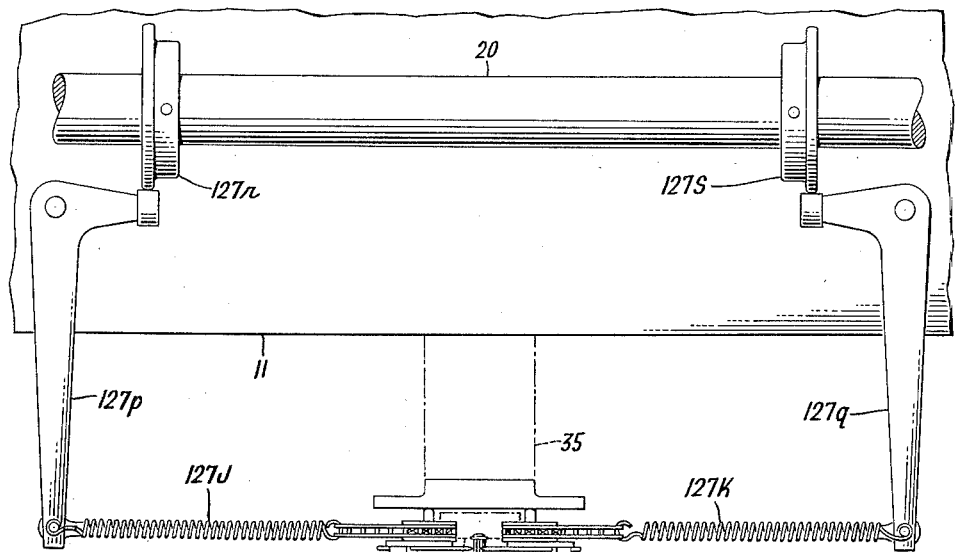
Figure 38B:
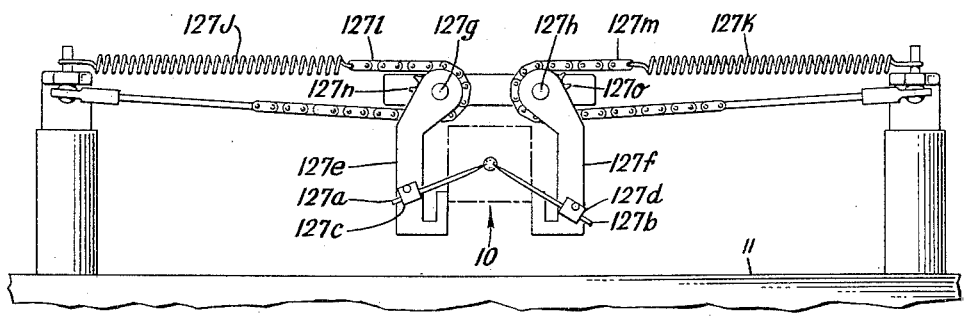
Figure 38C:
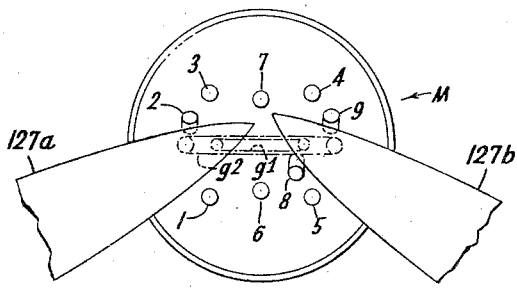
Figure 43:
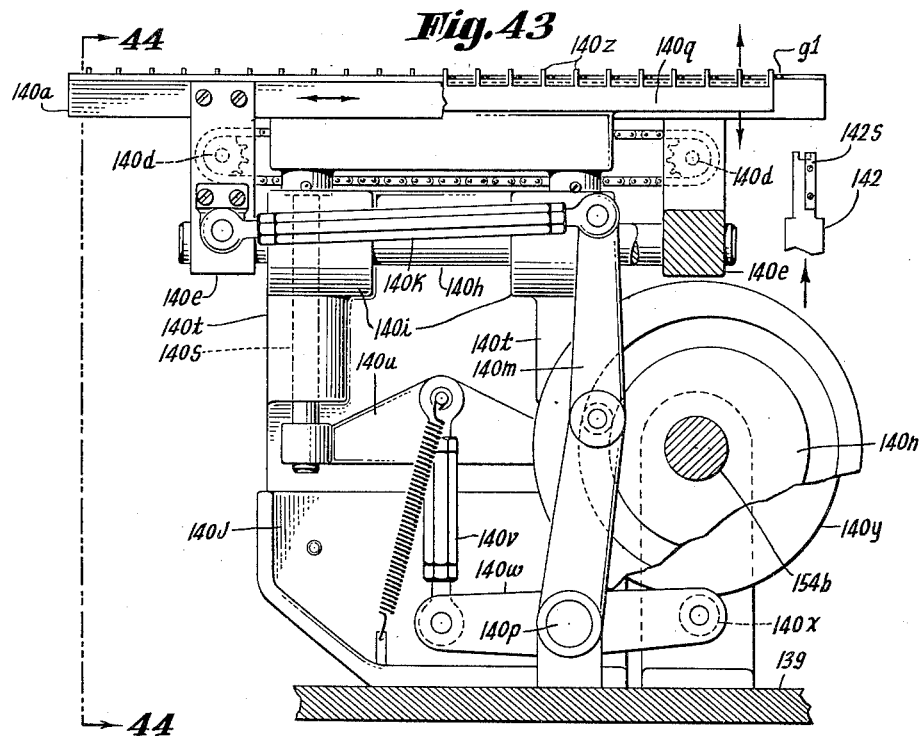
Figure 44:
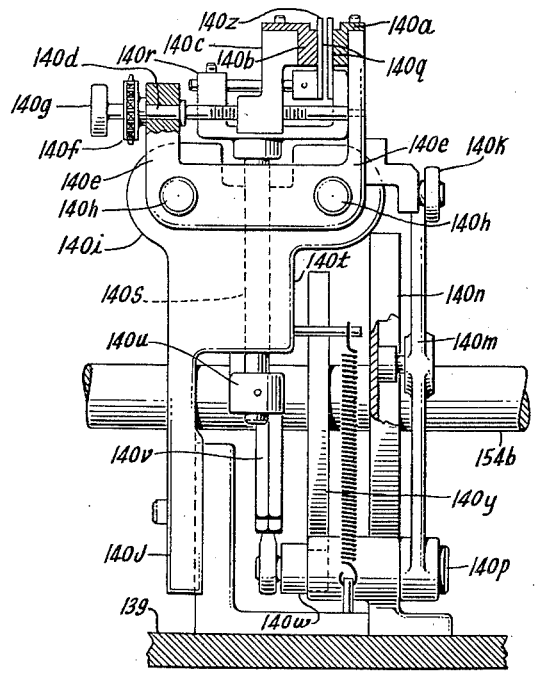
Figure 45:
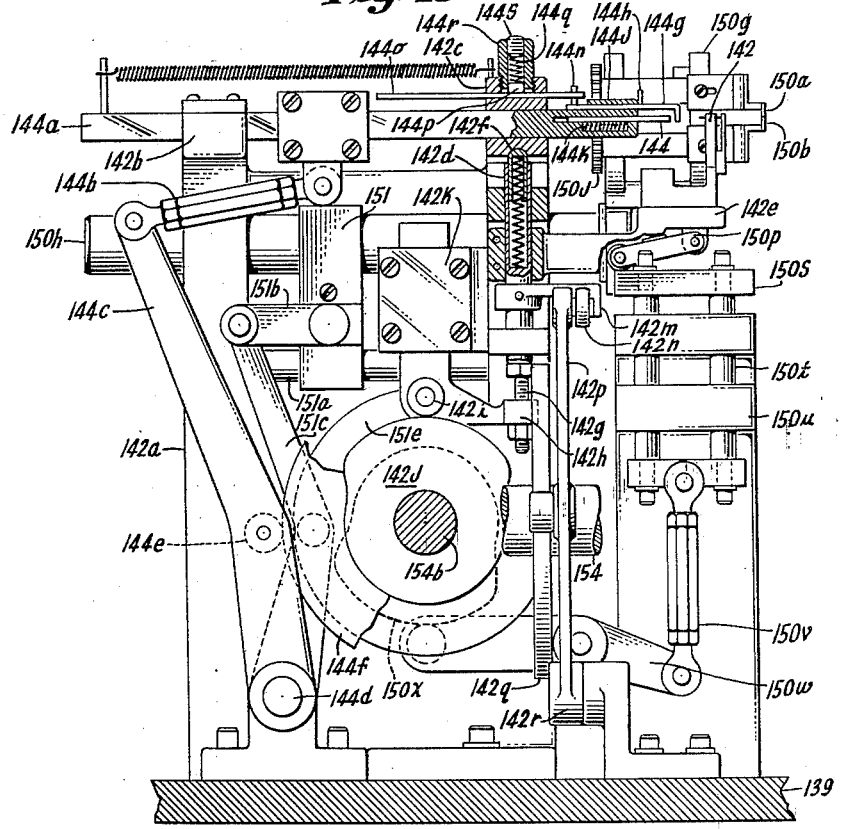
Figure 46:
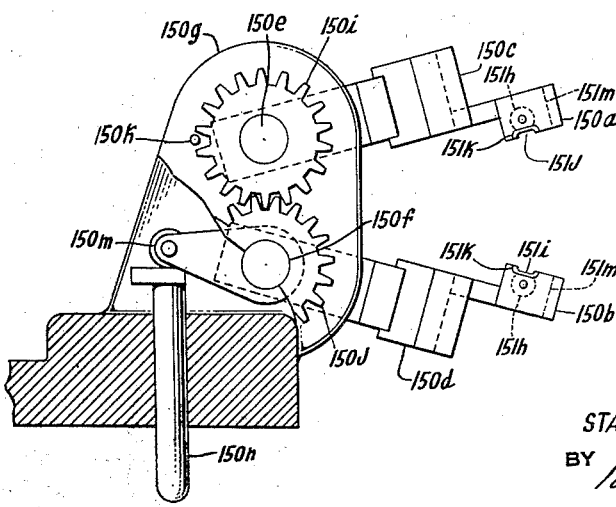
Figure 55:
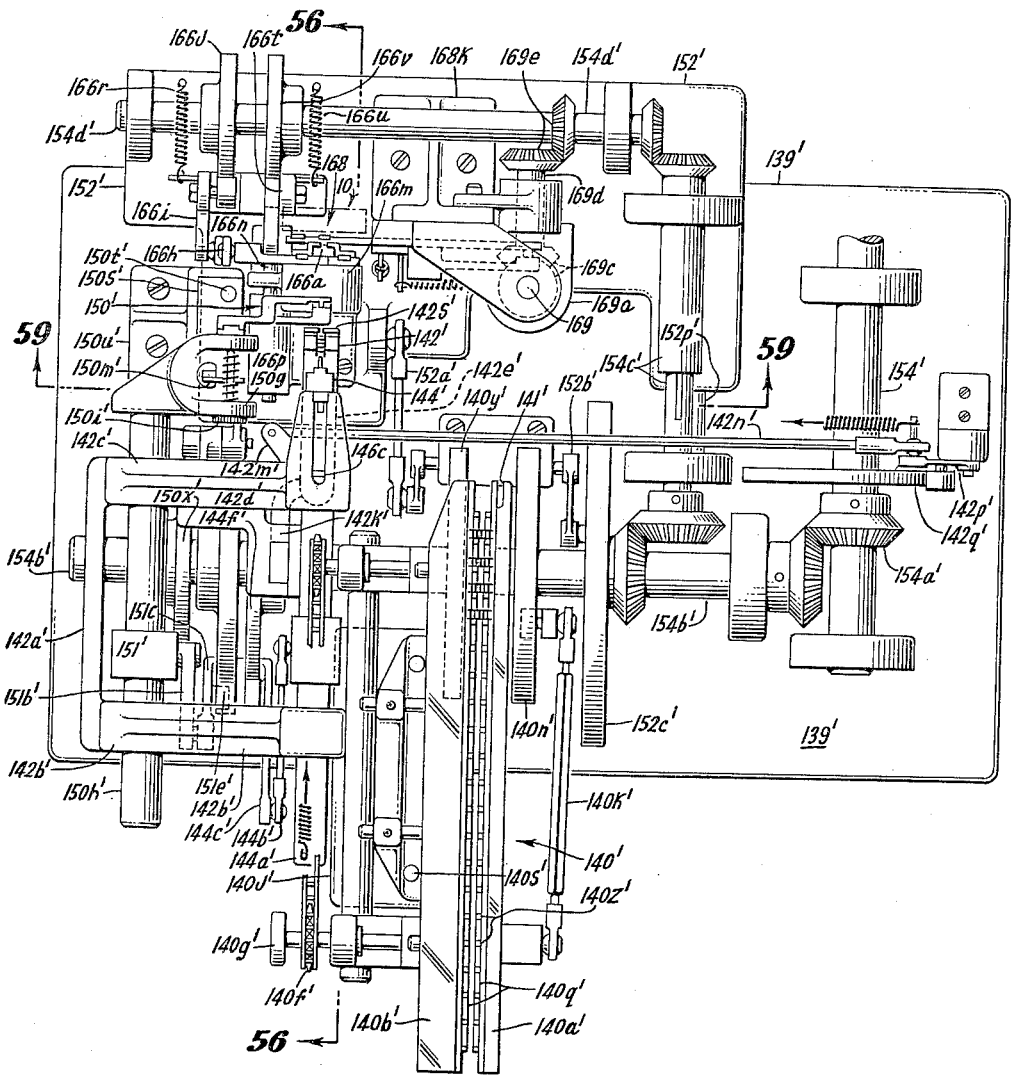
Figure 56:
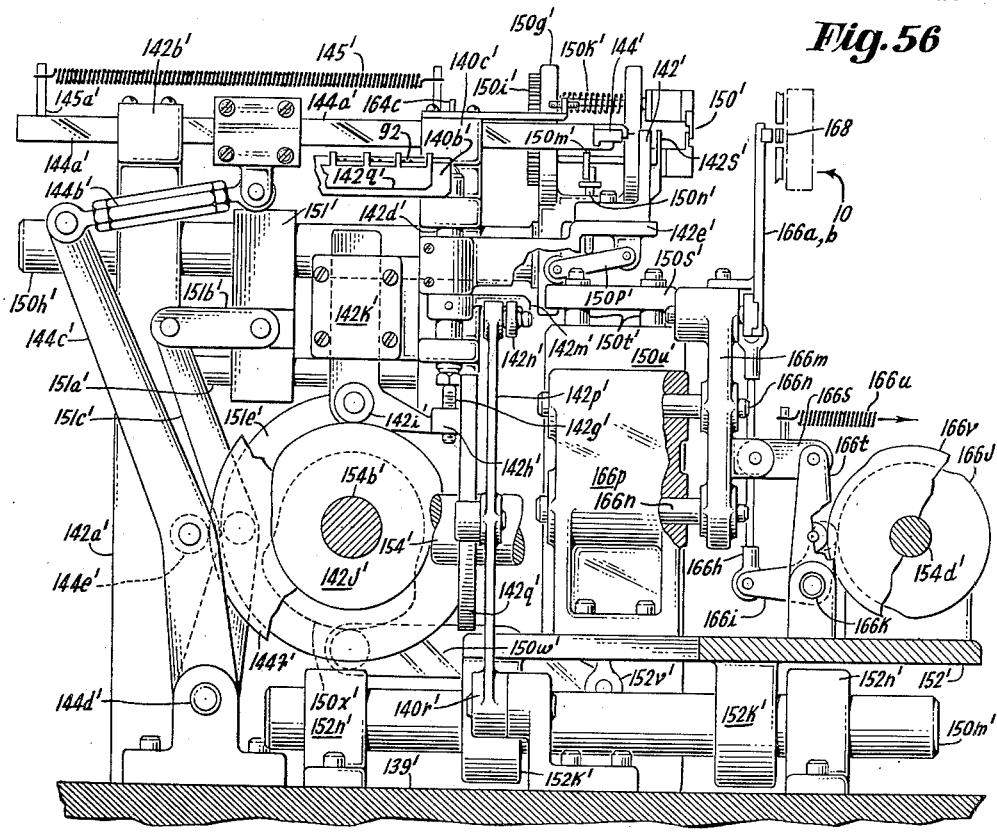
Figure 57:
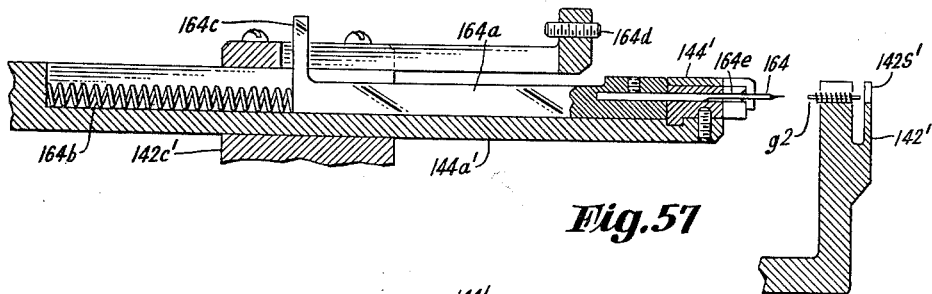
Figure 58:
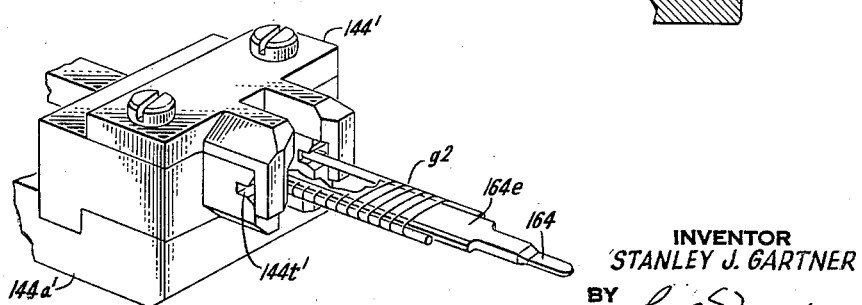
Figure 59:
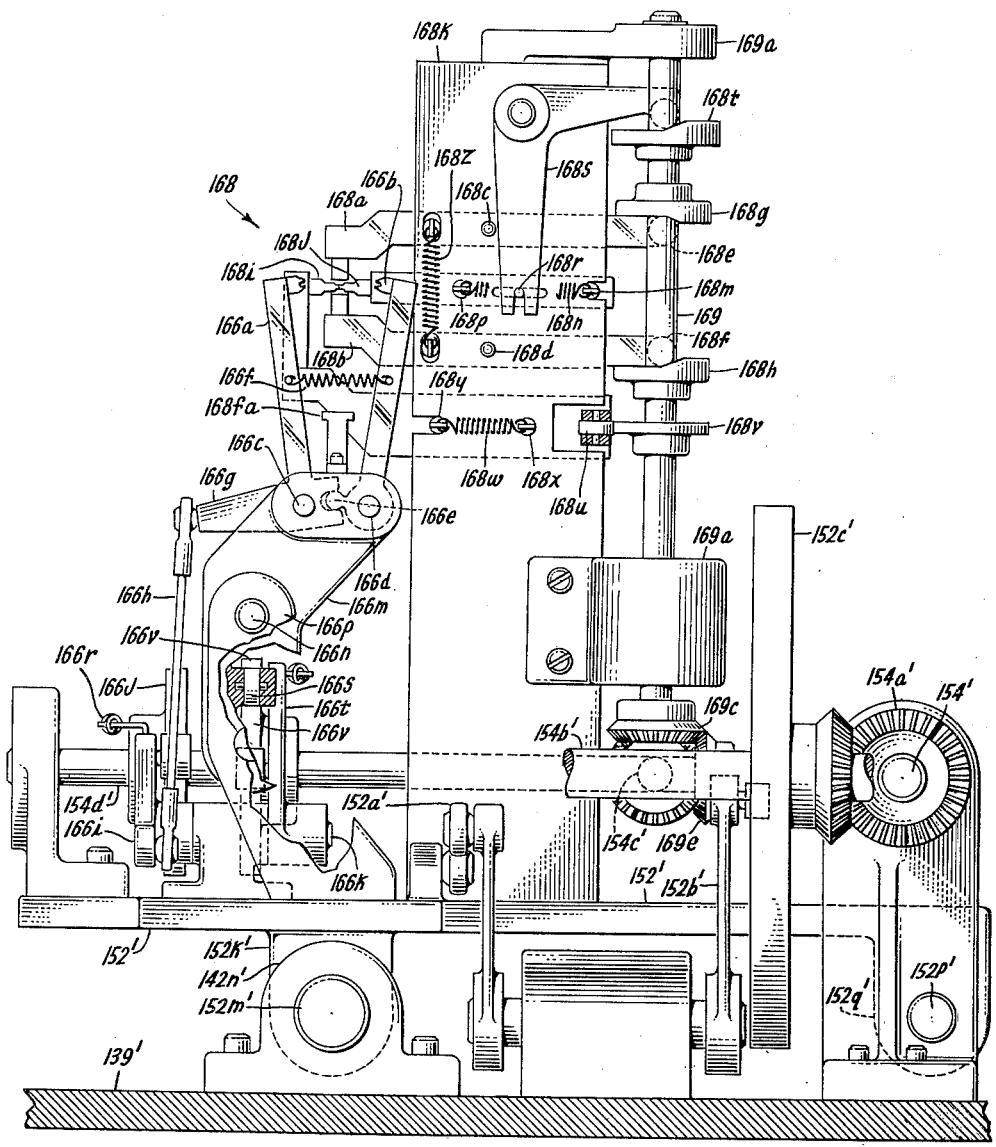
Figure 61D:
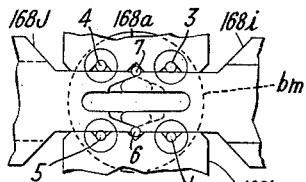
Figure 61:
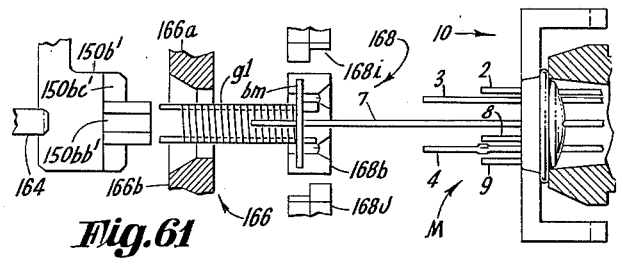
Figure 61A:
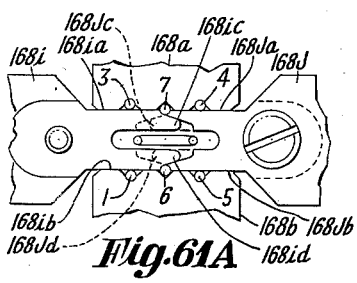
Figure 62:
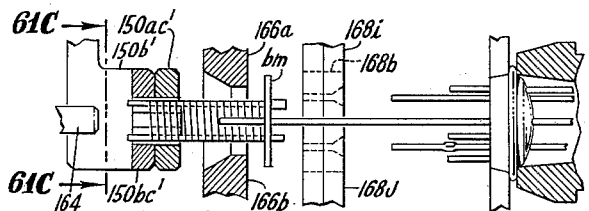
Figure 61B:
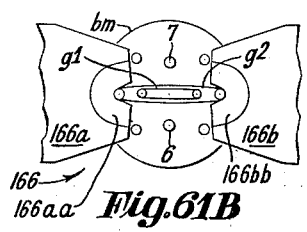
Figure 63:
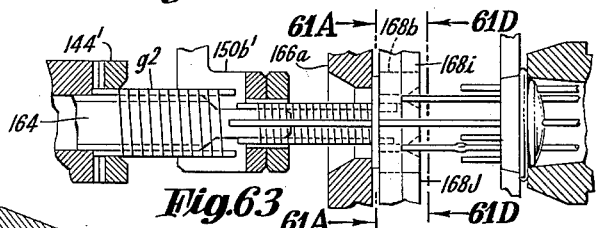
Figures 61C, 65:
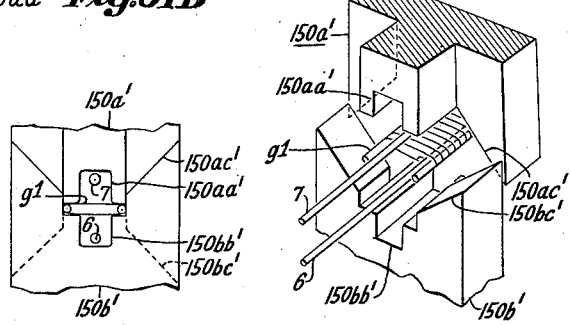
Figure 64:
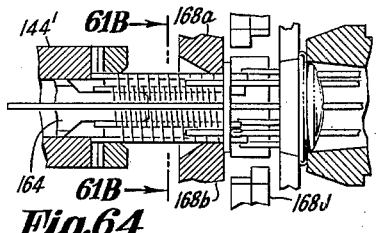

13—13 of FIG. 12 and looking in the direction of the arrows;

FIG. 14 is an elevation, substantially as viewed from the line 14—14 of FIG. 11 showing the operating mechanisms for moving the combing and gathering tools at the lead-trimming station;

FIG. 15 is a greatly enlarged diagrammatic view, as seen from the stem block at the lead-trimming station B, showing details of the combing and gathering tools as partially engaged with the projecting leads of a stem shown in cross-section;

FIG. 16 is an enlarged elevation, with parts in section, showing the tools of FIGS. 11 through 14 engaged about the projecting stem leads or wires immediately adjacent the molded base of the stem preparatory to the combing operation, together with the cutting die that is shown along a thrust path spaced from the free extremities of the uncombed leads;

FIG. 16A is a view taken along the line 16A—16A of FIG. 16, showing the combing and gathering tools following the partially retracted position of FIG. 15 and fully engaged about the leads;

FIG. 17 is a view somewhat similar to FIG. 16 but showing the combing and gathering tools at the end of their combing stroke away from the stem block and prior to being withdrawn, the cutting die having advanced over the patterned ends of the leads;

FIG. 18 is a view showing the final stage of operation at the lead-trimming station B in which the combing and gathering tools have been withdrawn, the cutting die has advanced to the end of its forward stroke toward the stem block, and the jaws of the stem block have opened to permit rotational orientation of the stem block by the advanced cutting die;

FIG. 18A is an elevation in section along the line of 18A—18A of FIG. 18 and looking in the direction of the arrows, with parts broken away and in section, showing opposed cutters in operative position for cutting predetermined leads of the stem to various lengths, the retracted positions of the opposed movable cutters being shown by the dot-dash lines;

FIG. 19 is a fragmentary plan view of the operating mechanisms and general arrangement of the lead-swaging station C of FIG. 1A;

FIG. 20 is an elevation illustrating portions of the mechanism in FIG. 19, showing the respective operating mechanisms for combing and swaging tools;

FIG. 21 is a fragmentary elevation of the tools and operating mechanisms of FIG. 19, drawn to larger scale, with the combing tools advanced on the leads of the supported stem;

FIG. 22 is an enlarged perspective view, with parts broken away and sectioned, showing the gathering and combing tools of FIG. 19 separated and with a detecting finger interposed therebetween;

FIG. 23 is a plan view of a stem block, shown supporting a stem with the leads cut to various lengths to be worked on at the station C, with the swaging tools of FIG. 19 spaced apart and in position to advance on selected leads of the stem, and with the combing and gathering tools separated and trailing the swaging tools;

FIG. 24 is a view similar to FIG. 23 but at a later time in the cycle showing the combing and gathering tools engaged about the longest length leads in a position to be advanced end-wise along a predetermined thrust path over the intermediate length leads, the swaging tools being disposed at offset locations prior to advance transverse of the stem axis;

FIG. 25 is a view similar to FIG. 24 near the end of the cycle showing the combing and gathering tools advanced over the intermediate length leads, the swaging tools in engagement with the leads to be swaged, and the jaws of the stem block separated by the jaw-opening wedges so that the stem is supported by the advanced combing and gathering tools;

FIG. 26 is a sectional view taken along the line 26—26 of FIG. 25 looking in the direction of the arrows and showing the swaging tools engaging certain leads of the stem;

FIG. 27 is a plan view, with parts broken away, showing the general arrangement and operating mechanisms at the bottom mica applying station D of FIG. 1B;

FIG. 28 is an elevation in cross-section taken generally along the line 28—28 of FIG. 27, with parts broken away;

FIG. 29 is a fragmentary view in section taken substantially along the line 29—29 of FIG. 28 and looking in the direction of the arrows showing portions of the mica-thickness detecting mechanisms;

FIG. 30 is a fragmentary elevation partly in section taken substantially along the line 30—30 of FIG. 27 and looking in the direction of the arrows, with parts broken away;

FIG. 31 is a fragmentary elevation of part of the mechanism in FIGS. 27 and 28 showing pusher unit and operating mechanism for displacing a bottom mica from the transfer member;

FIG. 32 is an elevational view of part of the mechanism in FIGS. 27 and 28 with parts broken away and sectioned, showing the details of the mica transfer mechanism;

FIG. 33 is an enlarged cross-sectional elevation, this view showing the details of the mica-piercing punches forming part of the mechanism in FIGS. 27 and 28 and their relative position with respect to the mica-transfer member, the male die being shown in retracted position prior to mica piercing;

FIG. 34 is a view similar to FIG. 33 showing the mica after being transferred into the transfer blade and during piercing by the punch;

FIG. 35 is a greatly enlarged plan view of a pierced mica;

FIG. 36 is an enlarged fragmentary view of portions of the mechanism in FIGS. 27 and 28, with a transfer blade shown in solid lines in one position and in broken lines in another position;

FIG. 36A is an elevational view taken along the line 36A—36A of FIG. 36 and looking in the direction of the arrows showing the preliminary gathering and combing tools separated and with the fine gathering or combing tools in closed position;

FIG. 37 is a view similar to FIG. 36 showing the cycle advanced to the point where the transfer member applies a mica over the oriented leads, the respective sets of combing and gathering tools being displaced toward the stem block;

FIG. 37A is a view similar to FIG. 36A taken along the line 37A—37A in FIG. 37 showing the preliminary orienting tools in the closed position;

FIG. 38 is a view similar to FIG. 37 but at the end of the mica applying stroke and showing a set of combing and gathering tools removed, with the mica pusher having freed the mica from the transfer member;

FIGS. 38A, 38B, 38C show a mechanism adjacent station D in FIG. 1B for bending short-length leads of the stem where necessary to permit unimpeded insertion of grid side-rods, wherein FIG. 38A is a plan view of the mechanism, FIG. 38B is an elevational view of FIG. 37, and FIG. 38C is a greatly enlarged elevation showing parts of the tools of the clearance mechanism engaged between leads of the mount, the desired ultimate grid positions being represented by the dot-dash lines;

FIG. 39 is a plan view of the No. 1 grid-assembling station E of FIG. 1B, showing the general arrangement and operating mechanisms;

FIG. 39A is a plan detail of FIG. 39, partly in section, showing the pusher unit and its operating mechanism and drawn to larger scale than FIG. 39;

FIG. 40 is an elevation of portions of the mechanism in FIG. 39 with parts sectioned, showing the details of the grid-stop former and grid stop transferring and welding mechanisms;

FIG. 41 is an enlarged fragmentary sectional detail of parts of FIG. 40 at a later time in the cycle, showing the grid stop former at the completion of the formation of a stop, as received in the welding tips;

FIG. 42 is a fragmentary perspective of the male stop-former die-part of FIG. 41;

FIG. 43 is an elevational view, with parts broken away and sectioned, showing details of the grid-feeding mechanism of FIG. 39 for successively delivering grids for assembly in the No. 1 grid station E;

FIG. 44 is an elevation in section substantially along the line 44—44 of FIG. 43 and looking in the direction of the arrows;

FIG. 45 is an elevation showing a portion of the mechanism in FIG. 39, with parts shown broken away and in section, including details of the oscillating cradle for transferring the No. 1 grid from the feed mechanism, detailed in FIGS. 43 and 44, to the mount;

FIG. 46 is an elevation showing the two-part guide and its operating mechanisms in FIG. 39 which are effective to guide the No. 1 grid during its assembly to the partially completed mount;

FIG. 47 is an elevation showing the two-part grid-guide and operating mechanism viewed from the right of FIG. 46;

FIG. 48 is an enlarged fragmentary detail showing the two-part guide in open position, viewed from the right of FIG. 47;

FIG. 48A is a sectional view taken substantially along the lines 48A—48A of FIG. 48 and looking in the direction of the arrows;

FIG. 49 is an elevation showing elements of FIG. 39, with parts broken away and sectioned, showing a stem carrying a bottom mica in position to receive a grid substantially at the start of a grid-inserting cycle;

FIG. 50 is a simplified plan view of the elements of FIG. 49;

FIG. 51 is a view similar to FIG. 50 at a time later in the cycle when the grid inserter has advanced upon and received a grid carried by the transfer member, the grid stop transferring and welding unit having advanced across the thrust path of the grid in its path to its operative position behind the bottom mica;

FIG. 52 is a plan view of the parts in FIG. 51 at a time later in the cycle when the grid inserter has picked up a No. 1 grid and delivered the same through the two-part guide arranged adjacent the outer face of the bottom mica, the grid-stop transfer and welding mechanism having advanced to a new position;

FIG. 53 is a plan view of the parts of FIG. 52 at a time later in the cycle showing the grid stop transfer and welding mechanism after it has arrived at the operative position where the grid stops surrounds a grid side rod in welding position;

FIG. 54 is an elevational view, looking from the stem to the left in FIG. 53, showing the grid-stop transfer and welding mechanism supporting a grid stop around a side rod of the assembled No. 1 grid;

FIG. 55 is a plan view of the No. 2 or second grid assembling station F of FIG. 1B showing the general arrangement and operating mechanisms;

FIG. 56 is a sectional view, with parts broken away, taken substantially along the line 56—56 of FIG. 55 and looking in the direction of the arrows;

FIG. 57 is an enlarged fragmentary elevation of parts of FIG. 56, partly sectioned and broken away, showing the No. 2 grid inserter in operative position retracted from the No. 2 grid transfer member;

FIG. 58 is a perspective view of the grid inserter shown supporting a No. 2 grid, greatly enlarged;

FIG. 59 is an elevation, shown with parts broken away and in section, taken substantially along the line 59—59 of FIG. 55;

FIGS. 60, 61, 62, 63 and 64 are enlarged progressive views of parts of FIG. 56 illustrating insertion of the No. 2 grid and advance of the subassembly of the bottom mica and the grids to its end position on the stem wires;

FIG. 61A is an elevation, as viewed substantially from the line 61A—61A of FIG. 63 and looking in the direction of the arrows, showing the set of stem-wire gathering tools engaged about the intermediate length stem leads;

FIG. 61B is an elevation, as viewed from the line 61B—61B of FIG. 64 showing another set of tools engaging the No. 2 grid side rods in the final assembled position;

FIG. 61C is an elevation, as viewed from the line 61C—61C of FIG. 62 and showing the left hand set of guide jaws engaged about the trailing end of the No. 1 grid;

FIG. 61D is an elevation, as viewed from the line 61D—61D of FIG. 63 and looking in the direction of the arrows showing the right hand set of jaws engaged about the intermediate length leads, but looking away from the mount;

FIG. 65 is an enlarged perspective view of the tools in FIG. 61C but with the tools partly open.

Figures 66, 67:
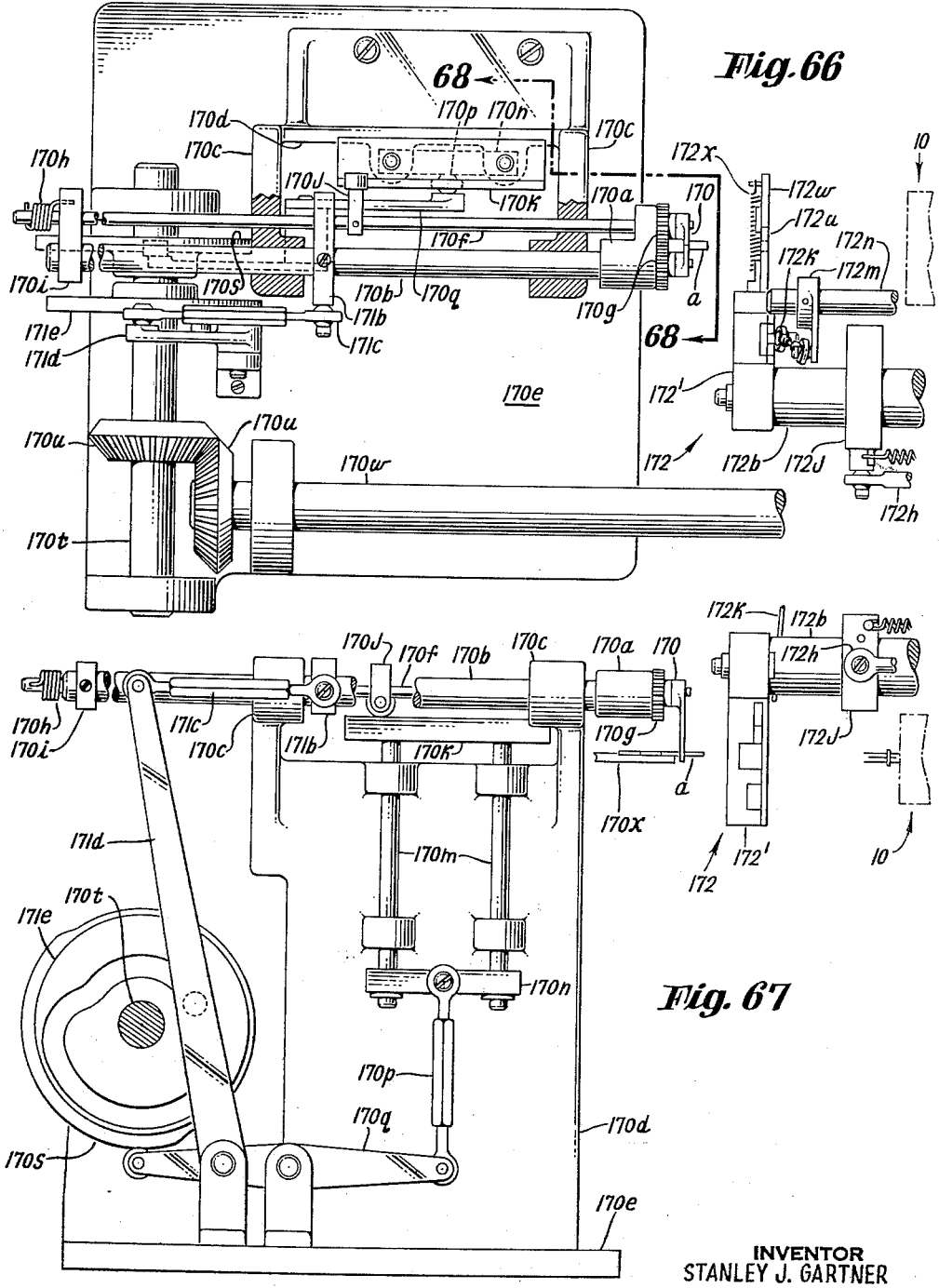
Figure 71:
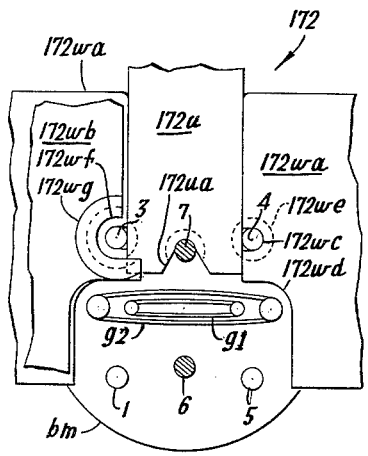
Figure 71A:
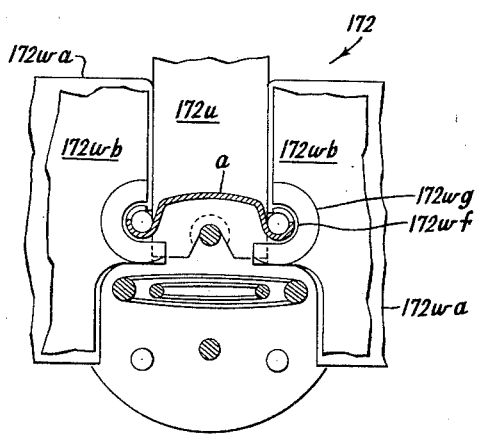
Figure 73:
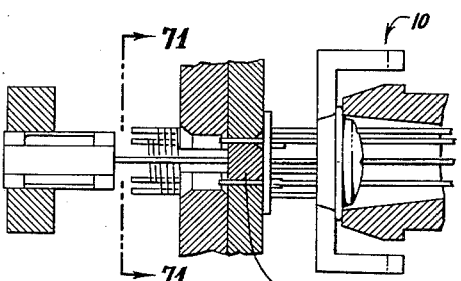
Figure 74:
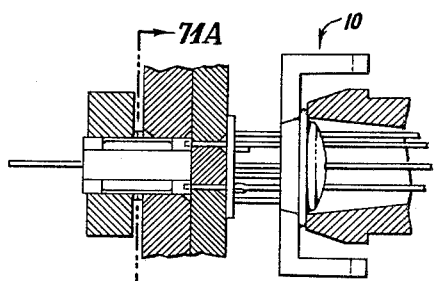
Figure 70A:
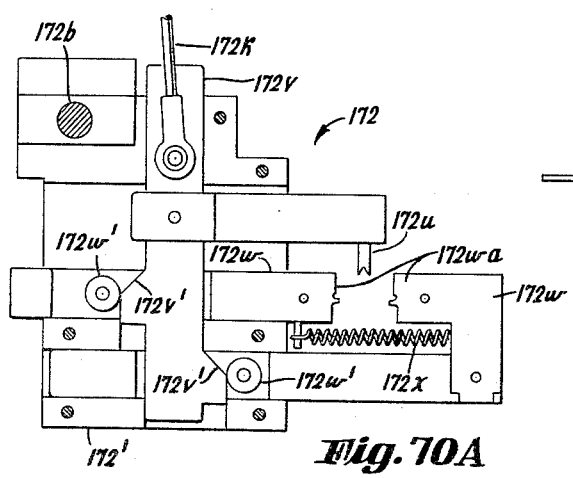
Figure 96:
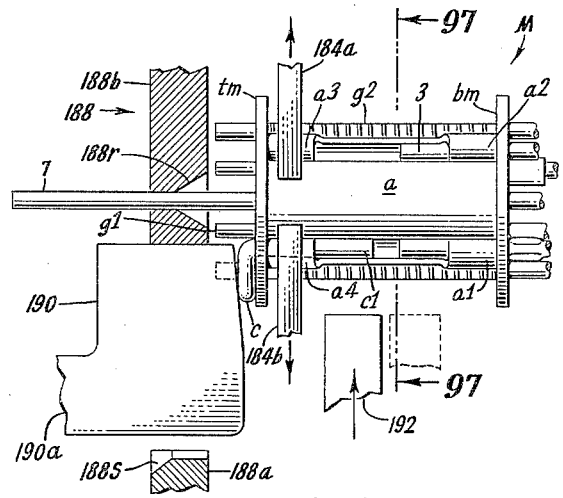
Figure 97:
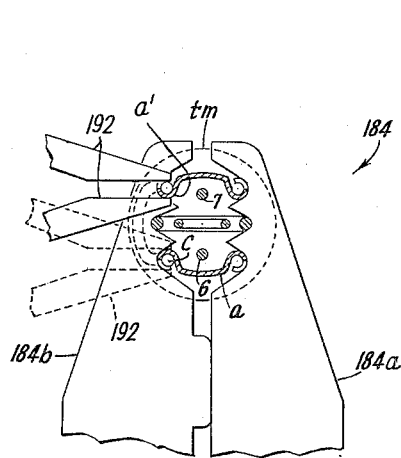
Figure 98:
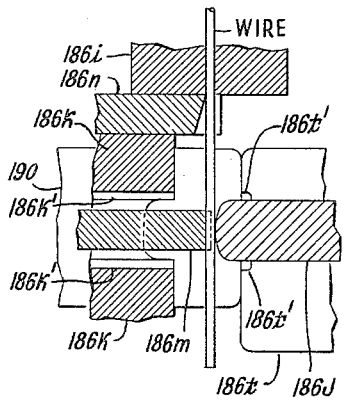
Figure 99:
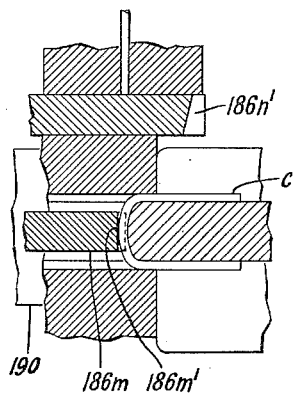
Figure 100:
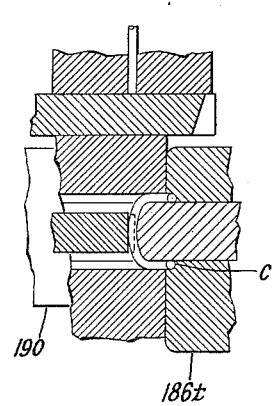
Figure 101:
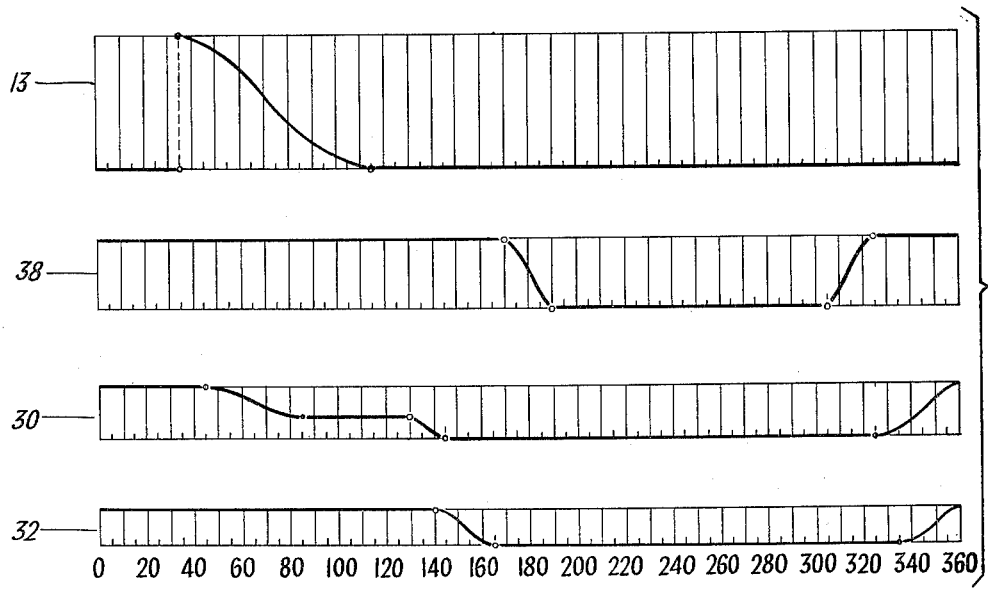
Figure 110:
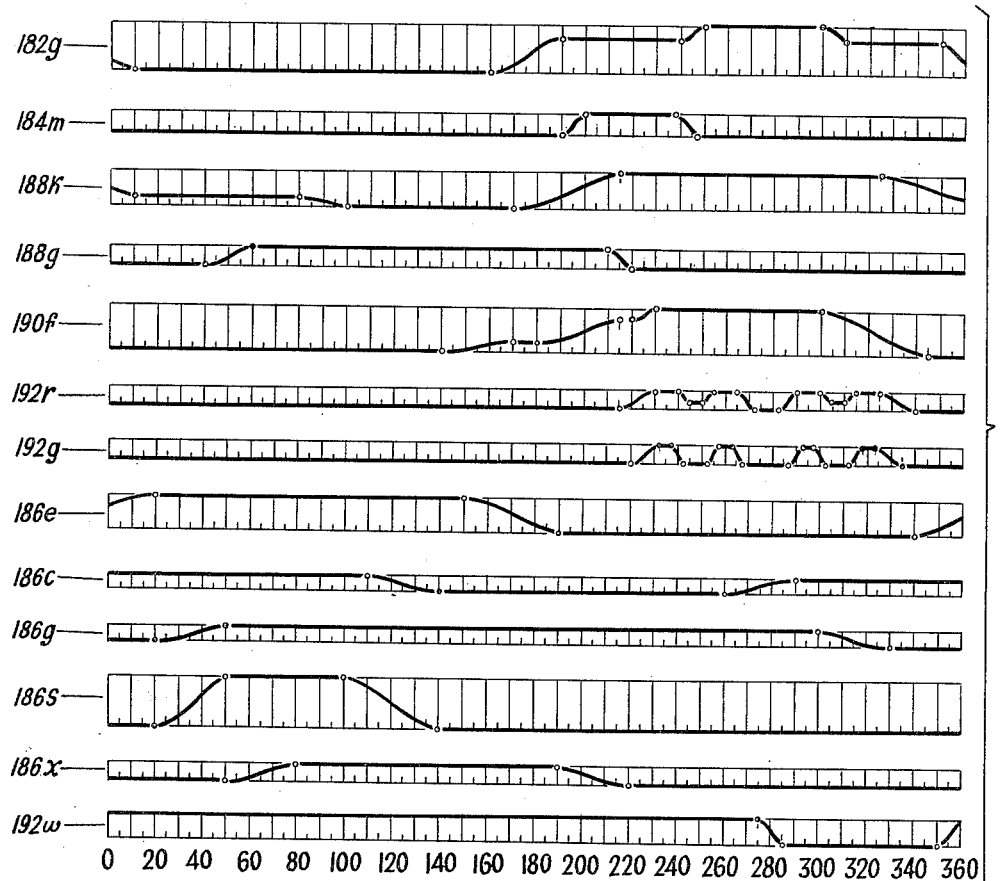
Figure 110A:
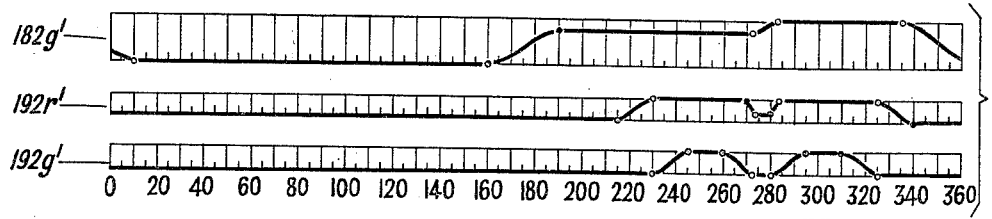

FIG. 66 is a fragmentary plan view, partly in section, of the anode applying mechanism in station G of FIG. 1B;

FIG. 67 is an elevation of the mechanism in FIG. 66, with part of the drive mechanism removed;

FIG. 68 is a detail elevation, partly in section along the line 68—68 in FIG. 66;

FIG. 69 is an elevation, partly in section, of the mechanism extending to the right of FIG. 67;

FIG. 70 is an elevation of the mechanism in FIG. 69 looking to the right and omitting parts 170 shown in FIG. 69;

FIG. 70A is a cross-section along the line 70A—70A in FIG. 69 but drawn to larger scale, showing a tool head with the rear cover removed;

FIG. 71 is an enlarged fragmentary elevation looking to the right from the plane 71—71 in FIG. 73;

FIG. 71A is an enlarged fragmentary elevation, partly in section along the line 71A—71A in FIG. 74;

FIGS. 72, 73, 74 and 75 are enlarged cross-sectional plan views of the stem block and the anode assembling tools in FIGS. 66–70, 70A and 71A;

FIG. 76 is a fragmentary plan view showing portions of the mechanism of the top mica-applying station I of FIG. 1B;

FIG. 77 is an enlarged fragmentary elevation viewed from the line 77—77 of FIG. 81, showing the details of one set of gathering jaws at top mica station I;

FIG. 78 is an enlarged elevation viewed from the line 78—78 of FIG. 80 showing the set of gathering tools of FIG. 77 in open position, and showing an additional set of gathering tools at the top mica station;

FIG. 79 is an elevation of the mechanism in FIG. 76 omitting the pusher unit 126';

FIG. 80 is an enlarged plan view of the tools in the top mica station I, together with a stem block carrying a partially completed mount having two anode parts, two concentric grids and a bottom mica assembled on a stem;

FIGS. 81, 82 and 83 are progressive enlarged plan views similar to FIG. 80 at successive times later in the top mica applying cycle;

FIG. 84 is an enlarged fragmentary elevation looking from the line 84—84 of FIG. 81 in the direction of the arrows;

FIG. 85 is an elevation of the mechanism as seen from the left in FIG. 79;

FIG. 86 is a plan view, with parts broken away and sectioned, showing the general arrangement and operating mechanisms for the connector forming and applying station J of FIG. 1A, for forming a U-shaped wire part with an off-set bight and for inserting into the anodes and driving it against the top mica;

FIG. 87 is an elevation as viewed substanially from the line 87—87 of FIG. 86, with parts broken away and sectioned, showing the details of the operating mechanisms for the gathering and welding tools and the connector ram;

FIG. 88 is an elevation, being a cross-section taken along the line 88—88 of FIG. 87, with parts broken away;

FIG. 88A is a fragmentary detail, somewhat enlarged, showing the transfer jaws appearing in FIG. 88;

FIG. 89 is an elevation of portions of the mechanism in FIG. 86 showing details of the wire-feeding mechanism for the anode-connector former (not shown), the gathering tools, and welding mechanism;

FIG. 90 is a sectional view taken substantially along the line 90—90 in FIG. 89, and showing details of the feeding mechanism but omitting certain details;

FIG. 91 is an enlarged fragmentary detail of the structure within the dot-dash circle of FIG. 90;

FIG. 92 is an elevation, with certain parts in section, showing the detail of anode-connector forming tools and their operating mechanisms;

FIGS. 93, 94, 95 and 96 are greatly enlarged plan views at successive parts of an operating cycle showing the tools for engaging the partially completed mount in a stem block, and the mechanisms for forming and advancing the connector into the anodes and against the top mica, certain parts being shown in broken lines in addition to full-line showing, to represent other positions of the same parts;

FIG. 97 is an enlarged elevation of the section taken substantially along the line 97—97 in FIG. 96, the parts being rotated through a 90° angle so as to appear erect;

FIGS. 98, 99, and 100 are progressive enlarged cross-sections of the connector-forming tools of FIG. 92;

FIGS. 101–110 are timing charts of the mechanisms shown in the preceding figures, wherein the individual time-motion curves are generally identified by the same numerals as are used for the cams producing such timed motions. Among these FIGURES:

FIG. 101 is the timing chart of the conveyor and stem-block operating mechanism of FIGS. 1A and 1B;

FIGS. 102–110 are, respectively, the timing charts of the mechanism in stations A, B, C, D, E, F, G (or H), I and J (or K) designated in FIGS. 1A and 1B;

FIG. 110A is the timing chart of certain mechanism in station J, modified to omit certain operations detailed in the description of station J.

INTRODUCTION

In FIGS. 1A and 1B there is shown the plan view of a conveyor 12 and associated operating mechanisms for assembling a number of electrodes to a stem made up of wires sealed in a glass header $h$. The assembly of the electrodes and the stem is termed a "mount" in the art. Such an assembly may be of various sizes, and the principles here involved will be recognized as applicable to a wide range of designs of mounts and the like. However, the present machine is particularly adapted, by the solution of numerous special problems, to the assembly of mounts of extremely small proportions. The tube used in this illustrative embodiment is a pentode having a two-part anode, a wire or rod suppressor, a screen grid, and a control grid, all of which extend parallel to the length of the tube and are fixed in relative spacing each from the others by an insulating wafer at each end of the electrode assemblies, usually of mica. The particular tube is intended to receive a filamentary cathode that is manually added to the mount after the mount is delivered by this assembling machine. The diameter of the tube being fabricated is the so-called "T-3" size, that is, approximately 3/8" outside diameter of the glass enclosing envelope.

The tube is assembled by commencing with a stem or header that is loaded into a conveyor and is transported step-wise past a series of operating stations A to L inclusive where the header wires are either shaped by cutting and swaging or where one or more of the electrodes and the micas are assembled or welded to produce the completed mount. The extremely small dimensions of the mount being assembled represent a controlling consideration throughout the machine. Thus, the machine itself forms certain of the mount parts in accurate configuration so that the part will be in perfect orientation for assembling and so that, when the sub-assembly leaving one station reaches a succeeding station, the various parts of the sub-assembly will be in accurate position and relative arrangement for the operation at the succeeding station.

In FIG. 1A three stations, A, B, and C are seen where a stem block 10 on the linked conveyor 12 comes to rest successively. At the first station A, glass header $h$ having sealed wires 1 to 9 inclusive, is mechanically loaded on the conveyor in proper position for the further operations in the succeeding stations B and C. Wires 1, 2, 3, 4, . . . 8, 9, extend from the wafer header $h$ in particular positions appropriate for succeeding operations which are effected at further stations during the travel of the conveyor between the stem-loading and un-loading positions A and L.

By loading the stem into the machine with the wires 1 to 9 inclusive of equal length and longer that the longest wire needed, it becomes possible to trim the wires to lengths required during further assembly operations, all accurately in relation to a common reference, namely, the wafer header $h$. In the final part of the conveyor's traverse, there is seen a mount completed by this machine. This includes a bottom mica $bm$ spaced accurately from the header $h$. The location of the bottom mica $bm$ is established partly by the wires 2, 8 and 9 cut short and having their ends defining a plane against which the bottom mica is pressed. Additionally, leads 1 and 4 (which extend through the bottom mica $bm$ for connection to the two anode plates) have swaged abutments at the plane of cut leads 2, 8 and 9 for supporting the bottom mica $bm$.

By loading an uncut and unswaged stem into the stem loading station A, it becomes possible to cut certain leads to critical lengths at a further station, and at a still further station to swage accurately located shoulders on certain leads, thereby defining the bottom mica plane. This may be accomplished with the assurance that, although the trimming and swaging are effected at different stations, the operations are consistently related to each other by the accurate orientation of the stem at each of the stations, both as to the end-wise positioning of the wire and as to the wire pattern presented at each station to the operating tools.

Wires 6 and 7 ultimately serve as suppressor electrodes, and are also utilized to support and connect the filamentary cathode. At the cutting or trimming station B, leads 6 and 7 remain uncut and are of the same full length as when received in the stem loading station A; but two other sets of leads are trimmed to different lengths, specifically leads 2, 8 and 9, are trimmed to very short lengths equal to the spacing between the glass header $h$ and the bottom mica $bm$, and leads 1, 3, 4, and 5 disposed in an approximately square pattern, are trimmed to a medium length such as to penetrate the bottom mica $bm$ and extend part way toward the top mica $tm$.

In station C, two of the medium length leads namely 1 and 4, are swaged to provide a shoulder or abutment at the same separation from the header $h$ as the ends of wires 2, 8, and 9. The position of the swaged shoulders S and the cut ends of the wires 2, 8, 9 are all of a high order of accuracy because of the accurate grip of header $h$ in a stem holder and the holder is located precisely at each station in the machine. It is an important feature that the header $h$ is seated in its holder and is maintained in a very definite fixed plane in its traverse through the machine from station to station, and further that each of the wires, 1 to 9 inclusive, remains in a very accurately established position endwise and transversely. It will be seen that in some of the stations the accuracy of the positioning of these wires and their pattern is reestablished and carefully readjusted.

It will be understood that the header $h$ as formed in a stem molding machine carries the wires 1 to 9 in a pattern whose accuracy and consistency is limited, considering the requirement of stem molding dies that the wires should be loosely received; and because automatic assembling of a mount must not be impeded by variations in the pattern or distribution of the wires, stations A, B and C of the present machines are adapted to receive wire patterns of coarse tolerance and adjust the pattern of wires to close tolerance, before other parts are assembled.

In station D, the bottom mica $bm$ is applied to wires 6 and 7 and pushed part way down the lengths of these wires but not to the final position where it is pierced by medium length wires 1, 3, 4 and 5 and rests against the ends of short wires 2, 8, and 9, and the swaged shoulders S of the wires 1 and 4.

At the bottom mica-applying station D (see FIG. 1B) an important principle of the machine is utilized further and again illustrated. The accurately oriented wires whose positions are fixed in the stem-loading station A and adjusted in both the cutting and swaging stations B and C are to receive a bottom mica having a pattern of holes. The machine itself forms the holes immediately prior to application of the bottom mica to the wires. Thus the holes which are to be penetrated by the uncut reference wires 6 and 7 are in the proper positions and relative spacing to assure that the bottom mica $bm$ can be mechanically thrust against the wire ends, in alignment with the corresponding holes. The remainder of the holes are accurately distributed to receive the medium length wires 1, 3, 4 and 5 that were correspondingly accurately adjusted in the previous stations B and C. These wires penetrate mica $bm$ at a later station when mica $bm$ is pressed against stops provided by the ends of short leads 2, 8, and 9.

At this station D a further mechanism is included for shifting the short wires to definite positions, when necessary, so that such wires will assuredly not obstruct the side rods of grids that are later inserted.

In the next station E (with the bottom mica $bm$ supported in its intermediate position along the uncut reference wires 6 and 7) a grid $g1$ is inserted into two of the holes of the bottom mica which are properly located for receiving the grid side rods. This is effected by accurate orientation of the wires 6 and 7, which act in turn to carry the pierced bottom mica into accurate position for receiving those side rods. Since the bottom mica $bm$ is perforated in the machine, specifically at the station D, no precaution is required to prevent inversion of the hole pattern such as might occur if the bottom mica were formed separately and subsequently loaded into this assembling machine. Thereafter, at station E, a metal sleeve, or grid stop $gs$ is formed in the machine and applied to the end of a side rod of grid $g1$ that projects through the bottom mica, to hold the grid $g1$ firmly against the bottom mica $bm$. This grid stop is welded to one of the side rods of the grid $g1$ at the underside of the bottom mica $bm$. The sleeve $gs$, is extremely tiny, when it is borne in mind that the bottom mica $bm$ is of the order of ¼" in diameter. The grid stop is not handled as a separate part but is cut, formed, applied, and welded, entirely within station E. The spacing provided between header $h$ and the bottom mica ($bm$ in its preliminary position facilitates the assembling and welding operations. Later, when the bottom mica $bm$ is advanced to its final position, there is little clearance for application of welding tools.

The other side rod of grid $g1$, extending through the bottom mica $bm$, ultimately is disposed close to short wire 9 which terminates at the lower face of the bottom mica $bm$; and in a welding step expediently effected manually, that side rod is joined to wire 9 which constitutes the lead conductor for the #1 grid in the finished, sealed tube.

At the next station F, a second grid $g2$ is mounted coaxially of and around $g1$ and the side rods of the grid $g2$ are forced through the accurately located holes in bottom mica $bm$; and then the subassembly of grids $g1$ and $g2$ and bottom mica are advanced to their final position with the bottom mica in the assembly plane defined by short wires 2, 8 and 9, and abutting against the swaged portions S of medium length leads 1 and 4.

In the grid-applying stations E and F the bottom mica $bm$ is in its intermediate position during the insertion of each of the grids $g1$ and $g2$. After the grids have been inserted, the bottom mica $bm$ is finally seated. In the next following stations G and H two portions of a two-part anode may be successively thrust into position on opposite sides of the grids $g1$, $g2$ and against the accurately located bottom mica. The two part anode includes a front part $a$ on leads 3 and 4, and a second part $a$ on leads 1 and 5.

In station I a top mica $tm$ is pierced and applied to the long wires 6 and 7 as was the bottom mica $bm$ in station D. In the following stations J and K, wire straps or "hairpins" are formed and inserted for interconnecting the two parts $a$ of the anode, and to hold the top mica $tm$ in place against the top edges of the anode parts. Finally, in the station L of the machine, the excessively long, previously uncut reference wires 6 and 7 are trimmed to a desired length, and the assembled mount is unloaded from the machine.

A further principle will be seen, applied repeatedly in various stations of the machine. In loading the stem into the stem blocks at the station A, the relatively fixed pattern of wires at the locations where they emerge from header $h$ is used as a reference. In stations B and C where the wires are cut and swaged, and in the other stations where the uncut or "long" wires and electrode side rods are held, the possibility exists that any of those long wires or the electrode side rods may be deflected from the reliable pattern defined by the wires closely adjacent the header and/or by the bottom and top micas $bm$ and $tm$. In stations B, C, and D, the long and slender wires extend to unreliable positions at their free ends. The apparatus engages the wires close to the header where the wire pattern may be relied on, and a combing pattern of tool apertures is formed and then moved perpendicularly away from the header $h$ to the position where the cutting die, the swaging die, or the mica-applying head is to engage the previously unsupported and unreliably positioned wire ends. These cutting, swaging and assembling tools then advance along the wires toward the header in a reverse stroke, to reach their final working positions.

THE CONVEYOR AND MAIN DRIVE

Before describing the mechanisms at the several work stations, from the stem loading station A to the final trimming and unloading station L, the novel step-wise conveyor shown in FIGS. 1A and 1B should be properly appreciated. In one respect it might be ideal if the several stem blocks 10 which hold the individual stems at spaces equal to the spaces between the various work stations were part of one rigid disc or turret. In that event, their relative spacings might conceivably be rigidly and invariably fixed. The location of the work mechanisms would then require most remarkable precision, and thermal dimension changes would require special accommodation. In contrast, stem blocks 10 are carried by a link conveyor in the machine described, in a semi-floating condition so that they can be accurately located in each station by mechanism at that station, and to use a linked conveyor, sprocket-supported at its opposite extremities. This concept is applied in my copending application Ser. No. 790,570 filed Dec. 9, 1947. It is of special advantage that a minimum number of strong large links should be used. This minimizes stretching of the links and minimizes the total effect on the conveyor of the looseness and wear at individual pivots, contrasting in this respect from conventional chain conveyors.

Where large links are used, that are wrapped around a pair of spaced drive and guide sprockets, provision should be made for the sprocket shafts to move toward and away from each other as each large link approaches a sprocket, swings around the sprocket, and then leaves. This motion should be minimized to avoid excessive stresses on the conveyor with resulting unreliable positioning of the work holders in the work stations. This sprocket motion is minimized by using an odd number of large links, to insure the presence of one link at only one sprocket, that extends across the line of the two sprocket shafts, while at the opposite sprocket a pair of links form a V-configuration. This condition of a "flat" link at one end and V links at the other changes as the conveyor advances with this V first at one sprocket and then at the other. The arrangement promotes smooth conveyor operation. Because of the large size of the individual links, one of the sprockets is mounted with a yielding bearing permitting sliding movement toward and away from the opposite fixed-shaft sprocket. If a flat link were to pass around a sprocket at one end and a corresponding flat link were to pass around a sprocket at the opposite end, followed by the V-joint between the two links being disposed at one end of the conveyor and a corresponding V-joint at the opposite sprocket, then the yieldably supported sprocket would "bounce" excessively, perhaps to a damaging degree. Also, vibrations would be produced which are undesirable especially in a delicate assembly operation as is here involved.

Accordingly, conveyor 12 is made of an odd number of links, forty-five in the present case, each third link 12a bearing a stem block 10. There are twelve work stations in the machine, with one stem block 10 at each station and with three additional stem blocks in transit around the end sprockets 14 and 16. The end sprocket 16 has a suitable bearing 17 that is horizontally slidable to and from the end sprocket 14, and is spring biased away from sprocket 14, for tensioning the conveyor 12. The conveyor 12 advances step-wise around bed 11. A main drive shaft 18 driven from a motor (not shown) is provided which furnishes power to a suitable intermittent rotary drive transmission 13 (see FIG. 1) effective for indexing sprocket 14 180° at a time followed by idle intervals. A specially desirable form of such intermittent drive transmission 13 for this machine is disclosed in my copending application Ser. No. 294,902 filed June 21, 1952. Since sprocket 14 has six radial sprocket teeth spaced one conveyor link apart, the conveyor advances three links, identified with one stem block, for each advance of sprocket 14. Main drive shaft 18 is geared to continuously rotate horizontal cam shaft 20 continuously and thereby operate a series of control cams to be described, and main drive shaft 18 is also coupled via gearing 22 to rotate a series of vertical drive shafts for furnishing continuous synchronised rotary power for shafts 23 at the various work stations spaced along the conveyor.

Sprocket 14 has a pair of pins 24 which are engaged by a locking detent 26 (see FIG. 1A) for arresting and locating the conveyor in the intervals when the various stem blocks are disposed opposite the several work stations. During sprocket indexing motions, detent 26 is withdrawn by a linkage 28 of any convenient design operated by a cam 30 on continuously rotating cam shaft 20.

The drive mechanism in FIGS. 1A and 1B includes a further pair of cams 32 on cam shaft 20 (see FIG. 2) for rocking levers 34 which, through segmental gears 34a and pinions, 36a, cause rock shafts 36 to oscillate. These rock shafts extend along all the work stations. Their purpose is to operate the clamping mechanisms, to be described, for arresting and accurtaely locating the stem blocks 12 in the several work stations. Additionally, continuously rotating cam shaft 20 furnishes power for mechanically opening the various stem blocks 12 at certain times in the sequence of operations. For this purpose, cam shaft 20 carries a series of cams 33 which, through mechanism that includes cam followers 40 operate jaw opening wedges. The two cam followers 40 seen to the left in FIG. 1A are seen to operate through crank shafts 40′ to actuate the jaw openers in the loading and unloading stations A and L.

The cams shown in FIG 1A appear in end projection in FIG. 2, together wtih an end projection of the locating and jaw-opening mechanism for the stem blocks at the respective stations. As seen in FIG. 2, each cam follower 34 at each station, caused to oscillate by a constrained cam 32 on the common cam shaft 20, operates a segmental gear 34a which in turn oscillates pinions 36a (see also FIGS. 1A and 1B) on rock shaft 36 in bracket 35. A separate pinion 36b is fixed to the shaft 36 at each work station, and operates through a segmental gear 37 and link 36d to oscillate a lever 36e and a rock shaft 36′ in the direction opposite rock shaft 36. Fixed to each of the common rock shafts 36 at both sides of the machine, as shown in FIG. 2, is a series of arms 36f, one for each work station, and also fixed to rock shafts 36′ is a further series of arms 36g. Pivotally supported on shafts 36 and 36′ are additional arms 36h and 36i, respectively. Arms 36f and 36h at the respective stations are urged apart by coil spring 36j, while arms 36g and 36i are urged apart by coil springs 36k. The several sets of arms 36f–36h, and 36g–36i are held together by bolts 36m. Accordingly, as the respective arms 36f are oscillated counter-clockwise (at the left of FIG. 2) by rock shaft 36, the associated arms 36h are yieldably carried along. Similarly, as arms 36g are oscillated clockwise (at the left of FIG. 2) by rock shaft 36′, arms 36i are yieldably carried along. Arms 36h at the respective stations are seen to have lateral extensions engaging vertical slides 36n, each supporting a single pin 36o, while arms 36i are seen to have extensions engaging slides 36p each supporting a vertically reciprocating pair of pins 36q. These pins are shown also in FIG. 3. Each of the slides 36p carries a stop 36s engaging an adjustable screw stop 36r fixed in the machine frame so as to limit the upward stroke of slide 36p.

The single pin 36o and the pair of pins 36q reciprocate oppositely, as a pair of jaws, for seizing the stem block 10 at times when the conveyor 12 brings successive stem blocks opposite these pins and for locking the stem block in place while the conveyer remains at rest. Pins 36q raise the stem block yieldably to a fixed limit. Pin 36o yieldably drives the stem block in the opposite direction.

As the cam followers 34 rock shafts 36 and 36′ to oscillate the mechanisms described, springs 36j and 36k transmit the oscillatory thrust to the pin 36o and the pins 36q which seize each stem block. However, at each station, spring 36k is deliberately made substantially stronger than spring 36j and for this reason the upward stroke of the pin set 36q is more forceful than the downward stroke of pin 36o. Accordingly, the level at which each stem block 10 is finally positioned is determined by the adjustment of screw 36r. The downward stroke of pins 36o is adequate to grip the stem blocks, but not so forceful as to depress pins 36q.

The foregoing mechanism will be seen to be the mechanical analogue of the pneumatic conveyer-block gripping mechanism disclosed in my copending application, Serial No. 790,570 filed December 9, 1947.

FIG. 2 shows the constrained cams 38 and the cam followers 40 which were previously described for the purpose of operating the stem block jaws 10i, 10j for seizing and releasing the stems. Specifically, cam followers 40 are seen to have arms 40a for driving opposed slides 40b outwardly. These slides carrying wedges 40c which engage the stem block jaws and periodically separate the jaws at times and in stations where necessary, as will be described in detail below. The stem block jaws are opened to receive a stem in the stem-loading station A and to release the completed stem in the stem-unloading station L. Additionally, the stem block jaws are quickly opened and closed in each of the two work stations immediately following the stem loading station, namely the lead-trimming and swaging stations B and C. It will be understood that all of the cam shafts, drive shafts and slides described have bearings in frames 11 and 35, details of which need not be described.

The links of conveyor 12 carrying the stem blocks 10 are shown in detail in FIGS. 2 and 2A. Link 12a bearing a stem block 10 carries roller 12b and rollers 12d disposed respectively behind and in front of rail 12c. The rollers 12b and 12d cooperate with the rail 12c to guide the chain conveyor along an accurate path through the machine. A further fixed frame plate 12e overlies rearwardly projecting plates 12e' on links 12a for preventing the links from tipping. Each of the stem-block supporting links 12a has an outwardly projecting bracket 12f for the block 10. Rollers 12d cooperate with the sprockets, while each roller 12b is received between the sprocket arms.

The operation of the mechanism described to this point will be readily understood. Main drive shaft 20 rotates continuously to drive sprocket 14 intermittently 180° at a time. Sprocket 16 is driven by the chain conveyor, and supports and yieldably tensions the chain conveyor 12. Locking detent 26 is reciprocated in timed relationship to the indexing operation of sprocket 14 for arresting the conveyor in accurate indexed positions and for precluding movement of the drive sprocket 14 between indexing operations. Rock shafts 36 raise the respective single pins 36o and rock shafts 36' lower the respective sets of pins 36q for releasing the stem blocks 10 during indexing and operate reversely for gripping the blocks 10 when the chain conveyor 12 comes to rest. Adjustable stops 36r, with the effect of unequal springs 36k and 36j, determine the elevation of the stem block 10 when it is locked in position. At an appropriate time in the operating cycle of the machine, while the stem blocks 10 are gripped by cooperating pins 36o and 36q, cam followers 40 operate wedges 40c to open the stem-block jaws, the details of which are described below. The links 12a of the chain conveyor 12 which carry the stem blocks 10 are accurately guided along the path fixed by rail 12c and the cooperating rollers 12b, 12d.

STEM BLOCKS

The stem blocks 10, briefly described in connection with FIGS. 2 and 2A, are shown in greater detail in FIGS. 3, 4, and 5. Each stem block 10 is suspended on the outwardly extending brackets 12f of the supporting conveyor link 12a by pins 10a extending through enlarged bores in the bracket 12f, one pin appearing at each side of the stem block 10. Springs 10b surround pins 10a and bias the body 10c downward as limited by pins 10d. Body 10c is formed with respective channeled and conical recesses 10e providing bearing seats for the gripping pins 36o and 36q. Pin 36o, in its conical seat 10o, centers the block from left to right as viewed in FIG. 3. Body 10c has a central insert 10f constituting a seat for the glass header h, the insert 10f being formed with a passage 10g for receiving the projecting wires extending from header h. In addition, a pair of passages 10h on opposite sides of the insert 10f admit jaw opening wedges 40c when projected by the cam mechanism 40, 40a, and 40b previously described.

The body 10c slidably supports a pair of vertically movable jaws 10i and 10j, disposed in front of insert 10f for pressing header h against the insert and for gripping and centering the header h. A pair of plates 10k are fixed to the body 10c for slidably confining the jaws 10i and 10j. As seen in FIG. 5, each side of upper jaw 10i has a lateral extension 10m that lies behind a similar lateral extension 10n on lower jaw 10j.

The upper and lower jaws 10i and 10j are urged toward each other by a pair of inwardly spring biased wedges 10o each of which has a compression coil spring 10p. Wedges 10o coact with sloping faces 10n' of side notches in the lateral extensions 10n of the lower jaw 10j and with sloping faces 10m' of side notches in lateral extensions 10m of the upper jaw 10i.

Inward pressure by compression springs 10p forces wedges 10o to concurrently raise the lower jaw 10j and depress the upper jaw 10i, to firmly grip the header h. The jaws force the header h firmly against seat provided by the insert 10f by virtue of sloping header-engaging surfaces 10t of the jaws.

Jaws 10i and 10j have reversely sloping cam surfaces 10r and 10s (see FIG. 5) in their rear surfaces engaged by wedges 40c when it is necessary to open these jaws.

From the foregoing, it is seen that the stem blocks 10 are relatively loosely suspended from brackets 12f of the conveyor 12 and accordingly the conveyor 12 is only relied upon to transport the stem blocks 10 to successive positions to a first degree of accuracy. Thereafter, gripping and locating pins 36q and 36o accurately fix the location of the stem blocks 10 after the conveyor 12 has come to rest. Between those brief intervals when wedges separate jaws 10i and 10j, spring biased wedges 10o urge jaws 10i and 10j toward each other for resiliently gripping and centering the header h and for firmly seating the header. The headers are gripped at all times, both when the conveyor 12 is advancing and when it is at rest, except in the four stations A, B, C and L as previously mentioned. By virtue of the stem-block gripping mechanism, which accurately locates the stem-block 10 in each of the work stations, and the further header-gripping mechanism in the stem-block, the stem is successively positioned in the several work stations to a high degree of accuracy with front-to-rear and rotational orientation preserved continuously after it is once perfected.

The timing of the drive and indexing mechanisms, utilized in the various stations to be described, is represented in FIG. 101. Sprocket 14 is intermittently advanced by any suitable continuous-to-intermittent drive means 13, illustrated in FIG. 101 to complete the conveyor advance in the interval 35° to 115°. Gradual acceleration and deceleration, together with rapid operation, is to be desired. Cam 30, which operates conveyor detent 26, advances the detent into the path of the next pin 24 after the pin previously released has been carried part way around with the sprocket. Firm locking of the sprocket by cam 30 and detent 26 is effected after conveyor drive has ceased.

Cams 32 operate the stem-block gripping pins 36o and 36q to seize and release the stem-block at the beginning of each cycle of operation of the tools on the stems in the respective stations, blocks 10 being locked in place as early as practicable and being released as late as practicable. This is indicated by the timing curve 32 in FIG. 101 corresponding to the drive effected by cam 32 in FIGS. 1A and 2.

Cams 38 operate wedges 40 to release the stems in stations B, C, and L, and to open the stem holders arriving in station A. Each station requires its own cam 38 and its own timing curve 38 represented, in FIG. 101, as will be appreciated when considering the various stations A, B, C and L specifically.

STEM-LOADING STATION A

A feature of the invention represented by the mechanism in station A involves the location of a part in a preliminary orientation followed in later stations by successive refinements in the preliminary orientation. This assures reliable performance of the assembly machine despite inaccuracies or loose tolerances in the dimensions and in the distribution of the parts involved.

An important consideration in assembling the electrodes on the stem $h$ having the series of wires 1 to 9 inclusive molded in a predetermined pattern involves the accommodation of stems in which the highly flexible wires are in a predetermined arbitrary pattern. The wires may not be distributed in a precise predetermined pattern, due to a certain degree of required looseness of the wires when received in passages in the molding dies where the stem was formed. Much more serious is the fact of random deformation of the comparatively long and slender wires incidental to handling. After loading of stems, the machine corrects wire deformity.

The details of station A are shown in FIGS. 6, 7, 8, 8A, 9, 10 and 10A, wherein there is illustrated mechanisms for initially loading a stem into the stem block 10 previously described. The loader not only inserts a stem into the stem block 10, but additionally predetermines the orientation of the wires 1 to 9 inclusive in relation to the stem block 10. There is no critical physical dimension which is utilized in the stem block 10 to predetermine the rotational orientation of the stem in the stem block, but instead, the stem loader itself is relied upon to insert the stem with particular wires in positions required for functioning of succeeding work station. Thus wires 6 and 7, considered as reference wires, are to be disposed one above the other in a vertical plane while the wires and the axis of the stem are horizontal. These conditions are obtained while the glass header is seated against the insert 10f in the stem block 10. Wire 7 is disposed above wire 6, and the remaining wires are distributed in the initial pattern determined by the glass molding operation. In station A, the stems are manually deposited on the blades of a feed plate turret, with no more than rough orientation required of the attendant. From this point, the mechanism performs automatically with progressively increasing precision in stem handling and in stem-wire "tailoring," including straightening, cutting, pattern-adjustment and swaging of the wires.

In FIG. 6 the general organization of the stem-loading station A is shown, the mechanism for operating certain parts being shown in FIG. 8. The stem loading mechanism includes a step-wise advanced carrier or turret 41, a set of transfer fingers 42, a pair of transfer arms 44 and 45, a split-funnel wire guide 46, and the necessary operating mechanisms coordinated as shown in the cam chart of FIG. 102. In FIG. 10A there is shown a holder 41a of the carrier 41 having a blade 41b extending between reference wires 6 and 7 arranged on one side, and wires 1, 2, and 3 on the other side. Blade 41b is approximately the maximum thickness permitted by the separation of these two groups of wires and so may be said to be tightly confined or "wedged" between them. Whether tight or loose, the stem rests on the edge of its blade and is prevented from tipping radially on the turret by the length of the blade engaged by the glass of the stem and is further prevented from tipping across the blade edge by the width of the blade engaged by the wires. Blade 41b penetrates the extending array of wires and serves to initially determine the rotational position about the stem axis in which the stem is ultimately loaded into the stem block 10.

The stems $h$ are loaded manually or by appropriate automatic mechanisms onto the respective holders 41a, conveniently at the extreme left of turret 41 as seen in FIG. 6, and from this position the stems are indexed in the clock-wise direction, when looking down on the turret. As the turret 41 indexes, the stems are carried into a transfer position between transfer fingers 42 and the adjacent stem block 10 on the conveyor 12.

Turret 41 is supported on an upright shaft 41c journaled in a fixed bearing 41d. Supported on the lower face of turret 41 is a series of cam followers 41e which (see also FIG. 7) cooperate with a constrained barrel cam 41f having an integral medial rib 41g filling the space between two successive cam followers 41e. The rib 41g locks the turret 41 during part of the cam rotation. Additionally, barrel cam 41f has two curved runs 40h for producing the desired cam indexing motion. Barrel cam 41f rotates in a fixed bearing 41i (see FIG. 6) and is driven by a sprocket and chain drive including a sprocket 41j, a sprocket 41m, and a chain 41k trained over the sprockets. The sprocket 41m is on a secondary drive shaft 41n driven through bevel gearing from unit drive shaft 41p, the latter being coupled, as described above, to the main drive shaft of the machine. A suitable single-revolution electromagnet-controlled clutch 23a is interposed in the main drive shaft connection of this unit to the main drive of the whole machine, for control by appropriate manual or automatic devices, and a like clutch is included in the drive connection of each of the other units driven by shaft 20. Turret 41 carries a stem $h$ into range of transfer fingers 42 for each revolution of the main drive 20.

The purpose of transfer fingers 42 is to shift the particular stem on a blade 41b on to an aligned blade 44a of the transfer arm 44. Transfer fingers 42, seen best in FIG. 8 (as viewed looking toward a stem block with turret 41 removed) are swingably supported on one end of a lever 42a having a central pivot 42b and a cam follower 42c on its opposite end. The lever 42a is biased by spring 42d against upstanding edge cam 42e on the shaft 41n.

When turret 41 has carried a stem to the transfer position in front of the horizontally extending transfer fingers 42, and when transfer arms 44, 45 are in their vertical position with the blade 44a aligned with and bearing against the blade 41b (FIG. 10A), the transfer fingers 42 are operated by cam 42e to displace the stem from the turret carrier 41a to the transfer arms 44, 45. The transfer fingers 42 follow the transfer arms 44, 45 arcuately toward the stem block 10 to provide the requisite support, but are quickly returned to the position shown in FIG. 6 prior to or during the next indexing of the turret 41. Accordingly, after the turret indexes one step, the next stem will be disposed in the transfer position in front of transfer fingers 42.

The transfer fingers 42 and their supporting lever 42a, cam follower 42c and operating cam 42e are shown best in FIG. 8 wherein there is illustrated an additional novel feature. A test or detecting finger 42f is carried on an insulating block 42g to move with transfer fingers 42. In the event that no stem is present on a carrier 41a for transfer operation to a particular stem block, then an electric circuit is conditioned appropriately to suppress operation of the further assembly mechanisms in succeeding stations which would otherwise operate on the stem carried by the particular stem block during the processing cycle. The suppression of operation of the further stations in respect to the empty stem block is effective in saving parts which cannot be assembled for lack of a stem in the stem block. Delayed control (S.N. 790,570) disables clutches 23a.

A split-funnel wire guide 46 and associated operating mechanism, shown partially in FIG. 6, are more completely illustrated in FIGS. 8 and 8A. The guide 46 includes two pivoted arms, each having a funneled or flared portion 46c in the face 46a closest to the transfer arms 44, 45. Each arm has a smaller generally cylindrical portion 46c reaching face 46b (FIG. 6) facing stem block 10. The guide or funnel 46c is split and formed on the separate arms of the guide which swing reversely with pivoted pinions 46d and 46e. The pinion 46e is engaged by a segmental gear 46f, spring-biased to close the split funnel. Normally the funnel arms are spread apart to provide a clear passage between transfer arms 44, 45 and the stem block 10. Segmental gear 46f is positively driven downward through link 46g coupled to bell crank lever 46h. Bell crank lever 46h, pivoted intermediate its ends and rocked counter clockwise by link 46i, is coupled to a further bell crank lever 46j carrying cam follower 46k engaging edge cam 46m on the shaft 41p that is geared to shaft 41n. Spring 46q, connected to bell crank 46j, biases the linkage between segmental gear 46f and the cam follower 46k in the reverse direction. Cam 46m opens split guide funnel 46 at all times except during actual insertion of the forwardly projecting wires into the hollow stem block insert 10f.

The transfer arms 44 and 45, which receive the stems from turret carriers 41a, are effective to swing the stems from a vertical stem-receiving position to a horizontal stem-inserting position, whereupon the stem wires are thrust endwise into the hollow insert 10f of the stem block 10, via split funnel 46. The transfer arms 44, 45 are shown greatly enlarged in FIG. 9, and their operating mechanisms appear in FIGS. 6 and 8. The transfer arm 44 has a pivot 43a journaled on a carriage 44b, the latter being horizontally slidable along a horizontal pair of guide rods 44c. The carriage 44b is biased by spring 44d toward the stem block 10, that is, in the direction of inserting a stem into the stem block 10. The carriage 44b is positively driven away from the stem block 10 by a lever 44e and cam follower 44f engaging cam 44g on shaft 41n. Lever 44e and cam follower 44f are interconnected by a long shaft 44h (FIG. 8) mounted for oscillation in fixed bearings.

As seen in FIG. 9 (the transfer arm 44 has a rearward extension 44i which is capable of swinging clockwise under action of torsion spring 44j to engage a stop 44k on carriage 44b. The cooperating extension 44i and the stop 44k accurately arrest the transfer arm 44 in the horizontal stem-inserting position. The transfer arm 44 has a cam follower 44n bearing against stationary cam 44m. Arm 44 is raised from the horizontal when carriage 44 moves away from the stem block 10. When the transfer arm 44 and the integral cam follower 44n are carried with carriage 44b to the right and toward the stem block 10, transfer arm 44 is swung clockwise into horizontal stem-inserting position. This is shown in progressive stages in the first three diagrams of FIG. 10. It is seen that transfer fingers 42 push the header 41b or stem h from the turret 41 and its supporting blade 41b to the transfer arms 44, 45. In the first part of FIG. 10, fixed cam 44m engages rearwardly extending cam follower 44n to maintain transfer arm 44 in the vertical stem-receiving position.

As carriage 44b moves to the right in FIGS. 6 and 10, cam follower 44n gradually slides off the stationary cam and spring 44j urges the transfer arm 44 clockwise and into the horizontal stem-inserting position with extension 44i against abutment 44k.

Transfer arm 45 is carried by pivot 45a in transfer arm 44 and biased against transfer arm 44 by a torsion spring 45b, so that the two arms may move as a unit, horizontally and arcuately as shown in the first three phases of FIG. 10. Transfer arm 45 has an integral rearwardly extending cam follower 45c, whose function will be clear from the following.

The purpose of transfer arm 45 becomes apparent from the third and fourth views of FIG. 10 where the stem h is seen to extend horizontally. In the event that the transfer arm 45 were omitted, there would be considerable danger that, despite the frictional engagement of the wires with blade 44a, the stem still might shift or fall from the single transfer arm 44. By the time the extending wires on the stem h enter and pass through the split-guide funnel 46, the transfer arm 45 has served its intended purpose. As carriage 44b continues its horizontal travel to the right in FIG. 10 cam follower 45c, comes into engagement with a fixed cam 45d. The transfer arm 45 is thereby swung to an inoperative position of clearance, seen in the last diagram of FIG. 10. With the transfer arm 45 out of the way, the transfer arm 44 with its supported stem approaches the split guide funnel 46. After the funnel 46 has guided the leads into the stem block 10, the funnel, too, is removed and transfer arm 44 is effective to complete the insertion of the stem into stem block 10. Thereafter, jaws 10i, 10j of the stem block 10 are closed by proper coordination of the jaw-opening wedges 40c, previously described. When the stem block jaws 10i, 10j have seized the glass header of the stem, carriage 44b slides horizontally to the left in FIGS. 6 and 10, thereby withdrawing the transfer arms 44, 45 from the projecting stem wires.

The wires extending through the insert 10f of the stem block 10 ultimately will constitute the external terminals of the completed electron tube, while the wires projecting from the front face of the stem block 10 will be variously processed and used in the assembly of the mount, as will appear.

In review, preliminary orientation of the stems to be located into stem block 10 is effected with the aid of blades 41b projecting radially from turret 40 during loading of the stems onto the holders 41a. By the cooperative effects of transfer fingers 42, transfer arm 44 with its transfer blade 44a, and transfer arm 45, this orientation is maintained as the stem is inserted into stem block 10. The leads that project from the face of the stem block 10 are thus disposed in the pattern required for operations at further stations. The glass header is pressed by stem block jaws 10i and 10j with their sloping edges against the seat provided by block insert 10f.

Figure 102:
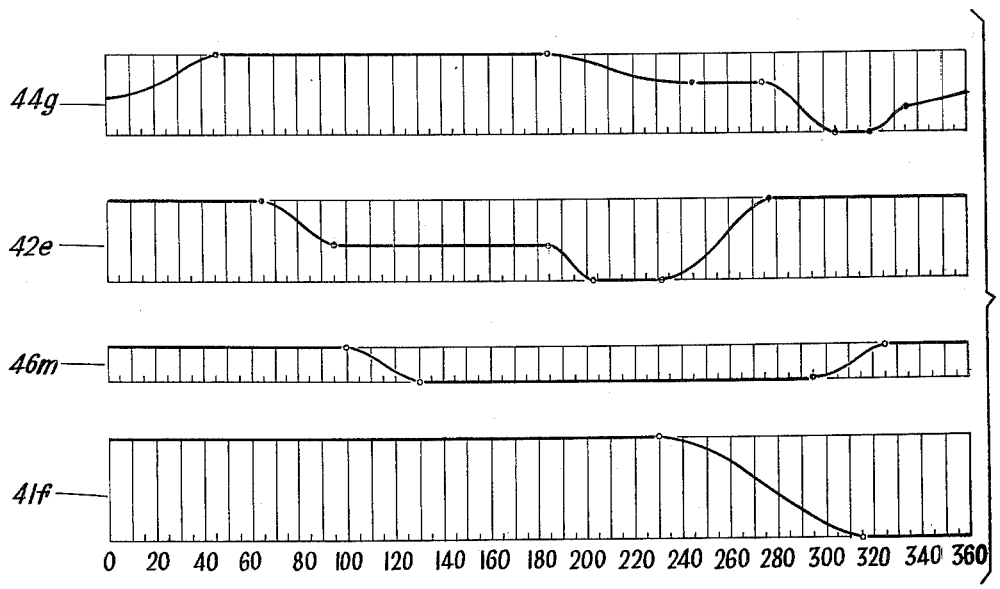

The timing of certain cam-operated mechanisms in station A is represented in FIG. 102. There it is seen that cam 44g operates carriage 44b carrying transfer arms 44, 45 to the left (FIG. 6) and to upright position near the start of the cycle. Thereafter transfer fingers 42 are advanced to bear against a stem and push it from plate 41 to arms 44 and 45. Split funnel 46m closes in front of a stem block that had just been carried to station A by the conveyor, as represented by the drop in curve 46m. Arms 44 and 45 start to travel toward the stem block near the 200 degree point in the cycle (curve 44g) and cam 42e continues to swing fingers 42 with arms 44 and 45 until those arms approach the horizontal. Carriage 44b advances arms 44 and 45 further toward the stem block while jaws 46 are closed, but near the end of travel of those arms jaws 46 open and the stem is seated in the stem block.

Cam 38 which operates the stem block jaws in station A should have a drop shortly after the conveyor comes to rest, and should have a rise while cam 44g has its dwell (305° to 320° in FIG. 102) so that the inserted stem is seized before arm 44 is withdrawn.

While one stem is being loaded into the stem block as described, arm 42 is swung to the extreme left by cam 42e, and feed plate indexing cam 41f advances the feed plate 41 one step to bring the next stem in front of fingers 42. Arms 44 and 45 then return in readiness for the next machine cycle.

The glass header may vary in diameter and in thickness; but the self-centering characteristics of the stem-block jaws, and the sloping surfaces of the jaws that engage the glass are effective to accommodate wide variations in glass dimensions.

LEAD CUTTING STATION B

The pattern of wires as oriented in station A where the stems are loaded into the stem blocks 10 is relatively critical in relation to the next operation at station B.

The stem loaded into the stem block 10 in the stem loading station A has wires projecting from the stem block, all approximately equal in length and longer than is needed in the final mount M. A group of these leads are to be trimmed to a short length to serve as an abutment or mechanical stop for supporting the bottom mica *bm*, and a further group of these leads are to be trimmed to an intermediate length for penetrating and extending a limited distance through the bottom mica *bm*.

The stem as loaded into the stem blocks 10 on the conveyer 12 is centered in the stem block jaws and held against the stem block insert as a seat; but the orientation of the pattern of wires rotationally is established only to a preliminary degree of accuracy in loading station A. Both the shortest leads and the intermediate length leads are sheared in the lead-trimming station B by a die or fixed cutting member 56 which serves a further important function, namely, to orient the stem in the stem block to a more precise degree of accuracy; and, as a still further function, to bend and adjust individual wires that might have been positioned inaccurately in the glass button by the previous stem-molding operation. In vacuum tube practice, wires may be in a "pin circle" or they may have a "random" pattern so as to occupy arbitrary positions in the glass header. The present stem has an arbitrary pattern of leads; but when the parts are to be automatically assembled, those leads should be in the predetermined pattern to a high degree of accuracy. The comparatively crude distribution of leads, as they reach the present machine, where they are formed with broad tolerance and further deformed in handling, is corrected in the present station, and further perfected in the next following station.

The details of the tools at the second station are shown in FIGS. 15, 16, 16A, 17, 18 and 18A on a greatly enlarged scale. A discussion of these figures at the outset will facilitate an understanding of the more complete organization shown in FIGS. 11 through 14. FIGS. 15, 16A and 18A are views of various tools in station B from the viewpoint of the stem block 10, with the stem block removed. That is to say, the wires and tools shown are all in front of the stem block 10, and similarly in front of the glass button gripped in the stem block jaws 10*i*, 10*j*. The tools in FIGS. 15 to 18 are all illustrated on a much smaller scale in FIGS. 11 to 14 wherein the operating mechanisms are shown.

FIG. 15 shows a series of three gathering and combing tools 50, 52 and 54 at a time shortly after the cycle of the lead-trimming station B has commenced. In the position shown in FIG. 15, the blade 50 has advanced across the stem axis to receive various wires to which the electrodes are to be subsequently assembled. The teeth 50*a* of the combing tool 50 have tapered points to direct partly misaligned wires to one side or the other of the several teeth. In FIG. 16 it is observed that the first gathering tool 50 crosses the stem axis at a point very close to the glass button or header *h*. At this location where the wires emerge from the button, any bending of the wires caused by rough handling of the completed stem after leaving the stem molding machine and before reaching the machine herein disclosed, will not introduce any appreciable difficulty.

As shown in FIG. 16A, a pair of opposed gathering and combing tools 52, 54 then advance very nearly against each other along a path crossing the path of tool 50. The fingers 54*a* of the combing tool 54 and the fingers 50*a* of the combing tool 50 cooperate to form a lattice of crossed fingers which presents a pattern of apertures for accurately locating the wires. The crossed lattice pattern of the combing tools corresponds to the pattern presented by a cutter 56 into which the accurately positioned wires are to be threaded (see FIG. 16).

The apertures of the crossed lattice pattern are appreciably larger than the cross sections of the several wires. When engaged about the wires, the combing tools (FIGS. 16 and 16A) are drawn away from stem block 10 and toward the fixed cutter or die 56 and in so doing cause the ends of the wires projecting from the glass button or header to assume severally aligned positions relative to the holes 56*a* in the cutting die 56. The holes 56*a*, which correspond in number and position to the accurately aligned wires of the header, are flared to present somewhat conical mouths at the surface 56*b* where the wires first enter the cutting die 56.

In FIG. 17, the cycle is seen to have progressed to the point where the cutting die 56 has advanced on the patterned ends of the wires held by blades 50, 52 and 54. Thereafter, the combing tools are radially retracted along their initial path of advance, and the "stationary" cutting die 56 completes its forward stroke toward the stem block 10. Toward the end of this forward stroke the jaws 10*i* and 10*j* of the stem block 10 open briefly to allow the header *h* to rotate and become oriented as may be required by the confined position of the wires in the holes 56*a* of the cutting die. At the conclusion of the forward stroke of the cutting die 56, the jaws 10*i*, 10*j* of the stem block 10 close on the reoriented glass button or header. The several wires extending into stationary cutter 56 are bent and given a permanent set in an accurate pattern refined, as previously noted, to much closer tolerance than is usually obtained with stem molding machines.

The cutting die 56 has a rear cutting surface 56*c* and an intermediate cutting surface 56*d*. A pair of opposed movable cutters 58 and 60 present similar cutting surfaces as surfaces 58*c* and 58*d* on cutter 58, corresponding to the cutting surfaces of die 56 (FIG. 18 and 18A). The movable cutters 58 and 60 move toward each other and across the various wires to be sheared, starting from the initial broken line position of FIG. 18A and ending at the full line position illustrated therein. In the final position of the movable cutters 58, 60, end faces 58*e* and 60*e* remain separated from each other so as not to affect the vertically aligned reference wires 6 and 7 of the stem. Thus, cutting surfaces 58*c* and 60*c* shear wires 1, 3, 4 and 5 to the prescribed intermediate lengths, while the cutting surfaces 58*d* and 60*d* shear wires 2, 8, and 9 to the prescribed short length for supporting the bottom mica *bm*. Wires 1, 3, 4, and 5, it will be recalled, are to extend through the bottom mica *bm*.

At the conclusion of the operations for accurate adjustment of the wires by bending where necessary, and shearing of the several wires to the required lengths, the cutting die 56 is withdrawn. However, before this is done, jaws 10*i* and 10*j* of the stem block 10 again close on the glass button or header *h* and hold it against the seat provided by insert 10*f*.

Figure 103:
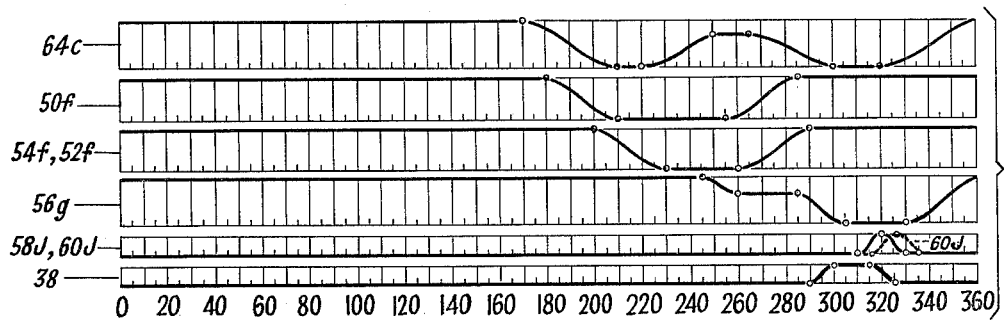

The operating mechanisms for moving the combing tools 50, 52, 54 transverse of the stem axis shown in FIG. 14. Thus, each combing tool 50, 52 and 54 is operated by a centrally pivoted lever 50*b*, 52*b* and 54*b*, respectively, pushed through links 50*c*, 52*c*, 54*c* by levers 50*d*, 52*d*, and 54*d* operated by cam followers 50*e*, 52*e* and 54*e* which in turn are spring-biased to ride on cams 50*f*, 52*f* and 54*f*, coaxially assembled and rotated by drive shaft 62. It should be observed that the comb-operating cams 50*f*, 52*f*, and 54*f*, as well as cutter-operating cams 58*j* and 60*j* are all symbolically represented for clarity, their contours being such as are required for the proper timing, represented in the cam or timing chart (FIG. 103). The combing tools 50 and 52 are firmly thrust toward the stem to assume a final position determined by the adjustment of the links 50*c* and 52*c*. However, as additional mechanical stops may also be used for arresting the combing tools 50 and 52 in a precise final position, as will presently be apparent. The link 54*c* is telescopic and has a cushioning spring 54*k*. Thrust produced by lever 54*d* is transmitted through the cushioning spring 54*k* to the link 54*b*. The final position of combing tool 54 opposite tool 52 is determined by screw 54h in the rearward extension 54g of tool 54. Screw 54h constitutes an adjustable stop that is moved against supporting head 64. Screw 54h constitutes the adjustable stop despite the somewhat greater stroke of cam 54f. Accordingly, the final position of combing tool 54 across the longitudinal axis of the stem will be repeated uniformly stroke after stroke.

For reasons that will become clear presently, the supporting head 64 is reciprocable axially of the stem and perpendicularly of the plane of FIG. 14. Despite this reciprocation and the consequent change in the length of link 54c, the combing tool 54 remains in its fixed position required for effective combing of the leads. Links 50c and 52c of the combing tools 50, 52 have similar stops 50g and 52g, with screws (not shown) which fix the limit of their reciprocation towards the longitudinal axis of the stem. Accordingly, as the supporting head 64 reciprocates along the axis of the stem $h$ in combing out the leads (away from the observer of FIG. 14), the change in length of links 50c, 52c and 54c will not affect the final position of combing tools 50, 52 and 55.

Thte "fixed" cutting die 56 is carried by a carriage 56e for movement to and from the stem blocks on the conveyer, perpendicular to the plane of FIG. 14, for projection through an aperture 64a in supporting head 64. As seen in FIG. 11, the cutting die 56 can very closely approach combing tools 52 and 54 for accomplishing the purposes illustrated in FIGS. 15 to 18A inclusive. The opposed movable cutters 58 and 60 are slidably mounted in head 56e for reciprocating movement toward and away from each other, horizontally in FIG. 13. These sliding cutters 58 and 60 are reciprocated by bell cranks 58f and 60f pivoted in carriage 56e and coupled to links 58g and 60g which in turn are connected to adjacent ends of levers 58h and 60h. At their opposite ends, the levers 58h and 60h carry cam followers 58i and 60i which respectively engage the cutter operating cams 58j, 60j mounted on shaft 62 for rotation therewith. while these cams are schematically illustrated as being the same type as cams 50f, 52f and 54f, cams 58j and 60j are actually constrained cams with the cam followers moving in grooves or tracks cut into the faces of their respective cams.

Sliding head 64 carrying comb slides 50, 52 and 54 moves to and from the viewer of FIG. 14, with shafts 64b sliding in the frame of the machine (see also FIG. 11) and the cutter carriage 56e sliding to and from the viewer (FIGS. 12 and 14) with shafts 56m. Bell cranks 50b, 52b and 54b are all pivoted in head 64 so as to move therewith fore and aft; and similarly bell cranks 58f and 60f are carried by pivots 56f in carriage 56e so as to be movable with that carriage.

Shaft 62 (FIG. 14) is coupled through bevel gears 70 to secondary drive shaft 72. Mounted on shaft 72 is a cam 56g engaged by cam follower 56h on lever 56i having a stationary pivot between its ends, lever 56i being connected through a link 56j (FIG. 11) to cutter sub-carriage 56k. Cam 56g on shaft 72 positively retracts the cutter carriage 56e. This is accomplished by reciprocating carriages 56k, e that are locked to shafts 56m which in turn slide in bearings 64h in standard 75. Block 56k is normally urged forward and toward the stem block 10 by a tension spring 56n. Similarly, the head or carriage 64 for the several combing tools 50, 52, 54 is operated for axial reciprocation along the projecting stem wires by a cam 64c on shaft 72. This cam is engaged by cam follower 64d on cam follower lever 64e having a fixed pivot between its ends. This lever, through link 54f (FIG. 11) reciprocates a subcarriage 64g, carrying parallel shafts 64b which slide axially through fixed bearings 64h. Spring 64i urges the combing tool head 64, at the forward end of shafts 64b, toward the stem block 10.

The cutter head 56e and the combing head 64 are seen to be spring-biased toward stem block 10, under cam control. An adjustable stop 64j on subcarriage 64g limits the forward stroke of the combing tool head 64, and a like stop, not shown, limits the forward stroke of the cutting die head 56.

Power input is transmitted to shaft 74 through a suitable electrically-controlled single-revolution clutch, not shown, from the main drive, as described in connection with FIG. 1. Shaft 74 is coupled by bevel gears 76 to shaft 72 which in turn drives shaft 62.

Figure 13:
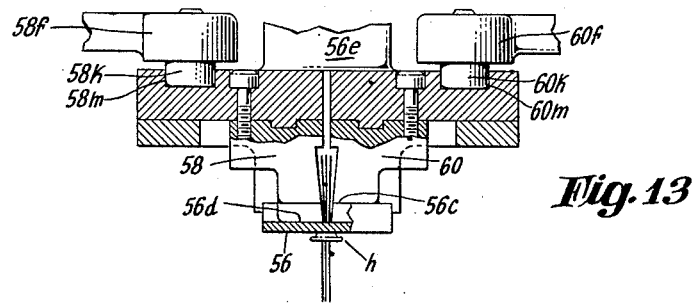
FIG. 13 is a view, partially in section along the line

In the interests of clarity, a cross-section of the cutting tool is shown in FIG. 13, with fixed cutter or die 56 in front of the laterally reciprocable cutters 58 and 60. The plane of the section is broken so as to show the plane 56d at which the short wires are cut and additionally, the plane 56c at which the wires of intermediate length are cut. As appears in FIGS. 12 and 13, a pin 58k operates in a slot 58m in slidable cutter 58, while a pin 60k operates in a similar slot 60m in slidable cutter 60. Opposed cutters 58 and 60 are limited in movement to avoid approaching each other so close as to contact long wires 6 and 7. Those wires are unaffected by the cutting operation and are combed and then accurately adjusted into proper position by the bending effect resulting from moving fixed cutting die 56 very close to the header in the stem block.

Cams 50f, 52f, 54f and 64c are timed (FIG. 103) so that the combing tools advance and close on a stem, and withdraw closed as die 56 is advanced by cam 56g. The combing tools separate as the cutting die moves to the header $h$ and cam 38 briefly opens the stem block. Cams 58j and 60j operate the cutters. Thus, in station B, header $h$ is accurately adjusted rotationally about its own axis in the supporting stem block and further the various wires are bent, where required, into the proper patterned positions on the stem. Therefore, the orientation of the various wires projecting from the stem block is adjusted to a tolerance closer than is ordinarily feasible in molding glass-and-wire stems. Furthermore, the several leads are trimmed to various lengths, certain of the leads defining an abutment plane at which the bottom mica $bm$ ultimately is to be seated, while other leads are trimmed to a length suitable for penetrating the bottom mica $bm$, but terminating substantially short of the top mica in the completed mount.

A prominent feature of the lead-trimming station B is the combing action by which leads, extending a substantial distance away from the glass button at which the leads are relatively rigidly located, are carefully and precisely adjusted. This permits a tool to operate precisely on each of the wires even at a great distance from the stem block where, but for the combing action, it would be futile to expect the leads to be properly disposed. This principle will be noted in several of the work stations that follow. The combing action described is seen to include a closing-in of multiple coacting jaws forming a template through which the leads extend. These jaws close on the wires at a point immediately adjacent the stem block where the wires cannot have been greatly deformed in handling the stem, and thereafter the template or apertured pattern is drawn perpendicularly away from the stem block 10 to accurately locate the free ends of the plural wires in proper condition for further processing. This stroking action is utilized in several stations. In station B, it is effective for threading the wires into the apertured die block 56 for subsequent cutting, patterning and rotational adjustment of the stem. During the forward stroke of the die block 56 toward the stem block 10, accurate lateral adjustment of the several wires is brought about by bending of the wires, the header being released for rotation of the header $h$ in the stem block. When the die block 56 is close to the stem block 10, the jaws 10i, 10j again grip the reoriented header.

LEAD-SWAGING STATION C

The particular purpose of the mechanism in station C, of the illustrative mount machine, shown in FIGS. 19 to 26, is to swage multiple leads to form shoulders S against which the bottom mica $bm$ may rest. These shoulders or abutments S, formed on medium length leads 1 and 4, cooperate with the short leads 2, 8 and 9 (defining the plane for the bottom mica $bm$) to assure further stability in the final mount. The swaged intermediate-length leads extend through the bottom mica $bm$ and afford projections to which the anode parts are assembled and welded, as will be seen.

In addition to this swaging operation, the pattern of leads is in the station C to facilitate the swaging. The pattern of leads and the rotational adjustment of the stem about its axis is adjusted as a further refinement of the progressive orientation by opening the stem block jaws 10$i$, 10$j$ while the combing tools are quite close to the stem block 10, and while the swaging tools are effective to form the shoulders S.

The opening of the stem block jaws at the precise time that the swaging tools engage the slender leads has a further important effect. If there is even slight misalignment between the swaging tools and the leads projecting from the glass button or base of the stem $h$, it is very possible that the leads being swaged might be broken or sheared off, or the glass button might be cracked. However, since the jaws of the stem block are released during the swaging operation, the swaging tools affect the leads alone and do not tend to tear the leads away from the glass button.

The specific mechanism and operations occurring at the swaging station C may be most easily understood from a preliminary discuss of the stem-engaging tools shown in FIGS. 22 to 26 inclusive. Similar to the combing and cutting tools in the second or cutting stage B, there are comparable combing and wire-working tools in the swaging station C. FIG. 22 shows the pair of gathering tools 80, 82 which are comparable to the combing tools 50, 52 and 54 of the cutting station and to the cutter head or die block 56 (see FIGS. 15 to 18) of the station B. Gathering tools 80, 82 have front ends formed with channels 80$a$ and 82$a$. When the tools or arms 80 and 82 are brought together, the channels 80$a$, 82$a$ define a guideway for receiving the long, uncut reference wires 6 and 7. As shown in FIG. 23, arms 80 and 82 are carried toward the stem block 10 together with swaging tools 88 and 90, which are arranged ahead of the arms 80, 82. The tools 80 and 82 are arranged to close on the reference wires 6 and 7 and accurately pick up these wires if they do not project in exact predetermined locations and truly perpendicular from the stem block 10. At the same time, a test contact 84 arranged intermediate the tools 80, 82 engages reference wires 6 or 7 to serve as a check for the presence of a stem $h$ in the stem block. In the event that there is no stem in the particular block, further attempted operations with respect to the empty block are precluded by disabling the succeeding stations of the machine as that stem block arrives, as by control means in my copending application mentioned above. Tools or jaws 80 and 82 close on wires 6 and 7 before coming close enough to the stem block 10 to engage intermediate length wires 1, 3, 4 and 5. In the front or leading end of jaw 80 there is a pair of holes 80$b$ which open toward the respective leads through flared mouths for receiving the ends of leads 1 and 3 in the holes 80$b$ as the jaws advance toward the stem block. The jaw 82 similarly has a pair of holes 82$b$ having flared ends or mouths for guiding and receiving intermediate length wires 4 and 5. Accordingly, all of the wires 1, 3, 4 and 5 enter the apertures 80$b$ and 82$b$ in the tool ends 80$c$, 82$c$ during the final stroke of arms 80 and 82 toward the stem block 10.

As shown in FIG. 26, leading or front ends 80$c$, 82$c$ of the jaws or tools 80 and 82 have guide holes 80$b$, 82$b$, receiving wires 1, 3, 4 and 5, and uncut reference wires 6 and 7 are seen to be gathered and stroked by cooperating channels 80$a$ and 82$a$.

In FIGS. 24, 25 and 26 there are seen a pair of confronting swaging or lead-working tools 88 and 90 which slide in a plane parallel to the front face of the stem block and close on leads 1 and 4, moving slantwise (FIG. 26) relative to the closing path of the gathering and combing jaws 80 and 82. These leads are thus swaged to provide shoulders S at the level of the ends of shorter leads 2, 8, and 9. The swaging tools 88 and 90 have cutouts 88$a$, 90$a$ in their confronting ends for bypassing all of the other leads that are not to be swaged. Leads 1 and 4, which are to be formed with shoulders S, are engaged by confronting end faces of tools 88 and 90 having appropriate female die parts 88$b$ and 90$b$ of the proper shape to raise or coin shoulders S. The small cross-shaped form of the swaged lead is stronger than a simple flattening of the lead, which would also produce a shoulder.

During the swaging operation (FIG. 25) cams 40$c$ spread the header engaging jaws of the stem block 10 so that the stem on which the work is performed is carried not by the conveyor but by the tools in the work station. This principle is used in the preceding lead-trimming station, as has been seen; and in somewhat modified form it is applied in the stations where the bottom mica and the grids are applied, as will be seen.

Immediately after the swaging tools open, the stem block jaws close, by retraction of cams 40$c$, and the swaging and gathering tools are retracted to clear the way for the swaged stem to advance and for the next stem to enter the station.

The mechanisms for operating the gathering and swaging tools in FIGS. 22-26, are shown in detail in FIGS. 19, 20 and 21. Drive shaft 92, journaled in appropriate bearings 93 (only one shown) is coupled via drive shaft 93$a$ in bearings 93$b$ to the main drive of the machine, shown in FIG. 1, the drive shaft 92 being further coupled by bevel gears 94 to a second shaft 96.

The opposed swaging tools 88 and 90 are mounted for reciprocation toward and away from the stem block 10, that is, to and from the observer in FIG. 20. The swaging tools are carried on a carriage 98 supported adjacent the stem block 10 by the front ends of shafts 98$a$ slidable in bearings in fixed frame structure 100. An operating head 98$b$ for the carriage 98 is secured to shafts 98$a$ and is reciprocated by link 98$c$ pivotally connected to bell crank lever 98$d$ which carries a cam follower 98$e$ riding on a cam 98$f$. A spring 98$g$ connected to the operating head 98$b$ and to fixed frame part 100 urges the entire swaging tool structure toward the stem block 10, that is, toward the observer in FIG. 20.

The tools or jaws 80 and 82 which gather and stroke uncut reference wires 6 and 7 and further support intermediate wires 1, 3, 4 and 5 during the swaging operation, are carried for reciprocation to and from the observer in FIG. 20 by a second reciprocating carriage 102 having sliding bearings in extensions 99 of the operating head 98$b$. Jaws 80 and 82 have pivots 80$d$ and 82$d$ in the sliding carriage 102 carried by a pair of axially slidable shafts 102$a$ gripped by a rear clamp 102$b$. An adjustment screw 102$c$ extends forward from the rear clamp 102$b$ to coact with an abutment 98$h$ on extension 99 to limit movement of carriage 102 carrying the combing tools 80 and 82 toward the swaging tools 88 and 90 on carriage 98.

As shown in FIGS. 19 and 20, and perhaps more clearly in FIG. 21, the rear clamp 102$b$ on shafts 102$a$ is reciprocated through a predetermined stroke by a link 102$d$ pivoted to an arm 102$e$ carried by pivotal shaft 102$h$ and rocked by cam follower 102$g$ through rotation of cam 102$i$ on the drive shaft 92. A spring 102$f$ is connected to arm 102e and normally biases the carriage 102 to the limit of its movement toward the stem block 10.

Gathering tools 80 and 82 are rigidly assembled to rearwardly extending arms 80e and 82e which are biased apart by an interposed coil spring 104. Rollers at the rear extremities of arms 80e and 82e coact with fixed cams 100a and 100b on frame 100 to separate the gathering tools 80, 82 during the first part of the limited stroke toward the stem block 10. The cams 100b are developed, such that when the combing tools are in position to embrace the reference leads 6 and 7, the rollers are allowed to separate under the influence of spring 104 for clamping about leads 6 and 7. The drops or dwells of cams 100a and 100b are staggered, fore and aft, so that first of the tools, namely 80 and then the other, namely 82 moves laterally toward the reference leads or wires 6 and 7. After the rollers on arms 80e and 82e, drop into the dwell portions, the rollers remain in engagement with the cams 100a, 100b and serve to accurately determine the lateral position of both the gathering tools or jaws 80, 82.

The mechanism for operating the swaging tools 80, 82 in the direction to engage the intermediate length wires 1 and 4 appears in FIG. 20. This includes links 88c and 90c, levers 88d and 90d, links 88e and 90e, cam levers 88f and 90f, and operating cams 88g and 90g on shaft 96. The cams 88g and 90g are proportioned in relation to the operating linkage to provide equal and opposite thrusts during swaging. This swaging operation takes place during a brief interval when the carriage 98 has been advanced to a very close position relative to the stem block, so that no allowance need be made for change of the effective length of the linkage during fore and aft reciprocation of carriage 98. The cams are seen to operate the swaging tools 88, 90 positively, the swaging tools being resiliently retracted by appropriate springs 88h, 90h. Additional stops may be used for more perfectly determining the final position of the swaging tools at the ends of their respective inward strokes.

Figure 104:
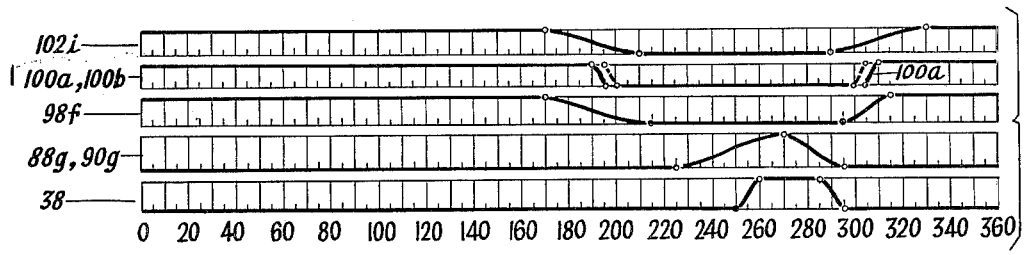

In review and with the aid of the cam or timing chart in FIG. 104, it is seen that the carriage 98 is advanced toward the stem block 10 under control of cam 98f by spring bias 98g, thereby carrying swaging tools 88 and 90 toward the stem block 10. It is to be noted that the tools 88, 90 are separated sufficiently to allow all of the stem wires to pass between them. Concurrent with forward movement of the carriage 98 and the swaging tools, cam 102i controls the forward movement of the carriage 102 with its gathering tools 80 and 82. Then the tools 80, 82 travel forward sufficiently to be positioned on opposite sides of the reference wires 6, 7 the tools approach each other under control of cams 100a and 100b for centering the wires 6 and 7. After initial centering, the tools 80, 82 continue forward, sliding along the reference wires 6, 7, and support and receive the intermediate length wires 1, 3, 4, and 5 in apertures 80b and 82b. Near the end of the forward stroke of the tools 80 and 82, cam 38 opens the jaws 10i, 10j of the stem block 10 to release the stem h permitting the gathering and support tools 80 and 82 to accurately locate the wires 1 and 4 to be swaged in relation to the swaging tools 88 and 90. In this action the stem may shift bodily or rotate or both, to some extent. The swaging operation is effected at a time when the stem is oriented by the instruments at the work station, and the stem block is not wholly relied on for this purpose.

After the swaging or staking tools have operated and before gathering tools or jaws 80 and 82 start to retract, the jaws 10i, 10j of the stem block 10 close again. This preserves the perfected orientation of the stem in relation to the stem block. Thereafter, gathering tools 80 and 82 retract. During the swaging operation, the ends of the swaged leads 1 and 4 as well as the ends of wires 3 and 5 are supported within the apertures in gathering tools 80 and 82. After completion of the swaging, and reengagement of the stem h by the stem block 10, the carriages 102 and 98 are withdrawn from the projecting wires of the stem h which is thereafter allowed to proceed with the conveyor to the next station.

From the foregoing, it is seen that the stem, initially positioned in the jaws of the workholder or stem block 10 to a sufficient degree of accuracy, is, in a sense, "taken in hand" for the trimming and swaging operations in the second and third stations, the stem being released from the jaws 10i, 10j of the stem block 10 while the work is being performed. All of the wires are located in a critical pattern for entry into the fixed die or cutter 56 of station B, and in Station C only the uncut reference wires 6 and 7 are roughly aligned in a preliminary operation so that wires 1, 3, 4 and 5 may be more accurately engaged by close-fitting apertures of the gathering tool. In both instances, at stations B and C, a large number of the stem wires are accurately supported and located while the glass button is freed for lateral shifting without, however, lifting away from its seat.

BOTTOM MICA STATION D

The fourth station D uses part of this same principle of adjusting the position of the work carried by the workholder to a very high degree of accuracy in the work station, just as the wires are severally located for cutting and swaging in the second and third stations. In the bottom mica-applying station D, the stem h is to receive a pierced mica disc bm, assembled on the stem by disposing ends of the stem wires opposite holes in the mica, and advancing the mica with its flat side facing the stem block. For a special reason, which will subsequently become apparent, the mica is not to be forced very close to the glass button. The glass button remains gripped by the stem block 10 in the mica-assembling station D.

The wires to be threaded through pierced holes in the mica were combed and straightened in the preceding cutting and swaging stations, but they do not project in the precise positions required by the mica-applying tools. The devices in the bottom mica station take the mica-receiving wires in hand and locate the wires very accurately to allow proper assembly of the pierced mica. This "taking in hand" of the critical part of the workpiece to accurately locate the same without depending on extreme precision as to its location in the work carrier, is a significant feature in this station as well as in other stations of the machine.

A further very important feature of the mica-assembling station D is the concept of piercing the mica in the very support that carries the pierced mica to the stem wires. By piercing the mica in the applying mechanism, the assurance is inherently realized that the holes will be in the proper positions for application to the supporting wires. It would be a most severe undertaking to locate micas with the required accuracy were the micas pierced previously in a separate machine, considering the tiny mount here of concern. It should be recalled that the high degree of accuracy required by the tiny parts being handled is a controlling consideration in this embodiment. Accordingly, the concept of piercing the part in the very holder which assembles the pierced part is most valuable; it eliminates need for any preliminary orientation of the work prior to loading into the assembly machine and the incident risk of misalignment.

The operations effected by the fourth station D which loads the bottom mica bm onto the stem wires, is illustrated in greatly enlarged views, FIGS. 33 to 38, inclusive. In FIGS. 33 and 34, a mica punch is shown having an upper die structure 120 slidably supporting piercing dies 120a and stripper plate or pad 120c. Below the upper die structure 120 is a feed turret 112 that has mica-supporting seats or apertures 112a through which the stripper plate 120c is free to pass. The feed turret 112 is intermittently indexed in a horizontal plane about a vertical axis to carry a disc of mica into a piercing position directly beneath the die 102a, moving away from the observer in FIGS. 33 and 34. Below the upper male die 110 is a fixed complementary female die member 120b arranged to receive the piercing elements 120a and providing a discharge passage for the waste mica fragments. Between disc or feed turret 112 and female die member 120b is a transfer plate 124 whose function is to receive the mica, contain it while it is pierced, carry it to the stem, and apply it to the appropriate stem wires that are critically positioned, as further detailed below.

When the feed turret 112 carries a disc of mica into the piercing position under the piercing die 120a, the mica carried in aperture 112a is in line with the registering upwardly flared aperture 124a in plate or transfer blade 124. Aperture or seat 124a is of a diameter such as to fit tightly around the mica, providing a force fit with the mica discs used. This tight fitting transfer plate 124 acts as a containing die ring to prevent the piercing punches near the edge from splitting the mica from the hole to the edge.

In operation, the feed turret 112 carries a disc of mica over the seat or aperture 124a of the transfer blade 124 and stripper plate 120c presses the mica from aperture 112a into the seat 124a so as to lie against the lower fixed die 120b. Thereupon piercing elements 120a form the required pattern of holes in the mica and are withdrawn, and the stripper plate 120c is raised. Feed turret 112 is free to index to bring the next mica into the piercing position. The mica is firmly wedged into the seat or aperture 124a, with the pierced holes precisely oriented, to be reliably carried to the stem by the transfer blade 124.

In the piercing operation, as illustrated in FIGS. 33 and 34, the mica is perforated with a pattern as in FIG. 35, shown enlarged several times. The transfer blade 124 is withdrawn horizontally from between the feed turret 112 and lower stationary die 120b, and is swung to a vertical position, as in FIG. 36. In this position, the mica disc bm is interposed between a pusher unit 126 and the cut and swaged stem carried by a stem block 10 into the mica-assembling station D. The holes in the mica are to mate with the patterned cut and swaged wires projecting from the stem. The transfer blade 124 carries the mica bm to those wires of the stem which have been accurately positioned for this purpose by combing and gathering tools in this station. Two sets of gathering tools 128, 130 are used for carefully aligning the free ends of uncut wires 6 and 7 to which the mica is to be applied. These tools are described below in greater detail. After the tools locate the wire ends, blade 124 advances to force the mica onto the wires. The pusher unit 126 is effective in the final part of the operation (FIG. 38) for driving the mica disc out of transfer blade 124. The parts are thereafter returned to their respective starting positions, and blade 124 receives the next mica disc for the next stem to reach the mica-assembling station D. Paired tools 128 and 130 move apart before moving away from the stem block 10, leaving bottom mica bm in the position at that stage. The tools are all to the left of the stem wires as viewed in FIGS. 36–38, so that the stem can travel laterally as the stem block advances with the conveyor.

The mechanisms for forming the bottom mica and applying it to the stem are shown in greater detail in FIGS. 27 to 32. In FIGS. 27 and 28, there is seen a stationary table 110 which constitutes a flat fixed support. A series of bottom micas are manually loaded into feed plate or turret 112 that is in sliding face-to-face contact with table 110. The micas are advanced in sequence from the manually loading area, represented by the portion of plate 112 that appears in FIG. 27. The feed turret 112 is carried by shaft 112b at the lower end of which there is a plate 112c carrying a series of cam followers 112d on its lower face. These cam followers engage a cam 112e rotatable on a horizontal drive shaft 114 for indexing the mica feeding turret 112 stepwise through an arc corresponding to the peripheral spacing of the holes or seats 112a.

A stationary frame 116 overlies a portion of the mica feed turret 112 (see FIG. 27) and carries a number of operating mechanisms. These gauge and detect the presence of micas in the seats or holes 112a, and accomplish the further functions as will be seen. As the turret travels counterclockwise in FIG. 27, it passes the gauging station 118 and later to the mica piercing-station 120. It is important that only one mica shall reach the piercing die, and it is important that a mica shall surely be assembled on each stem carried by the stem blocks 10 to the mica-assembling station. The gauging mechanism is incorporated in the bottom mica station D in order that the punch may not be wrecked by excessively thick micas or accidental loading of double micas in individual holes 112a, as well as for controlling machine operation in the event that no mica has been inserted into a hole 112a. As seen best in FIG. 28, gauge 118 includes a vertically slidable feeler shaft 118a, mounted in frame 116 and pressed against a mica brought into registry below it by the feed turret 112. Feeler shaft 118a is raised and lowered by oscillatory lever 118b having a roller 118c at its right end in FIG. 28 riding in a horizontal channel at the upper end of feeler shaft 118a. Lever 118b is oscillated by link 118d and is operated by cam follower 118e (see also FIG. 27) carried on the arm 118f and biased by spring 118h against cam 118g on shaft 114. The cam 118g acts positively to raise feeler shaft 118a, and spring 118h biases cam follower 118e against the cam 118g and urges feeler shaft 118a resiliently downward against the micas in holes 112a of the indexed feed turret 112. Feeler 118a thus bears yieldingly downward against the micas in holes 112a of the indexed feed turret 112.

Movement of the feeler shaft 118a rocks multiplying arm 118m through an arc accurately representing the thickness of the mica above the table 110. As best seen in FIG. 28 and 29, downwardly biased feeler shaft 118a has a shoulder 118i that engages crank 118j of horizontal shaft 118k causing the multiplying arm 118m to rock toward one or the other of the electrical contacts 118n carried by insulating supports, or to rest between those contacts. If the mica under test is too thin or missing, or if there is an excessively thick or a double mica in the seat 112a of the feed turret 112, the arm 118m will complete a suitable circuit (not shown) through one of the contacts 118n, for shutting down the entire machine including the mica piercing and applying mechanism until the mica operation can be corrected. It is important that all of the mounts passing the bottom mica station D shall have bottom micas. The very fine piercing die, incorporated in the machine to attain the high precision of location of the perforations in the mica, should also be protected against occasional insertion of excessively thick or double micas which might wreck the die. The gauging mechanism achieves these results.

Reference will now be made to the details of the mica-piercing mechanism 120 illustrated best in FIGS. 27, 28, 33 and 34. The upper piercing die 120a is carried by a head 120f which is positively reciprocated through a fixed stroke by a lever 120g, link 120h, and a crank 120i on shaft 114. Downward pressure is transmitted to shafts 120e of the pressure pad and stripper plate 120c by spring 120j, upright shaft 120m and lever 120n. This lever is coupled to shaft 120m via bearing plates 120k. To lower the pressure pad and stripper plate lever 120n is rocked by link 120p connected via the cam following lever 120q to cam 120r on shaft 114. The stripper plate and pressure pad 120c are raised with the carrying head 120f by virtue of block 120s (FIG. 34). This overcomes the tendency of spring 120j to hold the pressure pad downward continuously.

As stated earlier, the pressure pad 120c forces each bottom mica into a tight fit in the seat or hole 124a of transfer blade 124. This blade fits into a recess directly below and in engagement with the lower face of indexing feed turret 112, and serves to remove the pierced micas and hold same in accurate orientation for assembly to the accurately located ends of the long stem wires. The operating mechanism for the transfer blade 124 is shown in detail in FIGS. 27, 28 and particularly in FIG. 32. From FIGS. 36, 37, and 38 it will be clear that the transfer blade 124 slides horizontally to clear die 120b and swings upward from the horizontal mica-receiving position to a vertical mica-applying position (FIG. 36); and then it advances frontally through a forward thrust stroke toward the stem in stem block 10.

Transfer blade 124 is pivotally mounted in a bearing 124b (FIG. 32) which is carried on shaft 124c so as to be horizontally reciprocable toward and from the stem block 10 (shown in broken lines at the bottom of FIG. 27). Shaft 124c is prevented from rocking by being fixed to block 124d, in turn fixed to shaft 124e, both the shaft 124c and the shaft 124e moving in slide bearings 110a in table structure 110. The transfer blade 124 and its bearing 124b are reciprocated horizontally by a drive linkage pivotally connected to block 124d and including a resiliently telescopic link 124f connected to cam-following lever 124g engaging positive, constrained cam 124h on shaft 114. The forward stroke of shaft 124c carries the transfer blade 124 away from the piercing die and toward the stem block 10, the stroke toward block 10 being mechanically limited by a suitable stop at an accurately determined end point.

The transfer blade 124 is actually thrust along a straight line path toward the stem block 10 after being swung through 90° from the horizontal position shown in FIG. 32 to the vertical position in FIG. 36. This swinging motion is effected by a crank lever 124i having an antifriction roller in a channeled member 124j on the vertically slidable shaft 124k. This shaft is urged downward in order to swing the transfer blade 124 into vertical position, the end point of this clockwise swing (FIG. 32) being determined by head 124m engaging frame 116. The head 124m is normally made adjustable by details not shown. The shaft 124k is reciprocated vertically through a telescopic longitudinally yielding link 124n, cam following lever 124p, and positive, constrained cam 124r on shaft 114 (see FIG. 28).

When cam 124r biases the channel member 124j downward to an accurately fixed extent determined by the adjusted position of head 124m, the bearing 124b carries the transfer blade 124 horizontally forward by virtue of the cam operated linkage driven by cam 124h. During much of this horizontal travel or thrust, the transfer blade 124 is maintained in the vertical position accurately by virtue of the engagement of crank 124i in channel 124j, and by engagement of head 124m with frame 116.

The transfer blade 124 thus receives and tightly encircles a mica pierced with the holes in accurately predetermined relationship and carries the mica toward the stem block 10 for application to the long wires 6 and 7, wires that serve as reference wires in subsequent operations.

In FIGS. 31 and 36, the pushing mechanism 126 is shown. This also serves as a further check on the presence of a bottom mica. It is seen to include a pair of supporting shafts 126a and 126b slidable in a fixed portion 110c of the machine. Through links 126c, pivoted bell crank 126d, and positive, constrained cam 126e on shaft 114, the detecting and pushing head 126 is horizontally reciprocated. The bell crank 126d is supported on a long shaft 126f operable in fixed bearings 126g (FIG. 27).

The transfer blade 124 is swung from below feed plate or turret 112 along its horizontal travel, as indicated in FIG. 34, and is swung through 90°, as indicated in FIG. 36. Finally the blade 124 is thrust toward stem block 10 through a predetermined forward stroke, as indicated in FIG. 37. The 90° swing brings the supported pierced bottom mica into position between the stem block 10, and pusher unit and detecting head 126. Both the transfer blade 124 carrying the bottom mica and head 126 approach the stem block 10 together, as seen in the timing diagram of FIG. 105. Head 126 gains on the transfer blade 124, until finally, after the transfer blade is arrested as shown in FIGS. 37 and 38, the head 126 presses bottom mica onto reference wires 6 and 7.

The tools for taking hold of reference wires 6 and 7 and precisely locating the free ends thereof include a first pair of laterally movable gathering jaws 128a, 128b, best shown in FIGS. 36, 36A, 37 and 37A. One of the gathering tools, tool 128b, is formed with V-shaped notches 128c as shown in FIGS. 36A and 37A. Tool 128b also has a vertical groove 128d complementary to and receiving a rib 128a′ on the gathering tool 128a. These two jaws or gathering tools 128a and 128b, which may be designated as a pair by numeral 128, laterally engage and accurately locate the reference wires 6 and 7 in relation to the holes in the mica carried by the transfer blade 124. However, the precision that may be realized in this fashion is not always adequate, especially in the case of extremely small parts, fine wires, and close tolerances. For this reason, an additional pair of locating and gathering tools or jaws 130 are here provided. These tools are seen in FIGS. 37A, to be closed against each other and forming aligning holes (FIG. 36A) receiving the ends of the reference wires 6 and 7. They might be formed as a single die, like the cutting die at station B, except that here the die must be split when the stem is to be freed after the mica has been applied. The aligning holes 130a have flared mouths 130b opening toward the wires 6 and 7 of the stem to facilitate threading onto wires 6 and 7 during the advance of jaws 130 as a unit toward the stem block 10. Thereafter, the transfer blade 124, by virtue of its tight fit against the peripheral edge of bottom mica, is effective to force that bottom mica onto the uncut reference wires 6 and 7. Jaws 130 then separate, enabling head 126 to push the bottom mica further along wires 6 and 7.

The mechanisms for operating the gathering and combing tools or jaws 128, 130 are shown in FIGS. 27, 28 and 30. The main drive shaft 114a rotates continuously, and through gearing drives the cam shaft 114 and also drives the intermediate shaft 114b through other gearing. The latter shaft, through one-to-one gearing and chain 114c, drives another shaft 114d which in turn imparts motion to cam shaft 114e.

The gathering tools 128, 130 are mounted on a fore-and-aft slidable carriage 132 fixed to sliding rods 132a and 132b in bearing 132e. These shafts are reciprocated through the required stroke by a suitable linkage including cam follower 132c, and positive, constrained cam 132d on shaft 114e. The fore-and-aft sliding of the jaw assembly is effective to pick up and comb wires 6 and 7 for preliminary positioning, and to thread the ends of stem wires 6 and 7 through the aligning holes 130a in the jaws 130.

In FIG. 30, the preliminary gathering tools or jaws 128a and 128b are seen to be freely pivoted on shafts 132a. The jaw 128b has a downward extension 128e engaging stops to fix the end point of its travel in transversely approaching wires 6 and 7 of the stem. Segmental gearing 128f interconnects jaws 128a and 128b to operate as a pair. The depending arm 128g is operated by link 128h, a lever-support cam follower 128i, and a cam 128j on shaft 114d.

Fine combing jaws 130 have similar interconnecting gearing and a mechanical stop 130c coacting with depending arm 130d to control the centering of the jaws 130 and to pivot the jaws as a pair to and from each other. Jaws 130 are operated by link 130e connected to a cam following lever 130f driven by cam 130g on shaft 114b, lever 130f being spring-biased against that cam.

Figure 105:
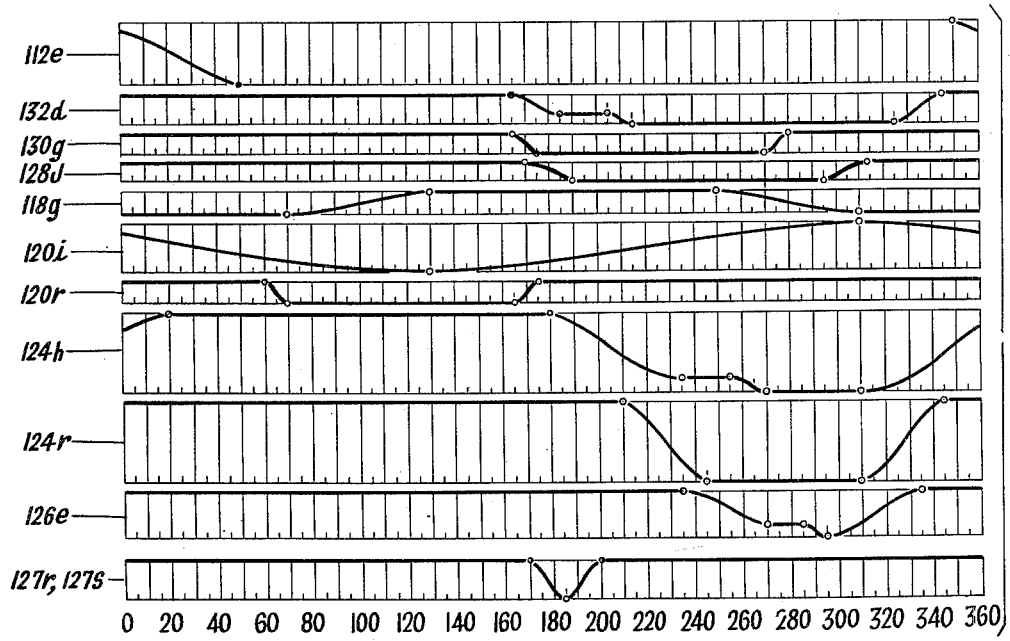

The timing of all the tools of this station as already described is illustrated in self-explanatory FIG. 105.

The pusher unit 126 carries a spring-biased insulated contact 126h (FIG. 36) which is connected to a detecting circuit (not shown) for completing a control circuit through 128 in the event that a bottom mica is locking in any assembling operation. If no bottom mica is present, this electric circuit is effective to disable succeeding operation stations to avoid wasting of parts on a stem which does not have a bottom mica. However, the machine as a whole is arranged to continue to operate despite the lack of a bottom mica at this phase of the operation. For a suitable control circuit for this purpose, see my copending application Serial Number 790,570, filed December 9, 1947.

It has been noted that FIG. 105, the timing diagram of this station D, is largely self-explanatory. This is true of the curve of operations effected by cam 112e for indexing mica feed plate; by eccentric 120i for the piercing die; by cam 120r for the stripper 120; and by 118g for the mica-gaging feeler. These operations take place during, and shortly after, the indexing of the main stem-block conveyor, in providing transfer blade 124 for application to the stem newly delivered to this station.

Cam 132d starts to carry the subcarriage 132, with tools 128 and 130 toward the stem block when arrested in station D. Tools 130 close to form passages having flared openings facing the stem block, approaching the ends of the #6 and #7 stem wires. Tools 128 advance, separated, until they can embrace the long stem wires, whereupon they close and receive those stem wires, to slide along the wires when subcarriage moves further toward the stem block and when wires #6 and #7 penetrate tool passages 130a.

Cam 124h carries transfer blade 124 forward, out of and under mica feed plate 112 during the foregoing operations of gathering tools 128 and 130; and after cam 124r swings blade 124 into vertical position, cam 124h advances the upright blade 124 frontally toward the stem block 10. In the final part of its stroke, blade 124 carries its mica forward to be penetrated by the short projecting #6 and #7 wires accurately held by tools 130.

Meanwhile, cam 126e drives pusher 126 forward, and pushes the mica out of blade 124 and along the stem wires, tools 130 having been separated at this time by cam 130g. The jaws 128 separate at this time, so that cam 132d can effect withdrawal of both tool pairs 128 and 130 without disturbing the bottom mica. Transfer blade 124 and pusher 126 are suitably withdrawn, the latter first, to be in position for the next cycle when the stem with the bottom mica is advanced to the next station and the next stem is advanced into station D.

SHORT LEAD BENDING MECHANISM

Adjacent the bottom mica mechanism just described it is convenient to include a further useful tool. It sometimes happens that the short wires are disposed in convenient positions in stations B and C, near but not in required position. They are here bent again so that the side rods of the grids that are later to be assembled will not butt against the ends of the short wires.

In FIGS. 38A, 38B, 38C there are shown clearance-providing tools which are effective to position the short-length wires 2, 8 and 9 for unimpeded assembly of the grids g1, g2 in following stations. As seen in FIG. 38C, which is a view looking toward the mount showing the wire orientation and the position of the grids g1, g2 to be assembled (illustrated by the dot-dash lines), there is a possibility that short length wires 2, 8 and 9 defining the abutment for the bottom mica bm may interfere with the grid side rods to be projected through the bottom mica. These wires should be close to the side rods of the grids, since the wires are ultimately to be welded to the side rods for terminal leads for those electrodes. However, they may occasionally interfere with the mechanical assembly, a difficulty cured by the mechanism here being considered.

A pair of clearance tools 127a, 127b are mounted for swinging movement into the operative positions of FIG. 38C wherein the curved convergent edges of the respective tools function to accurately orient the short length wires 2, 8 and 9. The clearance tools 127a, 127b are mounted on heads 127c, 127d fixed to pivoted supports 127e, 127f. Though not shown in detail, the mounting of the respective tools on the heads 127c, 127d is such as to permit the tools to be locked in various adjusted positions relative to the stem in stem block 10. The supports 127e, 127f are pivoted at 127g, 127h and are biased toward an interposed fixed stop (not shown) by appropriate springs 127j, 127k. The springs 127j, 127k act on the chains 127l, 127m trained over the sprockets 127n, 127o for the respective shafts 127g, 127h to bias the supports 127e, 127f toward the limiting position determined by stop, as illustrated in FIG. 38B. The tools 127a, 127b are periodically retracted from the operative position illustrated in FIGS. 38B, 38C by means of the cam following levers 127p, 127q, connected to the chains, respectively, and riding on controlling cams 127r, 127s on the shaft 20. Accordingly, while a bottom mica bm is being assembled in the station D, the tools 127a, 127b are effective to properly adjust the short length wires 2, 8 and 9 to positions of clearance for subsequent operations, particularly for the assembly of the grids g1 and g2.

NO. 1 GRID ASSEMBLY STATION E

Referring to FIG. 1B, station E is shown as adding the No. 1 grid to the bottom mica bm previously assembled to the stem or incomplete mount. Not only is the grid g1 assembled to the mica, but also a short strap or grid stop gs is secured to a grid side rod. This stop is tight against the back or under face of the bottom mica, which mica is confined between this grid stop on one surface and the last helical turn wound around and secured to the grid side rods. These grid side rods project through holes pierced in the bottom mica.

In order to attach the grid stop gs to the side rods, the grid stop is welded in place to one of the side rods after both of the side rods have penetrated appropriate holes in the bottom mica bm. By pushing the mica to an intermediate position in station D, only part way along the stem wires 6 and 7, space is provided in station E for the tools that assemble and weld the grid stop to the grid side rod. A substantial distance is allowed between the intermediate position of the bottom mica bm and the projecting ends of wires 1, 3, 4 and 5, and a still greater distance is allowed between the bottom mica bm and the free ends of the shortest leads 2, 8 and 9. The swaged portions of the intermediate leads 1 and 4 and the short leads 2, 8 and 9 define a datum plane where the bottom mica bm is seated ultimately.

From the following discussion of the No. 1 grid station E, illustrated in plan view in FIG. 39, various principles will be recognized as having application here which were previously described in connection with preceding stations. It is clear that every effort is made to locate the stem block 10 accurately in each work station. However, because of various dimensional tolerances and imperfections in adjustment of the stem block 10 in relation to the tools in the station, and further where very fine, tightly fitting parts are used, something additional is desirable for assuring routine success. Tools in this station take hold of certain wires projecting from the stem, similar to combing tools in work stations B, C, and D where cutting, swaging, and mica-loading were involved and where the work to be processed is "picked up" and oriented in respect to the working tools at each station. Additionally, the orienting operation effected by sliding the tools along the stem wires is an operation common to various stations. This operation might be termed "combing" in contrast to operation of the V-notched tools, which, in gripping, merely gather the gripped leads.

In the general plan of operation of this station, a series of grids are loaded with a side rod extending across the rails of a "magazine" conveyer 140 in FIG. 39. Grids from this conveyer are transferred by a cradle 142 that swings through a 90° arc from the magazine to the delivery position shown in FIG. 39. A grid inserter or transfer head 144 moves forward to receive the grid side rods in recesses in the end thereof, and the swinging cradle drops out of the path of the transfer head 144 which thereupon moves forward and inserts the grid through the preformed apertures in the bottom mica *bm*.

Additionally, a supply of strip stock is converted by the assembly 146 into grid stops which are received and moved to a point behind the bottom mica *bm* preparatory to being welded to a grid side rod by a transporting and welding mechanism 148.

Gathering and combing tools 150 and 152 are provided for perfecting the orientation of the wires 6 and 7 which serve a reference function here, of orienting the preformed holes in the pierced bottom mica in precise position for the grid side rods. This perfected orientation is effected in the same combing tool that later directs the side rods into the bottom mica holes, the tool being funneled fore and aft. In the following discussion of these mechanisms and their coordination, reference should be made to the timing diagram of FIG. 106.

As mentioned previously, the welding tools 148 are effective to transport the formed grid stop *gs* to a position behind the bottom mica *bm*, and then to apply the grid stop to the grid side rod after the grid has been inserted with proper pressure to confine the bottom mica between the grid stop and the lowermost fine grid lateral wire. The welding head and stop-forming mechanisms are all carried by a movable bed plate 152, shown in FIG. 39.

The mechanisms for forming and applying this grid stop travel fore-and-aft in relation to the incomplete mount M on stem block 10. The drive for these mechanisms extends from the main drive shaft 154 of this station through bevel-gearing to telescopic drive shafts 154c, and through additional bevel-gearing to a further auxiliary drive shaft 154d. Bed plate 152 is moved toward and from stem block 10 by a linkage 152a connected to cam following lever 152b riding in constrained cam 152c on shaft 154b. It may be remarked that all of the drive shafts in this unit operate at the same speed of rotation by virtue of 1-to-1 gear connections throughout. Bed plate 152 has a depending boss 152k carrying shaft 152m fore-and-aft so as to slide in fixed bearing 152n on bed plate 139 (FIG. 40). An additional shaft 152p is fixed in place above plate 139, and guides portion 152q depending from plate 152 for accurately guided fore-and-aft straight-line reciprocation of bed plate 152.

The mechanism 146 for forming the strip material into grid stop *gs* is shown in greatest detail in FIGS. 40, 41 and 42. This mechanism is carried by bed plate 152 and contains a vertical drive shaft 146a, deriving its power through gear 146b in mesh with a gear train, connected as shown in FIG. 39 to shaft 154d.

Shaft 146a carries a series of face cams 146c, 146d and 146e (FIG. 40) which have their operative rise and dwell portions on their respective peripheral edges. Shaft 146a additionally carries barrel cam 146f which has its operative rises and falls on the end at the top of this unit. Cam 146f rocks lever 146g, and a spring 146h holds this lever against the surface of the cam. A vertical slide 146i carried by link 146j on lever 146g reciprocates vertically in time with the whole machine, once per cycle. Anti-friction rollers 146k for the vertical slide 146i, on fixed shafts, insure smooth operation of this slide unit. The vertical slide 146i includes two parts, one of which 146i' is horizontal slidable in the unit to the position of FIG. 40 for gripping strip stock S, and is retractable to release the stock. During the downward stroke of the vertical slide 146i', the plate 146i' is pressed against strip stock S by horizontally slidable member 146m (having antifriction rollers at its ends) operated by cam 146e. During the upward stroke of slide 146i, the pressure against plate 146i is relieved. During this same upward stroke of slide 146, a plate 146n below plate 146i' is pressed by cam 146d to grip the strip S. By alternate action of the elements 146m and 146n under control of their respective cams and of the lever controlling the reciprocation of slide 146i, the strip stock is fed stepwise downward. A fixed horizontal cut-off blade 146p and a movable coacting blade 146r operated by cam 146c shear the strip stock thus fed.

The sheared-off lengths of strip stock are ultimately shaped into a grid stop *gs* by a forming tool 146s, as shown in FIGS. 41 and 42. The tool 146s is carried by a horizontal reciprocating slide 146t. The grid stop *gs* is seen to wrap around tool 146s and assume a horseshoe shape in response to movement of the tool into the channel formed in die 146u, across the feed path of the strip stock.

By proper timing, forming tool 146s is pressed lightly against the straight strip stock projecting at the bottom of the feed path as the strip is cut off. The lower channel members of stationary die 146u, advantageously is strongly magnetized to further insure holding the strip stock upright against the front face of die 146u and to keep it from falling when cut. If desirable, a strip-supporting end stop in the feed path of the strip may be provided, although this is not actually necessary. The movable cut-off blade 146r thereupon frees the projecting length of strip stock, and forming tool 146t forces the initially straight strip stock between the two spaced parts or channel members 146u, acting as a female forming die coacting with the male element 146s. The drive for the horizontal slide 146t is from cam follower 146v operated by cam 146w on shaft 146a, this being a constrained cam effecting positive action. Cam follower 146v slides in fixed slots 146x extending radially away from shaft 146a.

When the formed grid stop *gs* emerges from the stationary channel member 146u at the rear face of the forming die (FIG. 41), it is still supported by tool 146s and has a degree of "spring" which produces a tendency for the U to spread out of the idealized shape illustrated in FIG. 42.

As spread, the trailing edges of the grid stop abut against the left-hand faces of channel members 146u (FIG. 41) to be stripped from male die member 146s as slide 146t withdraws to the right. The tips 148a of the welding unit, to be described, are employed to receive and grip the formed grid stop. Welding tips 148a thereafter transport the formed grid stop, apply the grid stop to one of the grid side rods, and welds the grid stop in place.

The combined grid stop transferring and welding mechanism 148 is mounted as a unit on plate 152 that also carries the grid stop former, as previously described, and, because of this, perfect alignment of the welding unit in relation to the grid stop former is maintained. As a transferring unit for the grid stop, the welder in FIG. 39 starts at a point to the right of the stem axis of the mount M adjacent the delivery end of the grid stop former 146 and first moves as a unit away from the grid stop former to the left of the stem axis of the mount M; it then moves toward stem block 10, and finally to the right, behind the bottom mica previously assembled on the stem.

The welding unit 148 (FIGS. 39, 40, 54) has opposed welding tips 148a and employs parallel leaf-spring suspensions 148c (the leaf springs being viewed edgewise in FIG. 40) which bias the welding tips 148a toward each other. Additionally, a reciprocable cam 148d is movable horizontally, to separate the welding tips and even when separated, they are biased to engage the grid stop gs as shown in FIG. 41. During the weld, cam 148d is shifted to the left in FIG. 40 to cause the welding tips to apply welding pressure. In order to operate cam 148d, a pivoted bell crank 148e is provided on the standard 148f of the welding unit. This standard is horizontally reciprocable along supporting shafts 148g to move to and from the grid stop former 146 and across the stem axis of the mount M projecting from the stem block 10. During the transverse horizontal motion of the welding unit, bell crank 148e moves in a grooved head 148h on a vertical slide 148i. The slide is supported by appropriate bearings and in turn is operated by bell crank 148j and link 148k coupled by cam follower 148m to cam 148n on shaft 154c. Thus, by virtue of the cam and the linkage just described, welding tips 148a can be operated to apply and relieve welding pressure, that is, they are separated and moved together as desired. The prescribed spacing is maintained despite the transverse shift in horizontal position of the entire unit because the linkage connection is maintained through the provision of groove 148h accommodating a roller on the adjacent end of bell crank 148e. The actual welding is effected by means including a switch 148x, mechanically closed by downward shift of slide 148i when welding pressure is applied. This energizes a pulse spot welder 148y connected by flexible wires to the welding tips 148a. These welding tips are carried by insulating blocks at the end of their spring suspension arms.

In order to transport the welding unit to the right and left in FIG. 40, standard 148f is slidable along the supporting shafts 148g on plate 152. A link 148p connected to standard 148f is operated by cam following lever 148r, which is operated in turn by positive, constrained cam 148s (see also FIG. 39).

The operation of units 146 and 148 is effective to accurately form and transport grid stops gs of extremely small dimensions for assembly to a grid side-rod in the final form illustrated in FIG. 54.

The view point in FIG. 54 is opposite to that of FIGS. 39 and 40. FIG. 54 is taken looking away from the stem block 10 so that right-to-left in FIGS. 39 and 40 becomes left-to-right in FIG. 54. It is possible that the welding operation shown in FIG. 54 may for some reason be unsuccessful, and the resultant weld might be inadequate to hold the grid stop gs to the side rod of the grid. Or it may happen that the grid stop gs when welded to the side rod of the grid, is also united to the welding tips 148a. When this happens, the partially completed mount M present in the No. 1 grid station is destroyed or incomplete. Thereafter, the only concern is that the station E should be in condition for successfully continuing operations on the partly completed mounts subsequently advanced by the stem block 10 on the conveyer 12 after leaving the bottom mica-assembling station D. For this reason it is important for the tips to be cleaned, and that the grid stop gs is stripped from the tips to properly condition the welding unit 148 for receiving a newly-formed grid stop delivered by the former 146.

For this purpose, there is provided a mechanical stripper 148t (see FIGS. 39, 39A, 40, 41 and 54) which is slidably mounted at the rear surface of the horizontally displaceable standard or upright 148f. In FIGS. 39 and 40, the stripper 148t is urged by a tension spring 148u to the right so that a portion 148v of the stripper 148t abuts against a lateral surface of standard 148f (FIG. 39A). As standard 148f moves to the left and away from the axis of the stem block, it carries with it stripper 148t far enough for the extreme left end of the stripper to engage stop 148w. Thereupon, the stripper 148t is arrested while standard 148f and welding tips 148a continue leftward travel. Since the stripper 148t has been arrested and the welding tips travel over the stripper, the material possibly adhering to the welding tips will be stripped, thus clearing the welding tips to receive the next grid stop gs. The operating cam 148s which effects the right-to-left and left-to-right motions of the welding unit 148 is formed somewhat differently for the return travel of standard 148f, than during the forward travel when the grid stop gs is received from the former 146 and moved into position for assembly onto the mount. The standard 148f moves to the left a substantial distance further when moving away from the mount M during the return stroke, than it does in moving away from the grid stop former (FIG. 1) during the first half of the cycle. Otherwise the stripper 148t would engage stop 148w just after having received the grid stops gs, serving to unload the welding tips 148a before reaching the assembled position relative to the stem block 10.

The first grid-applying station E, described to this point, includes the stock former 146 for the grid stop gs, and the grid stop transporting and welding unit 148. The grid stop gs when welded to one end of a grid side rod of an inserted grid, is effective for holding the grid securely to the bottom mica bm. The mechanism for feeding the grids individually and inserting them through the patterned holes in the bottom mica bm in condition to receive the grid stop gs will now be detailed.

In FIG. 39, the grid feeding mechanism or "magazine" conveyor 140 is shown in plan view, FIGS. 43 and 44 showing further detail. This mechanism is very similar to that described in my copending application Serial No. 790,570, filed December 9, 1947, for a Mount Assembling Machine. The grid feeder 140 includes a pair of rails 140a, 140b which are reciprocated horizontally.

These rails supporting the grids extending transversely as shown in FIG. 39, reciprocate horizontally to the right and left in FIG. 43 to advance the grids stepwise. Rails 140a and 140b are carried by supports 140e and 140c, respectively, the latter being on shafts 140d journaled in yokes 140e at the front and the back of this unit. Shafts 140d carry sprockets 140f and are connected together by a chain, for maintaining the rails in parallelism. The shafts 140d, suitably constrained against endwise travel in yokes 140e, are threaded at their intermediate portion where they pass through depending element 140c. By rotation of sprockets 140f conveniently through manipulating knob 140g on one of the shafts, the depending element 140c may be moved to the right and left in FIG. 44 and thereby the spacing between rails 140a and 140b may be adjusted to accommodate grids of different lengths. Yokes 140e are interconnected by a pair of shafts 140h which are slidable in a pair of fixed bearings 140i in frame 140j secured to the base plate 139.

The entire unit described to this point, including parts 140a to 140h inclusive, is reciprocated horizontally, to the right and left in FIG. 43, by means of a link 140k, a cam following lever 140m having a pivot 140p at its lower extremity, and constrained cam 140n on shaft 154b.

Between horizontal reciprocating rails 140a and 140b, is a further pair of rails 140q carried by a head or plate 140r on shafts 140s which are vertically reciprocable in bearings 140t on standard 140j. The lowermost extremities of shafts 140s are interconnected by a cross bar 140u, which is vertically reciprocated by link 140u. One end of this link is pivotally connected to the crossbar 140u and its other end is pivotally connected to and operated by lever 140w having a follower 140x spring-biased against the periphery of cam 140y on shaft 154b.

As seen in FIGS. 39, 43 and 44, the center rails 140q, which move as a unit, have longitudinally spaced upstanding fingers 140z. The individual grids are disposed transverse of rails 140a, 140b and 140q, and are longitudinally spaced along the rails in a series of fingers 140z. Cams 140n and 140y are formed to produce properly alternating reciprocation of these pairs of rails. Rails 140a, 140b reciprocate horizontally and rails 140q reciprocate vertically, to advance the grids stepwise.

It may be assumed that the grids are disposed on rails 140a and 140b, and spaced apart as dictated by projections 140z on rails 140q. These rails then move to drop the fingers 140z below the level of the grids carried by rails 140a and 140b. While rails 140q remain in this lowermost position, rails 140a and 140b are reciprocated horizontally to the right in FIG. 43 by cam 140n, and the entire series of grids is advanced through a stroke exceeding the separation of fingers 140z. While rails 140a and 140b remain thus positioned in the advance limit of their stroke, rails 140q rise to position the fingers 140z between the various grids. At this time, the horizontally reciprocable rails commence their return stroke under the influence of cam 140n. In so doing, rails 140a and 140b shift the grids frictionally so that they are pressed against fingers 140z. This insures the proper separation among the grids of the series and the systematic advance of the grids by the feed mechanism represented by rails 140a and 140b and rails 140q. After this sequence of operations, the cycle is repeated during the next machine sequence, by first lowering rails 140q, advancing rails 140a and 140b, raising rails 140q to interpose fingers 140z between the grids of the series, and finally returning rails 140a and 140b to the left in FIG. 43.

In the general description of this station, the cradle 142 was described as oscillating through 90° about a vertical axis from a grid-receiving position relative to the feed mechanism 140, to grid-assembling position along a thrust path coinciding with the axis of the mount M. In the latter position, the cradle was aligned with the grid inserter or pusher 144 (FIG. 39).

The mechanism for oscillating the cradle or carriage 142 through 90° and also for moving it upward into alignment with grid inserter 144 is shown in FIGS. 39 and 45. In these figures, a standard is shown having a pair of horizontally extending arms 142b and 142c, the latter of which forms a bearing for a vertical telescopic shaft 142d about which the arm 142e swings. Shaft 142d is made in telescopic form to assure that arm 142e may not only swing through the 90° arc described, but also to permit elevation to position a grid in line with grid inserter 144, and then dropping out of the way, as required. The two-part telescopic shaft 142d is maintained in extended condition by an internal compression spring 142f. Arm 142e is secured to the reciprocable portion of telescopic shaft 142d and is in fact vertically reciprocated by engagement with a pin 142g carried by a vertically reciprocable slide member 142h having a cam follower 142i raised and allowed to drop by cam 142j on shaft 154b. The slide member 142h is vertically mounted in stationary bearing 142k. During the rotation of the cam shaft 154b, cam follower 142i rises and falls and this in turn raises and lowers the arm 142e carrying the grid transfer cradle 142.

The arm 142e is oscillated from the position of FIG. 45 forward towards the viewer through a 90° arc into the grid-receiving position, this oscillation being to the right from the position shown in FIG. 39 to the grid-receiving position wherein the transfer cradle 142 is adjacent conveyer 140. For actuating arm 140e in this way, an arm 142m is secured to the vertically reciprocable telescopic shaft 142d, which is pulled to the right in FIG. 39 by a long connecting rod 142n under control of bell crank and cam follower 142p which is spring-biased against the periphery of cam 142q. As seen in FIG. 45, the cam 142q is mounted on shaft 154, and cam follower and lever 142p is carried on a stationary pivot 142r.

The operation of the mechanism for moving the transfer carriage or cradle 142 through its required sequence of operations may be summarized as follows in conjunction with the timing diagram of FIG. 106.

The start of the cycle finds cradle 142 in the thrust position in front of the grid inserter 144 where it remains for the period of time necessary for the inserter 144 to advance and receive the grid in cradle 142. Immediately thereafter, under control of cam 142j, the arm 142e is lowered by the action of spring 142f within the telescopic shaft 142d. Thereafter the long connecting rod 142n pulls transfer arm 142e toward the observer in FIG. 45, under control of cam following lever 142p and cam 142q. When these motions have been accomplished, the cradle 142 is in the grid-receiving position in front of the rails 140q, somewhat below the upper edge of rails 140a and 140b, as seen in FIG. 43. The operating arm 142e is then elevated to receive the foremost grid extending across rails 104a and 140b. The front ends of rails 140a and 140b are suitably relieved for receiving the nesting cradle 142. Thereafter, under the influence of cam 142j, the rise of the cradle 142 lifts the foremost grid from the conveyer. Cam 142q swings the cradle 142 carrying a grid through 90° into the thrust position shown in FIGS. 39 and 45.

The grid inserter 144, described generally heretofore, is shown in FIGS. 45 and 49. In FIG. 45, this grid inserter 144 is shown supported by a slide 144a which is movable in slide bearings in arms 142b and 142c. The supporting slide 144a is reciprocated to the right and left in FIG. 45, and to and from the stem block 10 in FIG. 39, by means of a link 144b at the end of cam-following lever 144c, having a fixed pivot 144d on base plate 139. The lever 144c has a cam-following roller 144e which is controlled by cam 144f on shaft 154b.

Grid inserter 144 has a stripper 144g functioning to assure that any grid inserted during a previous cycle will not interfere with the insertion of a new grid properly positioned and supported in the transfer cradle 142. As seen in FIG. 49, the grid inserter 144 is yieldably supported in slide 144a, and is movable to the left only by compressing spring 144k, as occurs when inserter 144 advances against a grid. A projection 144m arrests the travel of inserter 144 to the right. Stripper 144g slides between the top of slide 144a and a plate 144j that is fastened to slide 144a. A pair of stops 144h and 144n project upward from stripper 144g. The stripper is free to operate along slide 144a for a distance equal to the spacing between the stops, minus the width of plate 144j. A further plate 144o, having a hole receiving the stop or pin 144n is arranged in a slide bearing in arm 142c. A friction pad 144p, which is pressed by spring 144q against the upper surface of plate 144o tends to hold sliding plate 144o fixed with the frame arm 142c to preclude movement. Spring 144q is contained in a barrel 144r extending upwardly from arm 142c, the spring compression being adjustable by the screw 144s for adjusting the friction pad pressure.

In operation, slide 144a moves to the right and to the left, and it will be seen that this slide 144a will pick up stripper 144g, despite the effect of friction pad 144p. This occurs when plate 144j on slide 144a engages pin 144h, during travel of slide 144a to the right. When the slide 144a reaches the extreme position nearest the stem block 10 at which a grid is inserted, stripper 144g remains fixed in position by virtue of the friction pad 144p for the beginning of the return stroke of grid inserter 144. When the plate 144j engages pin 144n, the slide 144a will force the return stroke of plate 144o despite the frictional drag of pad 144p. In this way, during the fore-and-aft motion of grid inserter 144, the stripper 144g always lags the grid inserter 144 by a short distance. This distance is selected, as will be seen, to make sure that the grid which has been inserted by the grid inserter 144 is not also pulled away by the grid inserter. At the start of the cycle, slide 144a moves forward to project the leading end of grid inserter 144 forward relative to the hook 144g' on the stripper 144g, thus conditioning the grid inserter to receive a grid from the transfer carriage 142.

It is seen in FIG. 49, that the grid inserter 144 has seats or openings 144t which are outwardly flared at their respective mouths, and that the oscillating cradle 142 not only supports the grids but also abuts the ends of a side rod at the right extremity, by virtue of an upstanding finger 142s. While shown as abutting only one grid side rod, finger 142s may profitably be extended across both side rods. Therefore, as grid inserter 144 advances to force the seat or opening 144t over the left ends of the grid side rods, finger 142s provides resistance at the right ends of the side rods to assure actual forcing of the grids into the seats 144t. The forward end of the right guide rail 140a (FIG. 39) is relieved at 141 in order to receive the upwardly projecting finger 142s.

Devices of this station E that have thus far been detailed deal with individually supplying grids to a grid inserter and with preparing and precisely positioning a grid stop that is to be applied to a side rod of a grid projecting through a mica. There remains to be explained the manner of directing the grid side rods toward the holes provided for them in the mica. This is achieved by a series of operations, in which the mica is shifted transversely and rotationally in any degree required, by picking up the long #6 and #7 wires that carry the mica, and fixing a pattern for the grid side rods and the #6 and #7 wires that matches the pattern of holes in the mica. While it is the mica whose location is critical, the mica is indirectly controlled, by handling the long wires penetrating the mica. The tools that achieve the double results of picking up the #6 and #7 wires (and with them, the mica) and establishing a pattern for the side rods and the long stem wires matching the mica perforations have passages with reverse flares directed respectively toward and away from the stem block, that is, toward the ends of the long stem wires and the grid rods, respectively, with the tools interposed between those parts. These tools operate to gather the several wires, and in their travel along the stem wires, act in a broad sense as combing and gathering tools. The remarkable effectiveness of the whole operation will be appreciated from a realization of the extreme precision required by the small dimensions of the parts. The wires and the side rods might buckle, and the ¼ inch diameter mica might be damaged, if the pattern of the wires and rods as well as the pattern and orientation of the mica holes in relation to the wires are not correct within a thousandth of an inch, recalling that the side rods have a tight fit in their holes through the mica.

The gathering tools for the stem wires and the grid side rods include a pair of jaws 150a, 150b which have a complex motion for their multiple functions. These jaws close on each other and advance toward the stem to receive and "take in hand" the uncut reference wires 6 and 7 projecting from the stem. In the closed position, the jaws form a two-part guide passage through which the grid inserter 144 thrusts the grid toward the bottom mica bm. The jaws may also serve to press the bottom mica toward the welding tools. After a No. 1 grid has been inserted into a bottom mica of a mount M, the jaws withdraw. The mechanism for operating the jaws, shown in the plan view of FIG. 39, is illustrated in greater detail in FIGS. 45, 46 and 47.

As seen in FIGS. 46 and 47, jaws 150a and 150b are supported in a clearance position at the start of the cycle, spaced on opposite sides of the mount or stem axis by pivoted arms 150c and 150d. The arms, 150c and 150d, are carried on shafts 150e and 150f journaled in a head 150g which is fixed on the right hand extremity of shaft 150h, as seen in FIG. 47.

Torsion spring 150k on shaft 150e biases arm 150c toward the other arm 150d. As seen in FIG. 46, one end of torsion spring 150k is fixed in the head 150g while the opposite end of the torsion spring is fixed to the shaft 150e, so as to bias the shaft clockwise as seen in FIG. 46. The shafts 150e and 150f oscillate in opposite directions, when operated, by meshed pinions 150i and 150j secured respectively to the shafts.

Crank 150m fixed to shaft 150f and having an antifriction roller at one end bearing on tappet 150n (FIGS. 46 and 47) operate the arms to separate them, opposing spring 150k. The lower extremity of tappet 150n rides on arm 150p which is pivoted at 150q. At the opposite extremity, the arm 150p supports a roller 150r which rests on a bar 150s for the purpose of raising and lowering tappet 150n. Accordingly, the jaws 150a and 150b are operated positively to separate them and yieldingly toward each other in dependence upon the elevation of the bar 150s. At the same time, the actuating drive permits shaft 150h to move to the right from the position withdrawn from the stem block 10, as shown in FIG. 47. As seen in FIG. 45, the bar 150s is carried by a pair of vertically slidable shafts 150t in fixed bearings on standard 150u. The shafts 150t are elevated and lowered by a single link 150v operated by centrally pivoted cam following lever 150w biased against cam 150x on shaft 154b by spring 150k and by the weight of the linkage as shown.

Bar or plate 150s is raised and lowered under cam control in timed relation with the rotation of shaft 154b, thereby oscillating the jaws 150a and 150b at selected intervals regardless of the position of the jaws to the right or left in FIG. 45 during their motion to and away from the stem block 10 on the conveyer 12.

The jaw-supporting shaft 150h is slidable in bearings in the standards 142b and 142c (FIGS. 39 and 45) for moving the pair of jaws to and from the stem block. It is important that shaft 150h shall not oscillate or rotate about its own axis. For this reason, a plate 151 is fixed to shaft 150h embodying a slide bearing embracing shaft 151a that is fixed in standards 142b and 142c. Plate 151 is coupled by a short link 151b to a cam-following lever 151c pivoted at 144d and engaging a groove in constrained cam 151e.

The nature of the surfaces of jaws 150a and 150b (FIGS. 48, 48A) should be explained. The jaws are seen to include a pair of passages 151g which have flared or funnelled guide mouths 151h opening into the sides of the jaws facing the stem block, that is, the leading or front face. The mating surfaces 151i of jaws 151a and 151b embody transverse grooves 151j which have flared enlargements 151k opening into the back sides of the jaws. oppositely directed to funnelled guide mouths 151h. The two transverse grooves 151j constitute a through passage with a continuous flared portion, as indicated by the dotted line 151k in FIG. 54. The two jaws have a projection 151m extending from the leading face of the jaw which serves a useful purpose to be explained in connection with the operation of the welding tips 148a.

Figure 106:
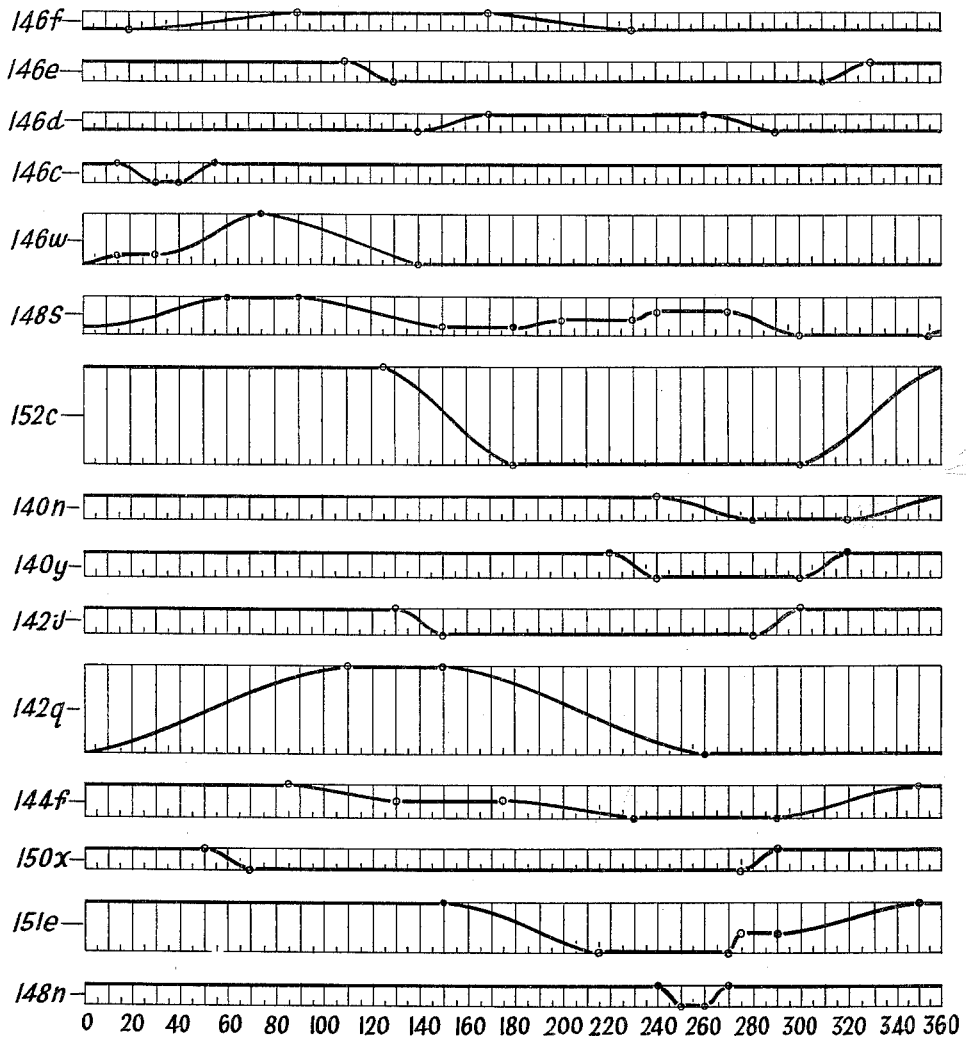
Figure 107:
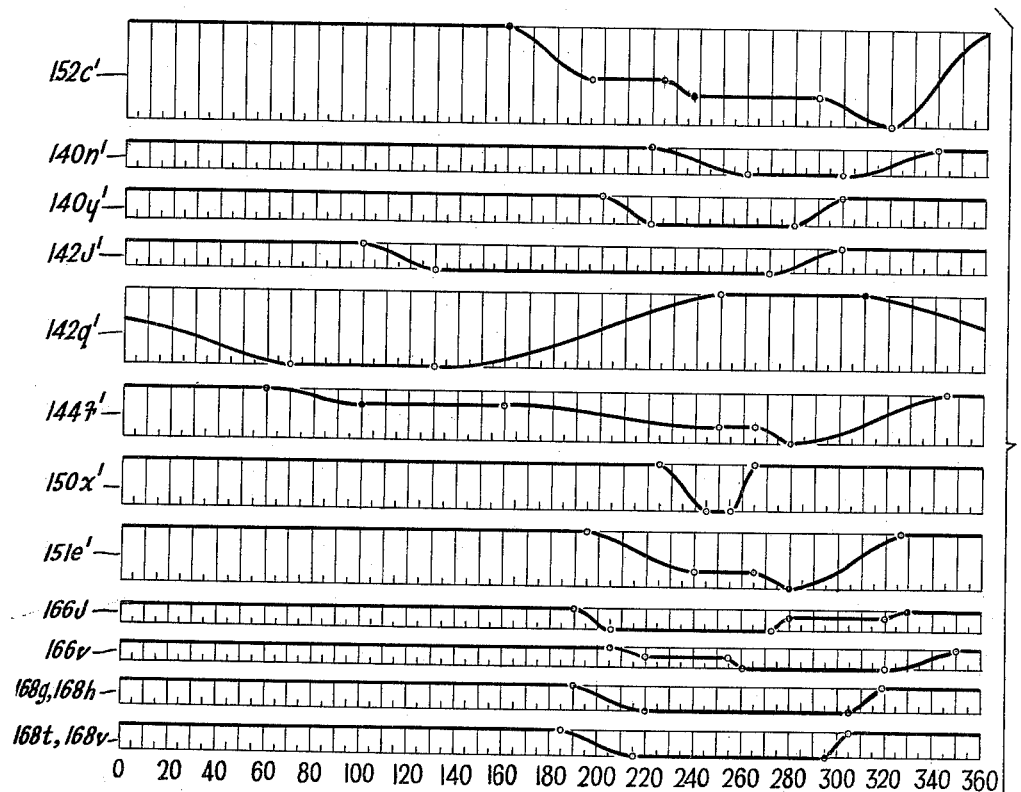
Figure 108:
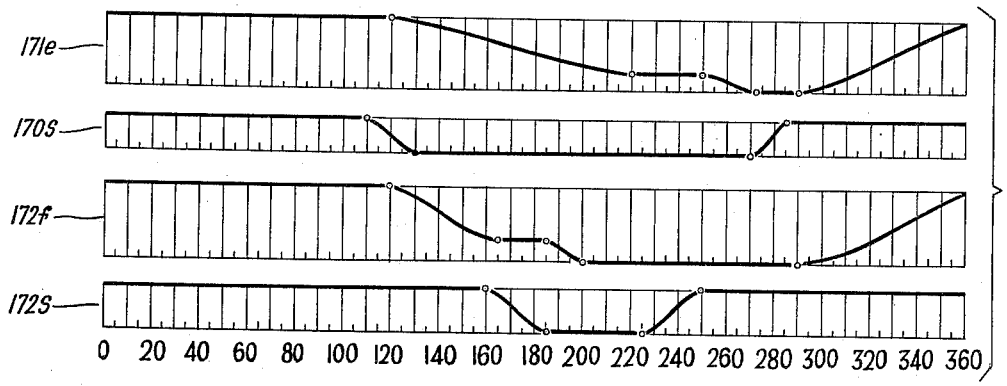

Referring now to FIGS. 49 to 54 inclusive and the timing diagram of FIG. 106, a typical cycle of the operation at the No. 1 grid inserting station E will be reviewed. For the relative position of the various previously described mechanisms in plan view, reference also should be made to FIG. 39.

A partly completed mount M is shown in FIGS. 49 to 54 inclusive, as it is held by the stem block 10 in accurate alignment in front of the No. 1 grid-inserting mechanism. The bottom mica bm is carried by the uncut reference wires 6 and 7 of the stem, but this bottom mica has been pushed over wires 6 and 7 for only a short distance. The No. 1 grid g1 is carried by the 90° oscillating transfer cradle 142 in line with grid inserter 144t. In the position shown in FIG. 49, this grid inserter 144t has already commenced its forward stroke toward stem block 10 and for this reason plate 144j has advanced against pin 144h. Stripper 144g is shown retracted into grid inserter 144 and will thereafter advance as a unit with grid inserter 144 as the latter advances.

Grid inserter 144 advances toward the grid g1 carried by transfer carriage or cradle 142 until the grid side rods enter seats 144*t*, these seats having chamfered openings to accommodate minor misalignment of the grids and the seats. As seen in FIG. 50, grid inserter 144 continues its advance stroke to press the grid against finger 142*s* to make certain that the grid is firmly received in seats 144*t*. The cradle 142 is timed to descend from the elevated transfer position in FIG. 49 to a low position of clearance, allowing grid *g*1 to be advanced toward stem block 10 by the inserter 144 without interference from finger 142*s* of the transfer cradle 142.

During the operation of grid inserter 144, at the time that it advances to receive the No. 1 grid, the grid-inserter actually abuts against the transfer carriage 142. Any over-travel of the grid inserter slide 144*a* at this point is absorbed by spring 144*k*. The cradle 142 drops during a dwell of slide 144*a*, and stop finger 142*s* moves out of the way of the grid. The grid *g*1 and its inserter 144 are free to advance.

Before the advance stroke of slide 144*a* and during the descent of cradle 142, the welding unit 148 shifts from the grid stop former 146 across the stem axis of the incomplete mount M. Then, as shown in FIG. 51, the welding unit 148 carrying the grid stop *gs* commences its stroke toward the stem block 10. The jaws 150*a* and 150*b* at this part of the cycle are positioned in advance of the grid inserter 144 and of the supported grid *g*1. The jaws 150*a*, 150*b* and the grid inserter 144 both advance as a unit toward the stem block 10 after the welder 148 has completed its travel across the coinciding lines of advance of the jaws and the grid inserter. All three units, 144, 150*a*—150*b* and 148, advance toward stem block 10 until the welder 148 reaches its end position, near block 10. Thereafter, welder 148 moves across the stem axis of the mount M from the laterally off-set position to the final operative position of FIG. 53. Seating surface 151*n* on jaws 150*a* and 150*b* restrain the bottom mica *bm* and maintains the reference wires 6 and 7 from shifting laterally whenever there is any tightness of the grid stop *gs* about the grid wire at the time that the welding tips transport the grid stop to and about the grid side rod (FIG. 54). The manner in which the grid side-rod is positioned before this stage is as follows:

At some point during the forward stroke of the jaws 150*a* and 150*b* toward the stem block, the jaws are moved together and advance as a single unit toward the free ends of the stem wires 6 and 7 which, as is evident, are spaced from each other than by the bottom mica *bm*. The leading flared guide surface 151*h* on either the jaw 150*a* or the jaw 150*b* engages the respective wire 6 or 7 (or both of them) and shifts the two wires toward the proper centered position if one or both are offset vertically. Both of the flared guide surfaces 151*h* on the jaws 150*a* and 150*b* are effective to center the wires 6 and 7 if improperly positioned, to one side or the other. Thereafter, as the closed jaws advance along the thrust path toward the stem block 10, the uncut reference wires 6 and 7 enter passages 151*g* in the jaws. This action carries the bottom mica *bm* and the pierced holes for the grid side rods into the desired accurate position for those side rods.

During the short time that the grid side rods are being forced through the mica holes, the jaws 150*a* and 150*b* press the mica toward the stem block, and the welding tips resist this advance to grip the bottom mica firmly. The welding tips 148*a* also "back up" the bottom mica to prevent it from advancing toward the stem block because of pressure from the advancing grid.

At this time, the welding head has not advanced all the way, for in some instances the side rod might otherwise push the grid stop out of the welding tips. After the side rod has penetrated the mica, the welding head with the aid of stripper 148*t* advances the grid stop to the position in FIG. 54. This overcomes any tendency of the grid side rod to arrest the grid stop because of misalignment or tightness. Surface 151*n* arrests the mica and thus arrests the grid side rod during this stroke. At this instant, cam 148*n* acts to apply welding pressure at the tips 148*a* and to close pulse-welder switch 148*x*.

The foregoing action of jaws 150*a*, 150*b* involves a notable feature of the present invention in that the long stem wires 6 and 7 are once again picked up and critically located by the mechanism in the work station. Here it serves as a reference wire for orienting the mica, a part of the incomplete stem that is to be critically located in the assemblying station. The bottom mica *bm* is not held exactly by block 10 in critical grid-receiving position. However, critical orientation of the mica and the grid in relation to each other is effected by aligning and guiding jaws 150*a*, 150*b* in the manner described. It is thus apparent that the station itself seizes and accurately locates that portion of the work carried by the conveyer on which the station is to operate.

The welding stripper 148*t* helps push the formed grid stop into place as described, and it is also effective to clear the welding tips in the event that, for some reason, the grid stops *gs* should adhere to the welding tips 148*a* alone or to the welding tips and the mount after welding the grid stop to a side rod. In review, the welding tip stripper 148, in the position shown in FIG. 41 at the time the grid stop is inserted between the welding tips 148*a*, retains this position in relation to the welding tips until the mounting operation in this station is complete, as shown in FIG. 54. As the welding tips are thereafter withdrawn, they follow reverse paths (opposite the arrows in FIGS. 50, 51 and 52), except that the first return stroke across the stem axis is greater than the forward stroke illustrated. The welding tips move as a unit with the stripper 148*t* until that stripper 148*t* is mechanically arrested by stop 148*w*. While the welding tips continue their travel leftward, upward from the point of view of FIGS. 50 to 53, any grid stop stuck to the welding tip is cleared, and the welding tips are conditioned for properly receiving the next grid stop.

The timing chart of the #1 grid station (FIG. 106) may be reviewed to supplement the foregoing description of the manner of operation and coaction of the various mechanisms in this station. Cams of the 146 series operate in self-evident sequence to feed, sever and form grid-stops and deliver those stops into the welding tips, for transport side-to-side by cam 148*s* and for fore-and-aft travel by cam 152*c*. The stroke of the welding head away from the grid-stop former (150°–180°) is less than that during return of the welding head, moving away from the grid-stop after welding (300° to 355°) in order to operate the clearing mechanism 148*t*, *w*. The welding head dwells (200° to 230°) during its transport of a grid-stop toward a grid side rod before reaching its limit in this direction, in order that cam 144*f* may complete the drive of the grid through the mica (230°) before the grid-stop reaches the insertion path of the grid side rod. Thereafter cam 148*s* advances the grid-stop across the projecting grid side rod (240°) where it is held for welding by cam 148*n* (250° to 260°).

The four-motion grid-feed cams 140*n*, 140*y* rest with a grid in delivered position to be removed by cradle 142, as actuated by cam 142*j* (280° to 300°) and after the cradle is swung away by cam 142*q* (0° to 110°) an additional grid is advanced to position for that cradle.

The grid in cradle 142 rests in front of inserter 144 as controlled by cam 142*q* (110° to 150°) while inserter cam 144*f* moves the inserter forward to receive the supported grid. The inserter dwells (cam 144*f*; 130° to 175°) while cam 142*j* drops cradle 142 (130° to 150°). Cam 150*x* closes jaws 150 early in the cycle, conveniently while a stem is being brought into the station. Cam 151*e* carries closed jaws forward, to receive #6 and #7 wires and thereby locate the mica holes, and to press the mica against the welding tips that are held in position fore-andaft by cam 152c at this time (215°). Thereafter a grid is advanced by inserter 144 (cam 144f; 215° to 230°) to penetrate the mica, and the grid stop is welded in place as mentioned above. Immediately thereafter, cam 151e (270°) withdraws the closed jaws 150 a short distance, to withdraw from wires #6 and #7 endwise; and cam 150x thereafter opens the jaws so as to spread clear of the newly inserted grid. Stripper 144g and inserter 144 are effective meanwhile to prevent jaws 150 from pulling the grid with it; and that stripper is retracted by cam 144f with grid inserter 144 (290° to 350°). The stripper 144g is reset in the next cycle during the initial forward stroke of inserter 144, due to friction pad 144p.

The foregoing timing and indeed the mechanisms in the unit at station E are subject to modification, and to adaptation in whole or part for other applications. Prominent features utilized are the indirect orientation of the grid-receiving mica holes by engagement of tools with the #6 and #7 stem wires; the gathering tools having forward-flared openings for this orientation and rearward-flared openings for directing the grid properly into the partial mount; the grip of the mica between tools 148 and 150 while the grid is inserted; the arrest of the mica by tool part 151n while the grid-stop is transported across and on the grid side rod; the utilization of the welding tips in transporting and applying the part to be welded; the support of the welding and stop-forming units 146 and 148 in transverse alignment on their common support 152; and the numerous other features mentioned above and pointed out in the claims.

NO. 2 GRID STATION F

The stem arrives at station F bearing the bottom mica supported near the free ends of wires 6 and 7, the mica in turn carrying the #1 grid with its grid stop welded in place. At the #2 grid station, the second and last electrode is assembled, that is to have portions extending through the bottom mica. Subsequently the four medium-length leads 1, 3, 4 and 5 of the stem extend through this mica, but of the electrodes added to the stem, the #2 grid is the last to have parts pushed through the bottom mica. In this station F, the mica is "backed up," as was also the case in station E, while spaced away from stem leads 1, 3, 4 and 5; and after the side rods of grid g2 are driven through the bottom mica, that mica and the electrodes carried thereby are shifted along long wires 6 and 7 into their final positions. Bottom mica bm then rests against the ends of short stem wires 2, 8 and 9 and against the shoulders swaged at the same plane on wires 1 and 4; and the medium length leads 1, 3, 4 and 5 extend through the bottom mica. This result follows not solely from the transport of the bottom mica, but from the combined combing and pattern-adjusting operations effected in stations B and C, and the related pattern of holes pierced through the bottom mica in station D.

The mechanisms for inserting the #2 grid, as seen in FIG. 1B at station F, are illustrated in FIGS. 55 to 65 inclusive. This station uses certain principles and certain mechanisms covered in my previously filed application Serial No. 790,570, filed December 9, 1947. This station utilizes duplicated or essentially duplicated mechanisms as those shown in FIGS. 39 to 54 for the No. 1 grid station E which need not be described in detail again; but certain other aspects, new in detail or in relation to other parts, are described fully. The portions of the mechanisms in FIGS. 55 to 65 inclusive, which duplicate those in FIGS. 39 to 54 inclusive are given the same reference numeral, with a prime for distinguishing the different elements. Thus the base plate in this station corresponding to plate 139 which appears in FIG. 39 is designated as 139' in FIG. 55 et seq.

In general, a four-motion feed mechanism 140' of FIG. 55 operates to advance a series of grids g2, larger than those advanced by the corresponding mechanism 140 in FIG. 39. The grids thus advanced are received by a transfer cradle or carrier 142' which oscillates through a 90° arc from the delivery position along the thrust path as shown in FIG. 55, to a grid receiving position directly in front of feed mechanism 140'. In the grid-receiving position, the carriage or cradle 142' is raised to lift a leading grid from side rails 140a', b'. Upon swinging the cradle 142' counter-clockwise to the delivery position of FIG. 55, the grid is directly in line with the thrust path of grid inserter 144'. The cradle 142' has a grid stop 142s' abutting both side rods, to insure firm seating of the grid in inserter 144'. A guide or jaw mechanism 150', shown between grid inserter 144' and the stem block 10 (illustrated in dotted lines) has an operating linkage similar to that of the No. 1 grid unit of FIG. 39, but having specifically different jaw faces and functions as will appear. In addition to the jaw set 150', the #2 grid unit has a further set of jaws 166 with its operating mechanism, and a still further combing tool set 168 with its related operating mechanism. It is the function of the combing tools 168, similar to tools in stations B and C, to align the various medium-length wires with the utmost precision. These leads enter the pattern of holes in the bottom mica bm as other tools drive the mica toward the glass button of the stem until the bottom mica bm is properly seated in the datum plane of the shoulders S and short wires 2, 8 and 9.

It is necessary in the course of the operation of assembling the #2 grid to carefully adjust the position of the #1 grid and the uncut reference wires 6 and 7 previously on the stem in order that the parts may not be deformed.

Before covering in detail the various operations for achieving the foregoing purposes, the mechanisms which operate the tools briefly mentioned above will be described and their operations explained.

In FIG. 55, the mechanism for advancing the grids step-wise in series includes a pair of side rails 140a' and 140b which are adjustably spaced and identical in design to the rails in FIG. 39, and in addition, a pair of feed rails 140q' for raising and lowering the set of feed fingers 140z'. The mechanism for reciprocating side rail 140a' horizontally to and from the stem block 10 includes a link 140k' which, through suitable cam following linkage, is operated by cam 140n' on shaft 154b'. By like token, a suitable linkage is provided for lifting and dropping feed rails 140q' in proper timed relation with the fore-and-aft reciprocation of guide rails 140a' and 140b'. Cam 140y' is provided on shaft 154b' to effect this drive, the linkage interconnecting cam 140y' and vertically reciprocable feed rails 140q' being omitted for brevity. Successive grids are advanced to the leading end of the #2 grid magazine where transfer carriage or cradle 142' may be oscillated into the grid-receiving position with abutment 142s' received in recess 141' of the feed rail 140a'. Thereafter, this 90° oscillating carriage 142' is elevated, moving toward the viewer in FIG. 55, to lift the front grid adjacent slot 141' from rails 140a'. The cradle or carriage 142' is then oscillated counter-clockwise into the grid delivery position of FIG. 55 for the start of the assembly cycle. Cradle 142' delivers its grid to the grid inserter 144' during the cycle and returns to the magazine 140' for the next grid.

Transfer member or cradle 142' is oscillated through the 90° arc clockwise from the grid-delivery position of FIG. 55 and then counter-clockwise, by linkage including arms 142e', 142m', link 142n', cam follower 142p' and cam 142q' on shaft 154'. The mechanism for raising and lowering the transfer carriage 142' appears in FIG. 56, including arm 142e' secured to a telescopic shaft 142d' (compare with shaft 142d, FIG. 45) which is vertically reciprocated by engagement with an adjustable pin 142g'. The pin is raised and lowered by a slide member 142h' movable in bearing 142k' and having a cam following roller 142i' engaging cam 142j' on shaft 154b'.

The grid-inserting unit 144' is horizontally reciprocable, that is, up and down as viewed in FIG. 55, by virtue of slide bearings in stationary arms 142b' and 142c' carried by standard 142a' on bed plate 139'. Grid inserter 144' is reciprocated on a slide 144a' as shown both in FIGS. 55 and 56 by a link 144b', a cam following lever 144c', and a cam 144f' on shaft 154b'. Tension spring 145' engaging a pin 145a' at the rear of the slide 144a' biases the inserter 144' horizontally to the right in FIG. 56 toward the stem block 10.

As seen in FIG. 56, the jaws 150' and their operating mechanisms are very similar to the jaws 150 and operating mechanisms illustrated in FIG. 45, both as to the manner of opening and closing and as to the reciprocation of the jaws to tne right and left in FIG. 56. The right-and-left reciprocating linkage includes a shaft 150h' sliding in bearings in standard 142a'. Shaft 150h' is prevented from oscillation about its axis by a depending plate 151' which slides along fixed shaft 151a' and is driven right and left in FIG. 56 by a link 151b' on cam-following lever 151c' which has a roller in the groove of constrained cam 151e' on shaft 154b'.

The mechanism for opening the jaws 150' against the closing effect of the associated torsion spring 150k' includes a crank 150m' on the shaft of the lower jaw, oscillated by tappet 150n' on lever 150p' which rides on a bar 150s' carried by vertically sliding shafts 150t'. As the lever 150p' is carried to the left and right with shaft 150h', the bar or rail 150s' is vertically reciprocated in order to oscillate lever 150p'. The operating linkage for the vertically reciprocating bar or rail 150s' is shown only in part in FIG. 56 for simplicity, but is exactly the same as the corresponding mechanism in FIG. 45. This linkage includes the link 150v', the cam following lever 150w', and the cam 150x' on shaft 154b'.

The slide 144a' of the #2 grid inserter 144' uses a mechanism similar to that used in the #1 grid inserter for stripping grids. However the mechanism here serves a distinctively different purpose, as will be seen, of centering the #1 grid in the manner of my application Serial No. 790,570, filed December 9, 1947.

In FIG. 57, slide 144a' is reciprocable in fixed bearing 142c' and is recessed to carry a slide 164a having at its front end a No. 1 grid pickup mandrel 164. The slide 164a and mandrel 164 are biased toward the stem block in the assembly by compression spring 164b, the travel of slide 164a under the pressure of this spring being limited by the grid inserter 144'. Tension spring 145' is stronger than compression spring 164b. It is evident, that after slide 144a' has traveled to a certain extent toward the right in FIG. 57 and toward the stem block in the asembly, an upstanding lug 164c on slide 164a is arrested by a stop 164d on frame portion 142c'. Thereafter, as the grid inserter 144' continues its grid-inserting travel through the forward stroke, the No. 1 grid mandrel 164 is arrested. As will be seen, this is effective for driving the #2 grid to its final position in the mount without, however, driving mandrel 164 forcibly through the #1 grid and against the bottom mica bm during the insertion stroke for the second grid.

FIG. 58 shows in perspective, greatly enlarged, the orientation of mandrel 164 with respect to the grid g2, when the grid inserter 144' has picked up the grid from the transfer cradle 142'. It will be understood that spring 145', as restrained by the related cam on shaft 154b', moves mandrel 164 forward to pass longitudinally through the center of the grid g2 on carrier 142'. Thereafter, the side rods of grid g2 are received in the recess 144t' which is formed by parts chamfered at their leading faces to accurately direct the rear ends of the grid side rods to predetermined precise seating in grid inserter 144'. Mandrel 164, as seen in FIG. 58, has a forward projecting tip portion shaped to enter and center the free projecting end of the #1 grid at the proper time during the operation. The rearward section 164e of mandrel 164 enters and centers grid g2 along its whole length while this grid is supported by cradle or carriage 142' and while the grid side rods are arrested by fingers 142s'. For this reason, the recess 144t' requires only slight chamfers for seating the side rods in the grid inserter 144'.

The jaws 150' serve the main purpose of gripping and aligning the #1 grid projecting from the mount on the stem block 10 to allow the mandrel 164 to accurately enter the No. 1 grid. Thereafter, jaws 150' are separated to a clearance position out of the thrust path to allow grid inserter 144' to advance the #2 grid coaxially along the #1 grid and into holes in the bottom mica pierced to receive the #2 grid side rods. When the #2 grid approaches the bottom mica, it no longer has support from mandrel section 164e. A split-funnel guide 166 is provided for directing the #2 grid side rods to the apertures in the bottom mica. As seen in FIG. 59, the two jaws 166a and 166b of the split-funnel guide are pivoted at 166c and 166d respectively, there being a pin-and-slot coupling 166e between the two jaws 166a and 166b to constrain the jaws to swing oppositely. Spring 166f urges these jaws or arms toward each other to eliminate any "play" or looseness in the coupling 166e and stop 166fa fixes the end points assumed by jaws 166a and 166b when closed. An operating arm 166g, extending at right angles from jaw 166a, is engaged by link 166h operated by cam following lever 166i (see also FIG. 56) on cam 166j mounted on shaft 154d'. A spring 166r constrains cam follower 166i against cam 166j.

Plate 166m that supports shafts 166c and 166d is reciprocable to the right and left in FIG. 56 on shafts 166n which slide in standard 166p carried by fore-and-aft reciprocable bed plate 152'. Plate 152' is reciprocated toward and away from the stem block by elements 152a', 152b', and 152c'. This reciprocation which carries the jaw assembly 166 fore-and-aft is modified by the further effect of cam 166j and jaws 166 do not reciprocate fore-and-aft according to the same timing and stroke as bed plate 152'. The reason for this is to enable jaw assembly 166 to rrove either closer to or further from combing and gathering assembly 168 to be described, which is carried on plate 152' toward and away from block 10.

As just above described, jaw assembly 166 is reciprocated fore-and-aft not only with respect to bed plate 139' but also fore-and-aft with respect to reciprocable bed plate 152', along shafts 166n in the standard 166p. This reciprocation is effected by link 166s pivoted to plate 166m at one end and connected to cam following lever 166t biased by spring 166n against cam 166v.

In FIG. 59, the combing and gathering tools 168 include a pair of vertically reciprocable gathering jaws 168a and 168b which are biased toward each other by spring 168z and are pivoted at 168c and 168d. The vertically reciprocable gathering tools 168a, 168b have rearwardly extending cam following arms 168e and 168f on cams 168g and 168h. respectively, these cams being carried by upright shaft 169.

An additional pair of horizontally reciprocable gathering tools 168i and 168j are slidably carried in standard 168k. Gathering tool 168j moves in a horizontal slide bearing in standard 168k, having a pin 168m at its rear extremity engaged by a tension spring 168n secured to a fixed pin 168p in standard 168k. Extending through a slot in standard 168k, is a pin 168r fixed to the slide of gathering tool 168j. The pin 168r is received in an end slot in bell crank 168s, the opposite arm of which engages cam 168t on upright shaft 169. Gathering tool 168i is similarly carried by a slide bearing in standard 168k, the rearward extremity of this slide having a cam follower 168u engaging a cam 168v on upright shaft 169. A spring 168w is tensioned between a fixed pin 168x on standard 168k and a movable pin 168y on the slide of gathering tool 168i to bias the cam follower 168u against the periphery of cam 168v. All the combing tools 168a, 168b, 168i and 168j are operated yieldingly toward each other to engage the work, and are positively withdrawn by the cams described.

The upright cam shaft 169 is journaled in a pair of bearings 169a on standard 168k, to be movable as a unit with the gathering tools as the bed plate 152' reciprocates to and away from the viewer of FIG. 59, that is, toward and away from the stem block 10. The cam shaft 169 is driven in 1 to 1 ratio with all other shafts in the unit by meshed bevel gearing 169c, shaft 169d, bevel gearing 169e, and shaft 154d'. As is understood from the #1 grid unit, shaft 154d' is driven by suitable bevel gearing and splined telescopic shaft 154c' and by further bevel gearing interconnecting shafts 154b' and the main drive shaft 154' of the unit. This unit, as all others, has a suitable electrically controlled single-revolution clutch (not shown) between shaft 154' and the main drive shafts in FIG. 1B, so that its operation may be suppressed when a stem block bearing a defective stem or lacking a stem arrives, as indicated by tests described previously.

The details of the gathering and combing tools are illustrated in FIGS. 61A, 61B, 61C and 61D.

FIG. 61A is a view looking toward the stem block 10 from the plane 61A—61A in FIG. 63, taken between the mica and the stem. These tools are effective to close in upon and accurately locate six of the nine wires projecting from the mount M at the #2 grid station F. The other three wires, namely 2, 8 and 9 were previously shortened in the lead trimming station B. In addition, the gathering tools are formed with a through passage for receiving the #1 grid g1 and the grid stop gs secured to one side rod of the #1 grid g1 after the gathering tools have been brought forward along the uncut reference wires 6 and 7. The short length wires 2, 8 and 9, and the swaged portions or shoulders S of leads 1 and 4, are not long enough to reach these gathering tools. As seen in FIG. 61A, the gathering tool 168i has a straight-line upper surface 168ia, a straight-line lower surface 168ib, and convergent forward faces 168ic and 168id which pass between intermediate length wires 1 and 3 to spread these wires when closer together than the space between straight line surfaces 168ia and 168ib. The convergent forward faces or surfaces 168ic and 168id are also effective to pass between and spread the uncut reference wires 6 and 7 if they should be somewhat too close to each other. By like token, the gathering tool 168j has straight line upper surface 168ja, a straight line lower surface 168jb, and slant convergent forward faces 168jc and 168jd. These convergent-edged tool parts overlap forward tool faces 168ic and 168id, as can be seen from comparing FIGS. 61A and 61D. These reversely sloping parts coact to form recesses that pick up long wires 6 and 7, and adjust those wires precisely to carry the bottom into precise position for aligning the mica holes with the medium length wires 1, 3, 4 and 5 and with the side rods of the #2 grid. The holes afforded in tools 168a, 168b, 168i and 168j when closed on each other present chamfered openings to the ends of wires 1, 3, 4 and 5 as the closed tool assembly advances on those wire ends (FIGS. 61D and 63). The nature and purpose of the work-engaging tools of the mechanisms 150' and 166 will appear from the following explanation of the operations at this station F.

Figure 60:
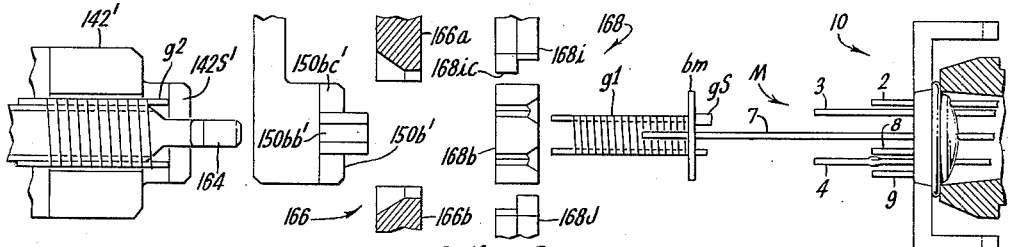

At the beginning of a #2 grid insertion cycle, as shown in FIG. 60, mandrel 164 and grid inserter 144' are proceeding to enter and pick up grid g2 supported by cradle 142', the side rods of this #2 grid being arrested by the fingers 142s'. The grid inserter 144' projects mandrel 164 through the hollow in grid g2, and takes hold of the back ends of the grid side rods. Thereafter, the transfer cradle 142' drops away from the thrust path of inserter 144' and swings downward and counter-clockwise (FIG. 55) into position for receiving another grid.

It will be remembered that in the mount M entering the second grid inserting station, long wires 6 and 7 carry the #1 grid g1 and the bottom mica bm at a position spaced from the projecting ends of medium length leads 1, 3, 4 and 5. The grid g1 may be in a wide variety of positions relative to the stem, depending, among other factors, upon how tight the mica bm fits on wires 6 and 7 and also on whether the partially completed mount was in any way jostled from the time the grid stop gs was welded in place until the mount reached the #2 grid station F. In order to pick up and center the #1 grid in a rough fashion, the center set of combing jaws 166a and 166b is disposed at a distance from the stem block 10 and movable to engage the back end of the #1 grid, that is, the end remote from the bottom mica. The intermediate set of jaws 166a and 166b close loosely about the trailing end of the #1 grid very early in the cycle, and at about the same time the back set of four jaws 168 converge toward each other. The divergent front edges 168ic and 168id cooperate with the other front edges 168jc and 168jd to spread and center reference wires 6 and 7 and at the same time the vertical jaw set 168a, 168b approach each other to receive reference wires 6 and 7 in the center pair of notches, as illustrated in FIG. 61A. At this stage, the back jaws 168 are spaced from the stem block 10 sufficiently so that the whole set of jaws easily clears the front ends of the medium-length wires 1, 3, 4 and 5. This set of jaws is then completely closed at a location intermediate the stem block and the bottom mica. At this time, and as illustrated in FIG. 61, the jaws 168 are in condition so as to move forward toward the stem block 10 without fear of damage to the stem or mount. The purpose of moving the back set of jaws 168 toward the stem block is to perfect the location of wires 1, 3, 4, and 5 so that, at a later time in the cycle, these wires may enter appropriate holes previously pierced in the bottom mica bm. While this is taking place, the intermediate set of jaws 166 and the front set of jaws 150' also advance toward the stem block 10, the intermediate set of jaws 166 sliding to a point approximately midway along the #1 grid. The jaws 166 provide clearance for the front set of jaws 150a' and 150b' which snugly enclose the trailing end of the #1 grid and bring same closer to the ideal oriented position than was effected by the middle set of jaws 166a and 166b.

The front jaws 150a' and 150b', shown in FIG. 65, are illustrated in condition to close on the free trailing end of the #1 grid. The jaws 150a' and 150b' have recesses 150aa' and 150bb' which receive the reference wires 7 and 6, divergent or slant surfaces 150ac' and 150bc' on one side coacting to push the #1 grid to the left in FIG. 65 if the grid should be too far to the right, and a like pair of divergent or slant surfaces at the opposite side being similarly effective to shift the free end of the #1 grid to the right in FIG. 65 to assure proper centering. All of this is for the purpose of shifting that #1 grid into a true centered position, accurate enough for longitudinally receiving the mandrel 164.

After front jaws 150a' and 150b' have closed about the #1 grid, the intermediate jaws 166a and 166b no longer need contact with the #1 grid. The intermediate jaws 166 advance toward the front jaws 168, which as previously explained, have closed against each other and about the reference wires 6 and 7. The front jaws 168 are still in a position of clearance with respect to the ends of the intermediate length wires, such as 3 and 4. The center or intermediate set of jaws 166 spread slightly, to receive the larger grid g2, and this set of jaws advances toward the front set 168 carrying the bottom mica bm along wires 6 and 7 and against the front set 168. If in this stroke, the #1 grid is also shifted closer to the stem block 10 than when it first entered the second grid-inserting station, the shifting is permitted by the looseness with which the back jaws 150a' and 150b' embrace the #1 grid at this stage. However, at the time that the mandrel 164 enters the grid, jaws 150a' and 150b' have closed tightly about the #1 grid. Thereafter, the back or outermost jaws 150a' and 150b' pull away to a clearance position and allow the

2 grid carried by the grid inserter 144' to advance, while mandrel 164 penetrates deeper into the hollow of the #1 grid. The #2 grid is then reliably thrust forward about the #1 grid, the side rods of the #2 grid being guided to the corresponding holes in the pierced mica by the chamfered entry surfaces 166aa, bb of intermediate jaws 166a and 166b. As soon as the No. 2 grid has been actually pushed into the holes, the bottom mica is in condition to be advanced toward the stem block 10 to allow intermediate-length wires 1, 3, 4, and 5 to penetrate the bottom mica. Toward completion of the advance of inserter 144', the bottom mica is seated against the short wires 2, 8 and 9 and the swaged shoulders S on intermediate length wires 1 and 4.

The operation just described is completed in very little time and would be even more difficult than it is if the horizontal pair of jaws 168i, 168j of the front set remained closed. These jaws in the form shown would crush short wires 2, 8 and 9 upon movement toward the stem block. For this reason, the jaws 168i, 168j are pulled outward to a position of clearance while the vertical pair of jaws 168a, 168b keeps the bottom mica bm from tipping. The middle pair of jaws 166 press the bottom mica bm against the front vertical pair of jaws 168a and 168b, the middle and vertical back jaws moving toward the stem block as a unit. This advances the bottom mica toward the stem block, carrying the first and second grids g1, g2 along with it. It will be understood that the inserter 144' and the mandrel 164 are withdrawn as soon as the #2 grid has penetrated the bottom mica, and before the assembly of the two grids and the bottom mica are advanced toward the stem block.

The timing of the mechanisms of station F described above is graphically represented in FIG. 107. Timing curves produced by cams that operate mechanisms similar to those of the first grid station are represented by primed numerals corresponding to such cams; but in some instances the motions are different. Cams 140n' and 140y' operate the magazine feed as in the #1 grid station E and need no review. Cradle-operating cams 142f' and 142g' similarly need no comment. Grid inserter 144' is operated by cam 144f' early in the cycle, as before, to pick up a grid from the transfer cradle 142'.

Cam 152c' times the advance of jaw sets 166 and 168 to advance toward and about the stem wires newly brought into station F. These jaw sets dwell in position (fore-and-aft) while horizontal jaws 168i, j move together, immediately followed by jaws 168a, b closing against closed jaws 168i, j, as indicated by cams 168g, h, t and v whose closing is completed in the 215° to 220° interval in FIG. 107. This is effective to orient stem wires #6 and #7 and thereby to orient the mica holes. Cam 166j meanwhile closes jaws 166 about the projecting #1 grid to center it for the advance of mandrel 164 and the #2 grid inserter 144'. (Cam 152c' had carried jaws 166 toward the stem block and about the #1 grid preparatory to this closing.)

With the #1 grid thus given preliminary alignment, jaws 150' can close on the #1 grid (240°), staying closed (cam timing curve 150x') only long enough for the mandrel 164 on inserter 144' to enter the hollow of the #1 grid. These jaws 150' dwell in their fore-and-aft travel during jaw closing (note curves 150x' and 151e', FIG. 107), and continue forward after opening as a matter of convenience.

Cam 144f' is effective immediately thereafter (280°) to drive the #2 grid into the mica which, at this time, is gripped between tools 166 and 168, the former serving additionally as #2 grid funnel guides. Cam 166j has spread jaws 166a, b somewhat for this operation, as compared to the preceding full-closed condition of these jaws in centering the #1 grid; and by this time cam 166v had carried jaws 166 (while full-closed) forward against the mica to clear the way for jaws 150' and to press the mica along the #6 and #7 wires and against tools 168.

Cam 152c' is effective to carry plate 152' and tools 166 and 168 forward as a unit while gripping the mica between them, thereby pressing the mica onto medium-length stem wires #1, #3, #4 and #5 (about 300°); but tools 168i and 168j are withdrawn just after this by cams 168t, v to avoid damaging the #2, #8 and #9 short stem wires, tools 166a, b and 168a, b continuing to carry the mica forward to the abutment plane established in stations B and C. The mica abuts against the shoulders on two medium-length wires and the ends of the short stem wires (320°). All the tools then spread, and are withdrawn from the partial stem newly supplied with a #2 grid and modified to seat the bottom mica bearing the two grids. The projecting medium-length wires are in condition to receive the anode parts applied in stations G and H.

The foregoing operations, although meeting exacting requirements, are quickly accomplished. Features instrumental in the success of this series of operations are numerous, prominently including the pick-up and orientation of the mica and its holes by the indirect method of locating wires previously extending through that mica; the two-purpose guide 166 that serves first to locate the #1 grid and then to guide the #2 grid side-rods into the bottom mica; the gripping of the bottom mica as it is advanced on the medium-length stem wires; the forward flared holes in the tools 168 that perfect the location of the stem wires to enter the mica, these tools thereafter splitting apart; and all this is accomplished without any requirement for extreme precision in fixing the location of the stem block. Many of the features utilized here are found in other stations, in similar form as will be appreciated in due course.

ANODE-ASSEMBLING STATIONS G AND H

In FIG. 1B opposite station F, the mount is shown complete to the extent of having the bottom mica bm and the first two grids g1, g2. In this condition, the conveyer 12 advances the stem block 10 carrying such incomplete mount around sprocket 16 to stations G and H where two halves a of a two-part anode are applied in succession to respective pairs of wires 3, 4 and 1, 5 that project through the bottom mica. By means of an automatic feeder and appropriate welding mechanism, not shown, a getter is spot-welded to the anode part a shown at the top of the mount at station G. In this condition the anode half a is ready for assembly to the stem by a mechanism to be detailed, which is substantially duplicated at station H for applying the second anode part a to the stem.

In FIGS. 66 to 75 inclusive, mechanisms are shown for assembling one part of the two-part anode to the mount after it emerges from the second grid-assembly station F and enters anode assembling station G. The other anode assembling station H is similar in all respects except that the anode part is applied in inverted condition as compared to FIGS. 66 to 75 inclusive, and the stem- and anode-engaging tools are appropriately inverted.

Referring now to FIGS. 66 to 68, there is shown a pair of anode transfer jaws 170 and a three-part set of combing tools 172. The transfer jaws 170 apply an anode part a to the stem in stem block 10 after combing or gathering tools 172 insure a clear path for the anode part directly to the medium-length stem wires.

The transfer jaws 170 are suitably pivoted in head 170a that is carried by slide 170b that travels in fixed bearings 170c in standard 170d on bed plate 170e. Shaft 170f is joined to one jaw 170; and by virtue of gears 170g attached to both jaws 170, these jaws oscillate toward and from each other. Shaft 170f is operated to move the jaws toward each other by torsion spring 170h, to grip an anode part a. The torsion spring 170h is anchored at one end to shaft 170f and at its other end to a bar 170i fixed to slide 170b. Bar 170i and head 170a embodies suitable bearings for shaft 170f that is thereby held against axial shifting.

Shaft 170f and slide 170b are shown in FIGS. 66 and 67 withdrawn at maximum distance from stem block 10, but are capable of axial travel through a relatively long stroke to transport an anode part toward stem block 10 and to firmly apply the transferred anode to appropriate medium-length wires projecting through the bottom mica on the partially completed mount in the stem block 10.

For operating shaft 170f against the torsion of spring 170h, arm 170j is secured to shaft 170a and carries a roller which rides upon a rail 170k. The rail is arranged to rise and fall at appropriate times in the cycle of this unit by virtue of shafts 170m interconnected by cross bar 170n, and the rail is elevated and lowered under control of link 170p and cam-following lever 170q engaging cam 170s on cam shaft 170t. Through bevel gearing 170u and shaft 170w, the transfer jaw raising and lowering cam derives its rotary power from the main drive shaft of the system in FIG. 1. A suitable electrically disabled single-revolution clutch (not shown) may be interposed in this drive to disable the plate-feeding operation whenever block 10 lacks a proper mount subassembly. The rail 170k is spring tensioned in the direction to lower it, as seen in FIG. 67, by virtue of torsion spring 170h and an additional spring, not shown. As the cam shaft 170t rotates a high region on cam 170s acts through linkage 170q-p-n-m to lift rail 170k; and a low portion of cam 170s allows rail 170k to be lowered and arm 170j rocks reversely. Shaft 170f is oscillated by rail 170k and spring 170h, and shaft 170f operates pinions 170g for oscillating jaws 170 toward and away from each other.

The transfer jaws 170 on suitable pivots in head 170a, b are thus operated to close by spring bias on anode parts which are successively advanced stepwise along a feed channel 170x by a suitable automatic feeder, the details of which form no part of the present invention are accordingly are not shown.

The transfer jaws 170 are reciprocated to the right and left in FIGS. 66 and 67, toward and away from stem block 10, by the mechanism now to be described. Bar 171b is locked to slide 170b, and is connected to link 171c which is driven fore-and-aft by cam-following lever 171d and operated by constrained cam 171e on the cam shaft 170t.

In the proper sequence of operations (FIG. 108) cam 170s allows rail 170k to drop and thereby releases the transfer jaws 170 for operation by spring 170h to seize one anode part a in supply chute 170x. Thereafter, cam 171e advances the pair of jaws 170 carrying anode part a along a linear path toward the stem block 10 (FIGS. 66 and 67) for assembly of the anode part to the partial mount in the stem block. During the forward travel of jaws 170, rail 170k remains in its low position. After assembly of an anode part to a mount, cam 170s raises rail 170k to spread the jaws and keep them open during return travel of the jaws to supply chute 170x.

Figure 75:
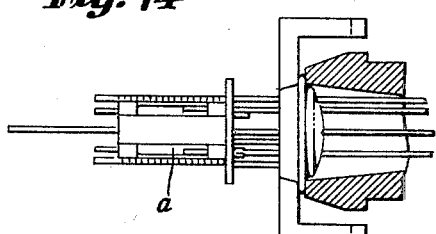

It must be remembered that the parts here involved are quite tiny, the transverse dimension of the anode, as seen for example in FIG. 75, being of the order of less one-eighth of an inch. The anode part which has tubular passages formed in it for receiving medium-length wires 3 and 4, naturally requries precise orientation. Principles that characterize the preceding stations are utilized in the anode-assembling stations for effecting precise orientation of the anode supporting stem wires 3 and 4 in relation to the anode part a, as these two are brought into juxtaposition and assembled one on the other.

A set of combing and gathering jaws 172 (FIGS. 69 through 75) orients the stem into the critical position to receive the anode, and guides the anode into its assembled position. Jaws 172 are operated by a mechanism and carried in a standard 172a supported by the main machine bed 11. The jaw head or assembly 172' is carried by a shaft 172b which slides in bearings 172c in standard 172a. A bar 172d is fixed to shaft 172b and has a sliding fit with rail 172e, to prevent any oscillation of shaft 172b about its own axis. A cam 172f is carried on main drive shaft 20 (FIG. 1B) and operates cam follower 172g and link 172h to drive jaw assembly 172' away from the stem block 10 as is required during conveyer-indexing operations. Tension spring 172i biases assembly 172' toward the stem block 10 and this assembly advances against the stem or partial mount, as permitted by cam 172f. Link 172h and spring 172i are secured to shaft 172b by means of block 172j. The set of jaws 172 closes upon the parts carried by stem block 10 during the advance of the assembly 172' toward the stem block. (This jaw mechanism involves details later to be described.) The jaw mechanism is operated by a link 172k that is reciprocated substantially vertically by arm 172m on shaft 172n in bearings 172p on standard 172a. Shaft 172n is biased by tension spring 172q in clockwise direction as viewed in FIG. 70 and forces cam follower 172r against the end face of cam 172s on shaft 20.

The details of the jaw assembly 172' are shown best in FIG. 70A, this being a view looking away from the stem block toward the jaw mechanism, with the covering plate of that mechanism removed. As seen in FIG. 70A link 172k operates vertical slide 172v which carries vertically movable gathering-tool jaw 172u. Horizontally slidable jaws or gathering tools 172w have cam followers 172w' which are operated by cam surfaces 172v' on slide 172v to spread jaws 172w when tool 172u is elevated. Tools 172w are biased toward each other by tension 172x. Consequently when tool 172u descends with cam 172v, gathering tools 172w are biased toward each other and against tool 172u that is interposed between tools 172w. Tools 172u and 172w thus close in on the stem projecting from stem block 10.

Figure 72:
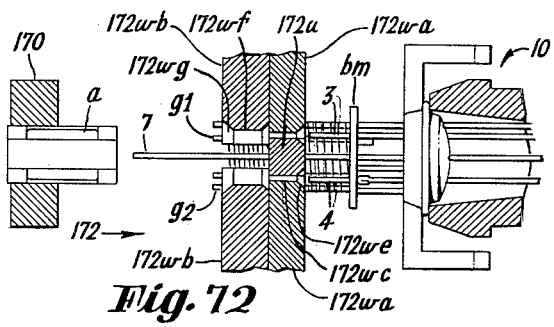

The details of tools 172u and 172w, their coordination with each other, and their coordination with the anode-inserting jaws 170 is illustrated in greatly enlarged scale in FIGS. 71-75 inclusive. In FIG. 72 the gathering tool assembly is shown in the position it assumes when it first closes upon the ends of the parts extending from the stem block 10. Gathering tools 172w are seen to have front portions 172wa and rear portions 172wb united to the front portions 172wa.

As seen in FIGS. 71, 72 the front tool portions 172wa have notches 172wc which, in cooperation with the side faces of tool 172u, form apertures that are to receive the medium-length wires #3 and #4 extending from the stem. This combination of tools is similar to gathering tools in FIGS. 15, 26, 36, 48 and especially FIG. 61D. At this stage, tools 172u and 172w have not yet advanced toward the stem block 10 sufficiently to reach those medium-length wires. The advance end of tool 172u is notched at 127ua to receive and, if necessary, to shift the long stem wire No. 7 down and out of the insertion path of the anode part a, being similar to the tools in FIG. 65 in this respect. The cutouts 172wd receive the #1 and #2 grids assembled to the bottom mica, providing assurance that the grids are also out of the insertion path of the anode part a.

The faces of gathering tool parts 172wa which are nearest the stem block 10 are chamfered at 172wc, as is the edge of tool 172u, at notch 172wc, thereby forming a funnel that receives the medium-length stem wires #3 and #4 and directs those wires into the apertures formed by notches 172wc when the gathering tools advance further toward the stem block 10. Tool parts 172wa are thin enough for wires #3 and #4 to project beyond apertures 172wc, when that tool reaches mica bm.

The gathering tool portions 172wb have reliefs 172wf which are chamfered at 172wg, these chamfers being effective to funnel the advance edge of the anode part a when the anode insertion jaws 170 ultimately drive the anode into the passage formed of both cutouts 172wf.

When the anode part *a* reaches wires #3 and #4 so as to be supported on the wire ends, tools 172 withdraw and clear the path for final advance of the anode part to the bottom mica. This doubly directed funnel, having chamfers 172*we* and 172*wg*, is very similar to assembled tools 166 and 168, FIG. 63.

The sequence of operations of the tools may now be reviewed in relation to the parts on which the tools operate, in connection with FIGS. 71, 71A and 72–75. In FIG. 72, the assembly of gathering tools is shown in an intermediate position, having advanced toward the stem while fully open, after which the tools closed about the projecting grids and the long #6 and #7 stem wires. During the further advance of the closed assembly of gathering tools 172 toward the bottom mica, as illustrated in FIG. 73, chambers 172*we* facing the stem block move forward to funnel the ends of the medium-length stem wires #3 and #4 into snug-fitting passages 172*wc*. At this stage the anode part *a*, carried by jaws 170, has advanced in FIG. 73 closer to the stem than in the stage of FIG. 72. At this point, notches 172*wf* of the gathering tool parts 172*wb* form a composite recess which is precisely oriented in relation to the ends of wires #3 and #4. This tool channels the leading end of anode part *a* while the gathering tools are still closed. The sleeves formed at the sides of anode part *a* are then threaded onto the projecting portions of stem wires #3 and #4, after which the assembly of gathering tools 172 opens. Jaws 170 drive the anode part *a* along wires #3 and #4 until it presses firmly against the bottom mica as illustrated in FIG. 75, and jaws 170 open and are withdrawn to seize the next part *a* in readiness for the next stem. The sequence of operations may be reviewed using the timing chart of FIG. 108 in which the reference numerals used correspond to the cam that produces the timing represented. Cam 172*f* is contoured so that tool assembly 172' advances toward the stem block more quickly than the anode part *a* whose advance is represented by the timing curve 171*e*; and assembly 172' dwells while cam 172*s* quickly causes the tools 172*u* and 172*w* to close about the projecting ends of the parts carried by the stem block. Assembly 172' continues its advance towards the stem block thereafter, having picked up and located the medium-length stem wires, and the assembly 172' dwells to direct the advancing anode part onto the ends of the medium-length stem wires. Tools 172*u* and 172*w* then withdraw quickly (as represented by the rise in curve 172*s*) and the anode inserting jaws 170 are free to drive the anode firmly against the bottom mica on the stem in block 10, as represented by the continued slope of curve 171*e* (FIG. 108) in the 250° to 260° region. The jaws 170 are opened at this time, as indicated by the rise in curve 170*s*, after which the jaws 170 are withdrawn toward the plate supply 170*x*, as indicated by the final gradual rise in curve 171*e*. The gathering assembly 172' is also withdrawn from the stem axially to a position of clearance with respect to the advance of the projecting stems on conveyor 12, as indicated by a final rise in curve 172*f*.

TOP MICA APPLYING STATION I

Referring now to FIG. 1B, the mount is completed to the extent of having both the first and second grid *g*1, *g*2, as well as both parts *a* of the two-part anode when it arrives at station I. The grids are supported by their side rods which penetrate the bottom mica *bm* and the anode parts are supported by the medium-length wire pairs 1, 5 and 3, 4 which likewise penetrate the bottom mica. At station I, the top mica *tm* is to be pierced and then applied to the projecting side rods of the grids *g*1, *g*2 and to the long stem wires 6 and 7 which extend from the glass header *h*. Many of the same principles and virtually the same mica handling mechanisms are used in station I for piercing the top mica *tm* and applying it to the wires projecting from the stem as disclosed in connection with station D in FIGS. 27–38 for forming and applying the bottom mica *bm* to the same wires. In station I, however, the top mica is also to be applied to the grids, penetrated by the grid side rods. The top mica is pierced in station I; the ends of wires #6 and #7 and of the grid side rods are adjusted into the pattern corresponding to the pierced holes; and finally the top mica is applied to those wires and rods. The anode parts *a* do not penetrate the top mica, but serve as the limiting reference plane to which the top mica is pushed when it is applied.

Because of the great similarity between the mechanisms in stations D and I and in the interest of conciseness, the illustrated mechanisms of the bottom mica station D are not shown and described in connection with top mica station I, but, instead, only those portions are shown whose coaction with different structures in station I deserve comment; and such portions of station D that are duplicated in the views of station I are designated by corresponding primed numerals.

The work performed at the top mica-applying station I is illustrated in FIG. 80 which is a plan view of the stem block 10 at station I, carrying the incomplete mount M with uncut reference wires 6 and 7 and the side rods *r* of the No. 1 and No. 2 grids *g*1, *g*2 projecting beyond the ends of the anode parts *a*. A transfer blade 124' carries the top mica *tm* which is tightly fitted in a hole therein and is disposed vertically in front of the pusher 126' for ultimately driving the top mica *tm* into position. The front end surface of pusher unit 126' is formed with two holes having chamfered recesses or flared mouths to receive long wires 6 and 7, and with a transverse slot to receive the four grid side rods as the top mica *tm* is driven against the ends of the two anode parts *a*. The pusher unit 126' and the transfer blade 124' are both advanced toward the mount carried by the stem block 10 at an appropriate time in the cycle, by mechanism detailed in station D. At this time, tools at station I have perfectly oriented the ends of the wires and of the side rods which are to be received and forced through a corresponding pattern of holes pierced in the top mica *tm*.

As seen in FIGS. 77, 78, 80, 81 and 84, two sets of combing and gathering jaws 176 and 178 are used which are operative both to advance toward the stem block, and each pair closes on the work. The jaws 176 (FIG. 77) are effective to close in on the longest stem wires 6 and 7 and to hold them until the top mica *tm* has been pushed by the transfer blade 124' onto the ends of those wires. The transfer blade 124' thereafter stops moving toward the stem block 10 while the pusher unit 126' is projected through the blade 124' and thereby pushes the mica toward the stem block along wires #6 and #7.

As soon as the top mica *tm* has been applied to stem wires 6 and 7 by blade 124', jaws 176 are quickly retracted. The top mica *tm* is carried forward along wires #6 and #7 by pusher 126'. The pattern of holes in the top mica is accurately oriented as a result of being pierced while being tightly received in member 124'; and this orientation is preserved after the top mica is pushed out of blade 124', by engagement of holes 126" in pusher 126' with the stem wires #6 and #7 that penetrate the pierced mica. At this stage, gathering tools 178 have closed in on the grid side rods (FIG. 84) to adjust them into alignment with the holes in the advancing top mica. This mica is guided by wires #6 and #7 in pusher holes 126" approaching the ends of the grid side rods *r* despite release of the top mica by blade 124' and despite release of wires #6 and #7 by tools 176.

After the mica has been advanced by pusher 126' onto the ends of the grid side rods (FIG. 82) the tools 178 spread and clear a path for the pusher to advance the mica against the ends of anode parts *a* (FIG. 83). Thereafter, the two sets of open tools 176 and 178 are retracted from the stem block, as are blade 124' and pusher 126'.

This clears the path for the conveyor to carry the next stem into the mica-receiving position, and for the next top mica to be pushed into blade 124′ and pierced in readiness for the next cycle.

The detailed nature of the two sets of gathering tools 176 is best illustrated in FIG. 77, where these gathering tools are shown in full engagement with stem wires 6 and 7 or "closed." The same tools are shown "open" or separated in FIG. 78 where tools 178 are also shown "open." The jaw 176a is thinned or relieved at region 176aa so as to receive thin blade section 176ba of jaw 176b. Similarly, the thin projecting wedge 176bb is received in a channel 176ab, and the thin blade section 176bc is received within the relieved region 176ac. The jaws 176a and 176b close on each other, as shown in FIGS. 77 and 81 at a point beyond the free ends of the grid side rods. Accordingly, only the long reference wires #6 and #7 are engaged by the gathering tools 176a and 176b. In the event that either reference wire 6 or 7 is closer to the center axis of the stem than it should be, the projecting wedge 176bb moves it to its proper position, while the divergent surfaces 176ad move stem wires #6 and #7 (or either of them) toward the center if they should be displaced from their required critical positions.

The gathering tools 178a and 178b as illustrated in FIGS. 78 and 84 include sections 178aa and 178ba which slide across each other and overlap when the jaws are closed. These jaws or gathering tools have divergent surfaces 178ab and 178bb which, when the two jaws approach each other, engage the end portions of the grid side rods and thereby move the outer grid g2 toward the properly centered position, considering the possible right-and-left misalignment. These jaws have recesses 178ac and 178bc for receiving the long wires 6 and 7 which were orientated by the jaws 176a, 176b and later by holes 126″ in pusher 126′. The jaw 178a has an outer pair of divergent-sided notches 178ad and an inner pair of divergent-sided notches 178ae. The first pair of notches 178ad receive the No. 2 grid side rods and the second pair of notches 178ae receive the No. 1 grid side rods.

It is notable that the divergent surfaces 178ab and 178bb extend far forward of the projections 178af between recesses 178ad and 178ae, and that the divergent surfaces 178af slant outwardly and gradually to positions very close to the adjacent steep inner sides of recesses 178ad. In other words, the leading ends of projections 178af have a prominent outward slant.

This form of gathering tool is quite important, for in the event that both the No. 1 and the No. 2 grids are badly off-side, the No. 2 grid in being centered, actually engages and carries with it the No. 1 grid. When the No. 2 grid has reached the narrow recesses 178ad, the prominently slanting tooth portions 178af leading into recesses 178ae in gathering tool 178a picks up the No. 1 grid side rods. This occurs at a time later than the adjustment of the No. 2 grid side rods, and carries the No. 1 grid out of contact with the No. 2 grid and centers the No. 1 grid. This is effected during the final stroke of jaw 178b toward jaw 178a.

Jaw 178b has nearly flat surfaces 178d across which the grid side rods can slide as they are shifted by the slant surfaces in gathering tool 178a. Surfaces 178d may be somewhat stepped (as shown) to take into account the difference in diameters of the side rods of the two grids, the side rods of the No. 1 grid being thinner. The final closed configuration of the gathering tools 178 is illustrated in FIG. 84, where the grid rods are shown seized and located with great precision for penetrating the holes provided in the top mica tm.

The mechanisms for operating jaw sets 176 and 178 are illustrated in FIGS. 76, 79 and 85, now to be described. As previously remarked, the mechanism for operating the pusher unit 126′ and transfer blade 124′ are amply described in connection with the bottom mica station D shown in FIGS. 27 to 38 inclusive.

In FIG. 76 there is shown the pusher unit 126′ in position to be advanced along the thrust path toward the stem block 10 (shown in broken lines) that has been advanced into this station by the conveyor 12. Blade 124′ is omitted for clarity. The same mechanism appears in elevation in FIG. 79, pusher 126′ being omitted, and both sets of jaws 176 and 178 being shown in closed configuration comparable to FIG. 81. Jaws 176 are carried on pivots 176c and 176d projecting from arm 176e that extends to the right in FIGS. 76 and 79 from a sliding carriage 176f.

The nature of the sliding carriage 176f is perhaps better illustrated in FIG. 85 where this carriage is seen to be slidably mounted on shaft 176g fixed to standard 176h carried by a fixed bed plate 176i. Guide rail 176j′ (FIG. 79) on standard 176h constrains carriage 176f so as to insure straight-line fore-and-aft travel, guarded against pivoting about shaft 176g. By virtue of the foregoing, the jaw set 176 is movable toward and away from stem block 10. The carriage 176f is reciprocated by link 176j pinned to cam-following lever 176k that is operated by constrained cam 176m. Incidentally, jaws 178, pivoted on standard 178c is also carried fore-and-aft by reciprocable carriage 176f just described.

Returning now to the set of jaws 176, it is observed that supporting arm 176e has an upward extension 176p which has a forward projection 176q extending between the arms of jaws 176. This projection 176q constitutes an abutment against which adjustment screws 176r and 176s are arrested, limiting the rocking motion of jaws 176 to accurately establish the ultimate side-to-side positions for the pair of stem wires #6 and #7 as located by jaws 176a and 176b.

The jaws 176 have depending arms 176t and 176u connected by links 176w and 176x to cam-following levers 176y and 176z. These cam-following levers are operated by cams 177a and 177b on shaft 177c, and are biased against these cams toward jaw closing position by a common spring 177d connected between arm 176u and cam-follower 176z. Cam shaft 177c is coupled by bevel gearing 177e to the shaft 177f that drives cam 176m. The cam shaft 177c is driven by main drive shaft 177h of the top mica unit I through one-to-one gearing 177g—177i. This main drive shaft is coupled, advantageously through a single-revolution electrically disabled clutch connected to the main drive shaft 20 of the machine. Shaft 177h also operates pusher 126′, blade 124′ and all the other mechanism (not shown) forming part of the top mica unit in station I.

Referring now to FIG. 79, jaws 178 are pivoted at 178d and 178e. An adjustable stop and centering arrangement comparable to 176q-r-s is provided at 178f, the details of which need not be repeated since a complete understanding may be obtained from the previous description. Rearwardly extending arms 178h and 178i on jaws 178 are oscillated by links 178j and 178k respectively connected to cam-following levers 178m and 178n, which are driven by cams 178p and 178q, respectively, on shaft 177f. The jaws are biased to move toward each other by spring 178r connected respectively to cam-following lever 178m and to rearwardly extending arm 178i, as illustrated best in FIGS. 79 and 85.

The operation of so much of the top mica station I as is represented in FIGS. 76, 79 and 85 will be evident from the foregoing description of the operations performed at this station, and from the linkages described. By virtue of positive constrained cam 176m, carriage 176f is oscillated fore-and-aft and carries both sets of jaws 176 and 178 fore-and-aft as a unit, to and from the stem block 10 as required during the operating sequence illustrated in FIGS. 80 to 83 inclusive. Both jaw sets are spring biased toward each other and have centering stops which determine their final closed positions. Separate cams are provided for operating each of these jaw sets in the direction away from the stem block axis.

Figure 109:
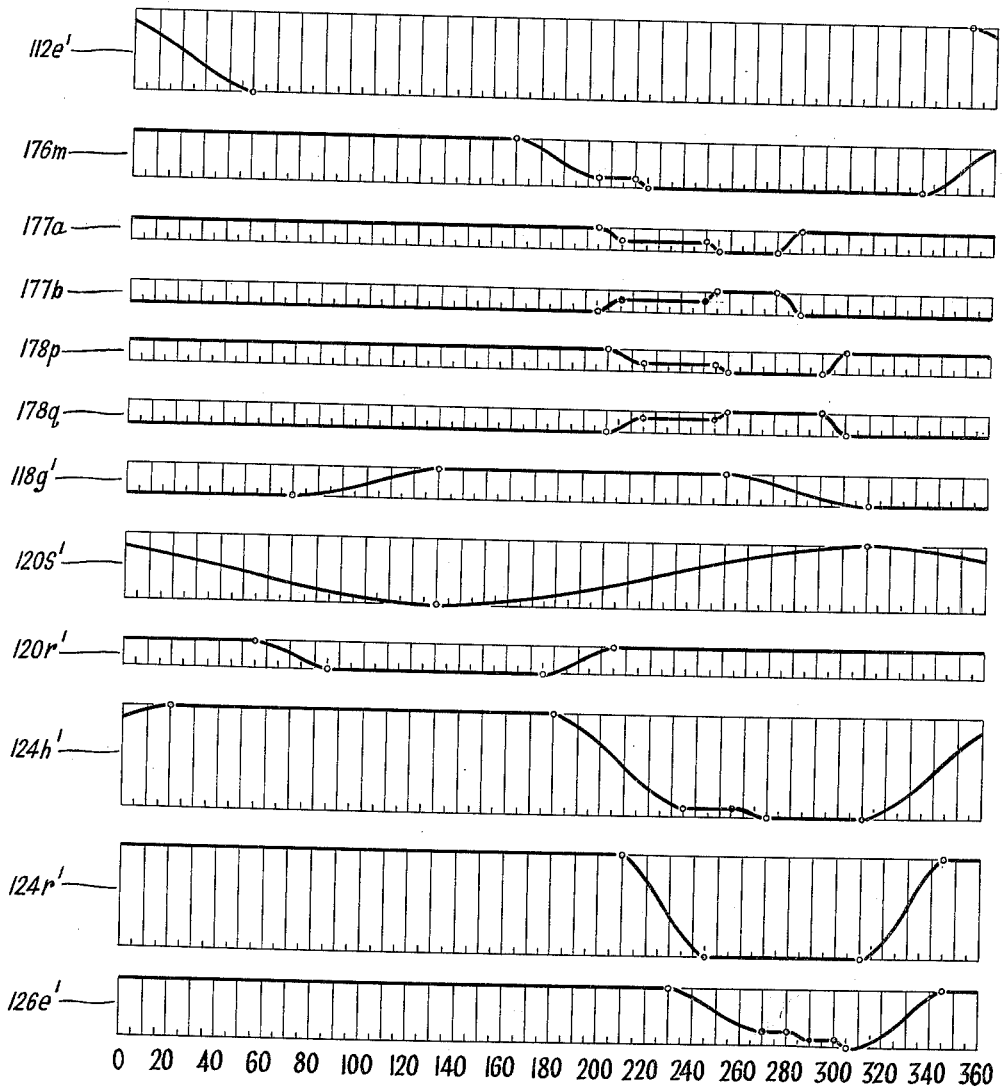

In FIG. 109 the timing of the various mechanisms are illustrated, with curves bearing the same numerals as the cams that produce the several operations. There it is seen that blade 124' is operated by cam 124h' to have its final forward motion toward the stem block at about the 270° part of the machine cycle, after cams 177a and 177b have closed jaws 176 on stem wires #6 and #7 and after cams 177a and 177b have closed jaws 178 on the grid side rods (the latter operating shortly after the former). This advances the mica tm on wires #6 and #7. Thereafter cams 177a, b open jaws 176 and cam 126e' advances pusher 126' toward the grid side rods, this occurring near the 280°–290° part of the cycle. Cams 178p, q then open jaws 178, and pusher cam 126e' is effective to drive the top mica along the grid side rods and against the end edges of anode parts a as previously described.

Cam 176m shifts the two sets of gathering tools 176, 178 toward the stem block as a unit, these tools being open, and advancing about the stem. The jaws close part way before the final advancing stroke of the jaw carriage which occurs approximately at the 210° part of the cycle; and after the final advance motion of the carriage the jaws close on the stem wires and grid side rods. After the mica applying operations are completed as described in the preceding paragraph, cam 176m is effective to retract the open pairs of jaws 176, 178 to clear the path for the stem with its top mica to leave and for the next stem to arrive. The various timing curves in FIG. 109 not specifically described represent the coordination of mechanisms not shown but present in this station as at station D.

THE ANODE CONNECTOR APPLYING STATIONS J, K

Referring now to FIG. 1A, it is seen that the stem arrives in station J bearing the bottom mica, the Nos. 1 and 2 grids, the two parts of the anode, and the top mica. The mount M is almost fully assembled except that the upper ends of the anode parts a against the top mica tm are not rigidly held in position and are not interconnected as a single bi-part anode. The lower ends of anode parts are only frictionally held in position adjacent to the bottom mica bm by the intermediate-length wires 1, 3, 4 and 5. The top mica is only held frictionally on the side rods of the grids and on the long wires 6 and 7.

At station J, a connector c is inserted through the top mica tm and into tubular passages at one end of each anode part or plate to provide the required mechanical and electrical interconnection. This connector c is a bridging wire or "hairpin" which fixes the anode parts accurately at the positions where the connector c penetrates the accurately pierced top mica. This connector serves the further purpose of holding the top mica tm against the ends of the anode plates and in position to maintain the accurate configuration of the electrodes. Additionally at station J the anode is welded to one or more of the medium-length stem wires and to the inserted "hairpin" for uniting the assembly permanently, and for forming the desired electrical joints. At station K, a second connector c is inserted, being a mirror-image duplicate of the bridging connector at station J, and like welds are made.

Because of the near-identity of the two connectors c and of the apparatus which forms and inserts those connectors, and which effects the appropriate welds, only one need be described herein for a full understanding of these stations of the illustrative equipment. Of course, two connectors c are included in the completed mount as delivered at the unloading station L in the form shown at the upper left hand corner of FIG. 1A.

The mechanism which inserts the connector c is also designed to form the connector, this feature being important in that it eliminates the potentially severe problem of orienting and handling these tiny odd-shaped parts. (The connectors might otherwise be furnished as finished parts.) The connector material is supplied to the machine as a continuous wire which is formed into the required part and, while the newly-formed part is continuously gripped and is held in the desired orientation, this part is applied to the mount in the required position. A similar concept is involved in the No. 1 grid station wherein each grid stop is formed in the machine as needed and is at all times held until it is assembled in place on the stem.

The work achieved at the connector applying stations J, K is shown in enlarged views, FIGS. 96 and 97. The mount M is shown supported at the right by its own stem wires, and by a header carried by a stem block 10. The mount is complete with bottom mica bm, the No. 1 and No. 2 grids (only the latter is seen in FIG. 1A), the top mica tm, and the connector c shown inserted in place. The one anode-part or plate a of the two-part anode (FIG. 96) has reversely curled sleeves a1 and a2 that tightly embrace medium-length stem wires 3 and 4. Additional reversely curled tab sleeves a3 and a4 are shown, the latter of which tightly encircles leg c1 of connector c. The other leg of the connector c is inserted into a corresponding passage of the other part of the two-part anode. The anode plate a illustrated may of course be either one of the anode parts. The strip getter, spot welded to one of the anode parts prior to anode assembly, is not shown.

At this station, the connector c is formed and forced through the holes in the top mica pierced in accurate positions, and into the assembled position illustrated in FIG. 96, with the intermediate, offset connecting bight pressed against the top mica tm and with the legs driven into respective sleeves of the two anode parts. Accordingly, the ends of the anode parts nearest the top mica tm are fixed in accurate spaced positions relative to the other electrodes previously mounted between the anode parts, fixed in proper precise positions by projections through the top mica.

In addition to the forming and assembling of connector c in place as shown, the legs of the connector c are spot welded to the anode parts at points a', and stem wires 1 and 4 are spot welded to parts a at adjacent points. This series of welding operations as described is susceptible to modification, since the anode-to-stem-wire welds may alternatively be accomplished in the anode assembly stations; and certain welding operations may be deferred until after the assembled mount M has been delivered from the machine, welded in the machine at only the few spots that will reliably unite the mount mechanically. It may be desirable to reduce the number of welds effected in the assembling apparatus because wear of the welding electrodes requires more frequent shut-downs for adjustment when a large number of welds is to be made than for few welds.

As will be seen, an important aspect of this station, similarly found in the No. 1 grid station, is the manner of orienting the top mica for receiving the legs of the anode connector c, this orientation being accomplished by tools that act by camming long stem wires 6 and 7 into place which carry the top mica into the precise required location and with its holes in the critical required positions.

With this introduction, detailed reference will be made to the operating mechanisms shown in FIGS. 86–100 for accomplishing the described functions. The apparatus includes various mechanisms supported on bed plate 180 (see especially FIG. 86) driven by main drive shaft 180a connected via bevel gearing 180b to cam shaft 180c and, via further bevel gearing 180d to drive shaft 180e, via further bevel gearing 180f to drive shaft 180g, the latter being coupled through spur gears 180h to a final cam shaft 180i. An axially extended drive gear 180j on the main drive shaft 180a meshes with an axially reciprocated driven gear 180k operating an additional cam shaft 180m which is coupled by bevel gearing 180n to an additional cam shaft 180p. Gear lock 180k and the shafts 180m and 180p and the cams carried thereby are supported together with certain tools, on secondary bed plate or carriage 182. This reciprocates in a horizontal plane, up and down in FIG. 86, so as to move toward and away from the stem block 10 that is shown in dotted lines. Secondary bed plate 182 is shown in FIG. 86 at a part of the cycle when the bed plate has advanced toward the stem block 10. During the time that this secondary bed plate 182 withdraws the supported tools from the stem block, moving downward in FIG. 86, driven gear 180k remains in mesh with drive gear 180j.

An assembly of welding and aligning tools is carried by the fore-and-aft reciprocable bed plate 182. As seen in FIGS. 87 and 89, the supporting slidable shaft 182a moves in bearings 182b on main stationary bed plate 180. An additional guide rail 182c, carried by bed plate 180 (FIG. 89) engages a channel member 182d depending from the plate 182 to prevent rocking of the bed plate about shaft 182a. Plate 182 is connected by link 182e to cam-following lever 182f driven by constrained cam 182g through a short oscillating stroke. It is by virtue of this mechanism that an assembly of aligning and welding tools is moved toward and away from stem block 10.

Gathering tools and welding tips, generally designated by numerals 184 and 192, respectively (FIGS. 86, 87 and 89), are arranged to advance on the two anode plates a carried by the mount which projects from stem block 10, moving toward the stem block, and are arrested in the position of FIG. 86. Numeral 186 generally designates the forming and transporting devices for delivering a connector c to transfer jaws 188 for assembly with the mount carried by stem block 10, there to be joined to the assembly by welding tools 192. A ram 190 cooperates with jaws 188 in the insertion of connector c.

The gathering tools generally designated 184, include jaws 184a, b. These advance around the mount and thereafter close against the edges of the anode to be interconnected by the wire bridging connector c. Jaws 184a, b are operated by elements extending upward from plate 182, reciprocated as just described. Gathering jaws 184a and 184b are pivoted, shown in FIG. 89 looking toward the stem block, at 184c and 184d in an upwardly projecting standard embodying bearings 184e and 184f for a shaft 184g to be described. As seen in FIG. 89, the gathering jaws 184a and 184b are interconnected for movement to and from each other by pin and slot interconnection 184h. They are oscillated by an arm 184i extending from jaw 184a, which arm is connected by link 184j to centrally pivoted cam-following lever 184k. This cam follower is oscillated by cam 184m on cam shaft 180p, and is held against the cam by spring 184n, the action being thus effective to close the jaws by spring tension and open them by positive drive.

The jaws 184a, 184b are open as they are carried forward by plate 182 so as to pass about a partial mount in a stem block 10; and when in their forward position the jaws close on the anode plates and on the side rods of the No. 2 grid, as shown in FIG. 97. Alignment of the No. 2 grid is important in that it carries with it the top mica and, in turn, the Nos. 6 and 7 stem wires. This is all preparatory to insertion of an anode connector c that bridges the two anode plates.

Reference will now be made to FIGS. 89–95 inclusive and 98–100 wherein there is shown the details of the mechanisms 186 for forming the U-shaped connectors c, each with an offset bight. These connectors are formed of wire from a suitably supported supply reel (not shown). The wire feeder is substantially the same as that for forming the grid stops in the No. 1 grid station, and is here described briefly. The wire feeder includes a two-part gripper 186a (whose parts are biased apart by compression springs 186a') controlled by cam follower 186b and cam 186c which has antifriction rollers at its ends and acts to periodically grip a length of wire to be fed to the forming dies. Gripper 186a is reciprocated along fixed antifriction rollers in the direction of wire feed by an operating cam follower 186d riding on a cam 186e and by tension spring 186f, which periodically lifts and depresses the gripper 186a in proper timed relation to the gripping of the wire, to feed a predetermined length of the wire downward toward the forming dies. A further cam 186g is driven by common shaft 180i that also carries cam 186b and cam 186d. This cam 186g operates gripping member 186a to hold the wire to be formed into a connector during the open, upward retracting strokes of gripper 186a. The wire, fed by the mechanism described, is delivered into tube 186i that directs the wire into the forming dies. The wire feeder carried on standard 186' is best shown in FIG. 89, from which the forming dies are omitted.

The mechanism for bending wire thus fed intermittently and for forming it into a connector is shown in FIGS. 87, 88, 92–95, and 98–100. The forming dies include a wide bar constituting a male die 186j, this bar having a thickness equal to the desired spacing between the legs of the connector c. The wire is not merely pressed against the surfaces of fixed die 186j during the forming operations, but after the connector has been formed it is slid toward the partial mount along the surface of fixed member 186j. It is for this reason that member 186j is of much greater length in the direction of insertion of the connector than is required merely by the bending dies alone. Coacting with male die 186j is a female die 186k. This includes a spring-biased pressure pad 186m engageable against the wire being formed, and a blade 186n that coacts with wire delivering tube 186i, for cutting off the prescribed length of wire that is to be formed into the connector. Female die 186k extends a short way across the top of fixed die member 186j and a short way across the bottom of die member 186j (see especially FIGS. 98–100). Each die part 186k and 186m has a wire-receiving groove 186k' and 186m', respectively, and cutter 186n also has a wire-receiving notch 186n'.

The power stroke of female die 186k against male die 186j is limited by a screw 186k'' (FIGS. 86, 92) that is adjustably secured in the machine frame 188h that slidably receives die 186k. Operatively connected to the female die 186k is a link 186p driven by a link 186q and cam follower 186r by a constrained cam 186s (FIGS. 86 and 88) on cam shaft 180c.

Cam 186s is effective via the linkage 186p–q–r to drive the female die 186k to the right in FIGS. 92 and 98–100 to sever the wire and bend it over the male dies 186j, forming the severed connector into U-shaped configuration. This stroke of die 186k toward die 186j is not exactly at right angles to die 186j but slants somewhat, for reasons below. For convenience, this stroke may be considered roughly transverse of the path of the connector toward the partial mount.

Reciprocated in connector-inserting direction along the male die 186j is a further female die member 186t which bends the connector legs through an angle of slightly more than 90°. This excess, beyond 90°, allows for some spring-back after release of the bight, and insures firm engagement of the bight against the mica when the legs of the connector are subsequently driven into the anode sleeves. The legs are directed toward the mount, as seen in FIG. 94, so that the bight is off-set from the legs. Grooves 186t' in bending die 186t receive the legs of the formed connector. The female die member 186t which is effective to make the roughly right-angled bend in the connector is carried at the end of slide 186u (FIG. 87) nearest the stem block. The slide is driven via connector 186v, cam follower 186w, and constrained cam 186x on the common cam shaft 180c that drives bight forming cam 186s. Slide 186u has bearings 186u' on standard 188h.

The coordination and operation of the respective male and female die parts may be reviewed in connection with FIGS. 94, 95 and 98–100. Briefly, blade 186n cuts the length of wire and, in the same die stroke, the female die 186k is effective to form the severed length of wire into U-shaped configuration. Thereupon the die 186t advances along the male die 186j to the connector legs a little more than 90° relative to the plane of the bight. In this position the legs of the connector are directed toward the partial mount projecting from stem block 10.

As seen in FIGS. 93 and 94, die 186t slides forward until it abuts against jaws 188a, b which close at that time to present apertures in line with the connector legs (FIG. 88A). Die 186k withdraws from die 186t, the connector legs being retained in grooves 186t′ by virtue of spring-pressed pad 186m; and pad 186m is withdrawn in turn. Ram 190 then slides forward along an edge of fixed die member 186j; and lateral portions of ram 190 slide along the upper and lower faces of member 186j and in sliding contact with bending die member 186t. As ram 190 slides forward, it engages the bight of connector c, drives the connector legs into apertures 188s of jaws 188a, b; and when jaws 188a, b advance toward the partial mount, ram 190 drives the connector legs into the mica and into a sleeve of each of the anode parts, jaw 188a withdrawing during the final portion of this stroke (FIG. 95).

The side of jaw 188a facing the connector is chamfered at apertures 188s to insure admission of the connector legs. Jaw 188b has a further pair of holes 188r, which holes are chamfered on the side of the jaw facing the stem block 10. It will be recalled that the partial mount in the stem block was embraced for alignment of the anode plates, and for adjustment of the No. 2 grid that carries the top mica into a preliminary adjusted position. At this stage only moderate flaring of holes 188r is sufficient to receive the No. 6 and No. 7 stem wires (shifted into preliminary adjustment by the top mica) and carry those wires into the precise positions needed for translational and rotational adjustment of the pierced mica as required to receive the connector legs. After the adjustment of the top mica is thus perfected, in consequence of the forward travel of chamfered apertures 188r to and along stem wires No. 6 and No. 7, ram 190 advances with jaws 188a, b to drive the connector legs into the aligned mica apertures and anode sleeves. The final stroke of ram 190 follows withdrawal of the jaw 188a, to press the bight of the connector against the mica and thereby press the mica against the end edges of the anode plates. The bight-engaging face 190′ of ram 190 slopes somewhat, as shown in FIG. 95 for most effective driving engagement with connector c.

It has been shown that a mount carried into station J by a stem block 10 is embraced and adjusted by gathering tools 184; and the connector-forming mechanism has been described in detail, and in its coaction with jaws 188 and ram 190. There remain to be described the operating mechanisms of jaws 188 and ram 190; and finally the welding mechanism 194 will be detailed.

Referring now to FIG. 87, there is shown a pair of transfer jaws 188 which received the anode connector or bridging wire c at the start of the machine cycle, this wire having been cut and formed during the preceding cycle. The formed wire of U-shaped configuration having a bight offset from the legs has been deposited in transfer jaws 188, as described, by the connector former 186. These jaws are shown at larger scale in FIG. 88A. The jaws 188a and 188b are carried by respective concentric shafts, the jaw 188a being secured to inner shaft 188c and the jaw 188b being secured to the outer shaft 188d. Jaw 188b actually does not oscillate about the axis of its supporting shaft, but relative opening and closing of the jaws is effected solely by oscillation of movable jaw 188a. The concentric shafts 188c and 188d are seen to be axially slidable as a unit in bearings 188e carried on support 188h and by the main bed plate 180. Plate 188f, fixed to outer shaft 188d, prevents any oscillation of that shaft about its axis by sliding engagement with guide shaft 188g fixed to the upstanding support 188h.

Axial reciprocation of shafts 188c and 188d and of the transfer jaws 188a and 188b is effected by a drive linkage secured to the plate 188f and including a short link 188i connected to cam-following lever 188j engaging a groove in cam 188k on drive shaft 180c (FIGS. 86 to 88). It should be understood that where a large number of cams are shown in end view on a shaft, such as the series of cams on shaft 180c in FIG. 87, the contours of the cams are schematically illustrated, their true nature being indicated in the timing charts.

The movable jaw 188a is spring biased into closed position against the fixed jaw 188b, and is opened by a cam drive, connected through an appropriate linkage. Specifically, the inner shaft 188c extends from jaw 188a and within shaft 188d, and at its opposite end rigidly carries an arm 188m (FIGS. 87, 88 and 88A). The arm 188m is pulled downward by a link 188n joined in turn to cam-following lever 188p pressed upward against its cam 188q by tension spring 188t.

The transfer jaws 188 grip one of the anode connecters or bridging wires c at the start of a machine cycle and transport the connector forward along a thrust path toward the top mica tm. The legs of the connector are received in recess 188s in jaw 188a (FIG. 88A). The transfer jaws are inadequate to force the legs c1, c2 of the connector through the tight holes in the top mica and into the tab sleeves such as a4 of the respective anode parts (FIGS. 95 and 96), this firm thrust being provided by a ram 190 (FIG. 86). The ram 190 is carried by a slide 190a operating in stationary slide bearings 190b, and is axially reciprocated by block 190c having link 190d connected thereto, cam-following lever 190e, and constrained cam 190f on cam shaft 180c (FIGS. 86, 87 and 88).

The transfer jaws 188a and 188b are reciprocated axially as previously stated, and the ram 190 is also reciprocated axially, along the delivery or thrust path of the connector toward the stem block to deliver and drive the formed anode connecting wire c into the mount. Before this takes place, the gathering tools 184 are effective (FIG. 97) to orient the anode parts in accurate predetermined positions to receive the legs of the connector c. Additionally, as seen in FIG. 97, wide V-notches in the jaws 184 "pick up" the side rods of the No. 2 grid and carry this part into a predetermined position. This action is important in that the grid side rods carry the top mica (and with it the stem wires 6 and 7) into a close approximation of the desired orientation. Thereafter, as the jaws 188 advance, chamfered holes 188r in jaw 188b pick up long stem wires 6 and 7 and thereby orient the top mica with the high order of precision needed for the connector legs to enter the critically positioned holes in the top mica. This action is very similar to the action in the No. 1 grid inserting stations, where the bottom mica is oriented by engaging stem wires 6 and 7 and thereby orienting the pierced mica with its holes positioned to receive the grid side rods.

After the connector has been inserted, gathering tools 184 are free to open and withdraw from the projecting mount so as to permit the stem to advance to the next station, except for the welds that should be made to secure the frictionally held parts in permanent, rigid assembly. The transfer jaws 188 and ram 190 withdraw, and the wire-feeding and bending sequence detailed above progresses in order to prepare a connector c for the next mount, all according to timing represented in FIG. 110. The wire is fed by cam 186e after ram 190 is withdrawn by cam 190f; and cams 186s and 186x are effective successively to cut the wire and bend the wire to V-shape, and then make the off-set bend. Thereafter cam 190f drives the ram and the connector c forward. Cam 188q allows the transfer jaws to be closed for receiving the connector advanced by ram 190. The bending of the connector and its delivery into the transfer jaws all take place while the stem-block conveyor carries the next stem into position for insertion of a connector.

Referring further to FIG. 110, the gathering tools 184 are carried toward the stem block (together with the welding tools to be detailed below) by cam 182g just after a stem block reaches station J. The gathering tools are then closed under control of cam 184m, and at the same time ram 190 and closed transfer jaws advance toward the mount, driven by cams 190f and 188k. Cam 188k opens jaws 188 during the final forward stroke of the ram, completing the insertion of connector c. From this point on, until withdrawal of the tools described and until the conveyor indexes again, the tools are moved in order to effect the welds.

Description of the motions of welding tips 192 is best included in the following detailed disclosure of the welding mechanism. As seen best in FIGS. 86 and 89 a camming member 192a is mounted for horizontal reciprocation between cam following rollers 192b for the respective welding tips. These are biased toward each other by parallel leaf-spring suspensions, per se forming no part of the present invention, effective for maintaining the tips in the closed position of FIG. 89. See my U.S. application Serial No. 279,277, filed March 29, 1952.

The welding tips 192, biased toward the closed or engaged position, are spread at the appropriate intervals during the welding cycles by provision of rise and dwell portions on the reciprocating camming slide 192a operating between the rollers 192b for the respective welding heads. The camming member is reciprocated in welding head 192' by a bell-crank 192c having one arm pivoted to the camming member 192a and having the other arm suitably constrained in a groove in head 192d. The head 192d is vertically slidable in standard 192e supported on a cam-following lever 192f operated by constrained cam 192g. The welding tips are worked by a linkage allowing unimpeded movement of the welding head 192' along the stem and in-and-out with respect to the locations to be welded. A portion of head 192d overlies a switch 192h that energizes pulse-welder 192i when the welding tips close so as to apply full welding pressure.

To move the welding jaws 192 toward the stem axis from the locations indicated in FIG. 96 and to move the welding jaws to the corresponding locations on the lower anode part as represented by dotted lines in FIG. 97, the following supports and operating mechanisms are provided. The entire welding head is mounted, as seen in FIG. 89, for reciprocation transverse to the stem axis and along shaft 184g. Specifically, shaft 184g is slidably supported within the bearings 184e, 184f of the gathering-tool assembly, a further shaft 192j being slidably supported in an appropriate bearing 192k and interconnected to the shaft 184g by a transverse-reciprocating standard 192m supporting the welding tip assembly. Transverse reciprocation, as indicated by the arrows on the standard 192m in FIG. 89, is accomplished by connecting link 192n having one end pivoted to the standard 194m and having the other end connected by cam following lever 192p in constrained cam 192r on the shaft 180m. The linkage 192n, 192p and cam 192r are effective to shift the supporting standard 192m to move the welding tips in and out with respect to the stem to be welded.

Raising and lowering of the welding head 192' to properly position the welding tips 192 with respect to the upper and lower anode parts, as shown solid and dotted FIG. 97, is effected by mounting the welding head 192' on a vertically reciprocating shaft 192s carried in the standard 192m. As seen in FIG. 89, the welding head 192' is in the up or elevated position corresponding to the full-line position of FIG. 97 of the welding tips. Lowering of the head is accomplished by link 192t (FIG. 87) connected via cam following lever 192u to a constrained cam 192w on the cam shaft 180p. It is to be noted that the required up and down motion for the welding head is very small when considering the initial size of the mount and the displacement of the upper and lower anode parts with respect to each other.

The four-step welding operations may be reviewed readily, making reference to FIGS. 96 and 97. The operations include the inward movement of the welding tips (while open) from the position in FIG. 96 to be located about the leg c1 of the connector, this being done by cam 192r; closing of the welding tips to make the weld and immediately opening, controlled by cam 192g; outward and lateral movement along an axis offset from the stem axis to the location adjacent the end of the medium-length wire 4, inward movement and reclosing of the welding tips to accomplish the weld; reopening and outward movement of the welding tips; lowering to the broken-line position of FIG. 97; inward movement and reclosing of the welding jaws about the medium-length wire 5 at a location below the weld previously formed; reopening of the welding tips; outward and lateral movement to a position beneath the connector leg c1, inward movement and reclosing of the welding tips followed by reopening and withdrawal along the initial line of advance, to the stage in FIG. 96.

The coordination of mechanisms 182 to 190 inclusive has been described above in connection with the timing chart (FIG. 110). The timing of the 192-series mechanism is also represented in FIG. 110.

At the end of the driving stroke of ram 190, as effected by cam 190f, cam 192r causes the welding tips 192 to move from the position in FIG. 96 toward the stem, and cam 192g causes the tips to close on the anode plate a and the connector leg c1 and at the same time closes the switch of the resistance welder. These strokes of the welding tips toward the stem are represented by the first rise in each curve identified with the corresponding cam numbers 192r and 192g in FIG. 110.

The second weld is effected closer to the stem block, as indicated by the dotted representation of welding tips 192 in FIG. 96. Cam 184m opens the gathering tools to release the stem while the plate 182 is moved "in" by the second rise in cam 182g, carrying the open tools 184 and 192 toward the stem block. Then, with the second rises in cams 192r and 192g as indicated in FIG. 110, the second weld is effected.

The plate 182 remains in the foregoing position, with welding tips 192 at their closest to the stem block, while cam 192w lowers the welding assembly 192' so as to be in condition to make the weld of the lower anode plate a to the stem lead #5. This is represented in FIG. 97 by the dotted-line position of welding tips 192. The weld is made when cams 192r and 192g follow the third rises represented in FIG. 110.

The fourth weld is effected at the lower level corresponding to the dotted-line showing of tips 192 in FIG. 97, but the welding tips are shifted a short distance away from the stem block by cam 182g as represented by the slight drop in the corresponding curve in FIG. 110 at approximately 310°. This shift brings the welding tips under the solid-line representation of tips 192 in FIG. 96, so that the lower anode plate is welded to the lower leg of the connector c inserted in this station. This takes place by virtue of the fourth rises in the curves in FIG. 110 identified with cams 192r and 192g.

The four welds accomplished by the mechanism thus described join the anode parts to respective medium-length stem leads and to respective legs of the anode connector c, permanently connecting the anode plates to each other via the connector, holding the top mica permanently to the anode sections and joining the anode sections electrically; and the anode parts are mechanically united to the stem, with electrical connection being provided to the anode via one of the medium-length stem wires. At station K four more welds made in the same way complete the anode welding required in the finished mount.

The foregoing is eminently to be desired; but sustained automatic operation of the entire assembling machine is promoted by reducing the number of welds, because of the inevitable need for cleaning and shaping welding tips periodically. By reducing the welds at each station J and K from four to two, the number of mounts assembled can be doubled before shut-down of the machine is required for dressing the welding tips. If each anode section is united to one stem wire (rather than to two) and if each connector c is united to only one anode section (rather than to two) the mechanically united mount can be produced, leaving the remainder of the anode welds to be made after delivery of the mount from the machine. This reduction in the number of welds extends the life of any dressed set of welding tips to twice the number of mounts that could be made containing all the anode welds. The mechanism described can readily be adapted to make one anode weld to a stem wire and one anode weld to the inserted connector c at station J, by omitting cam 192w and the linkage operated thereby, and by modifying cams 182g, 192r and 192g as shown in FIG. 110A. The latter two cams have but two rises each instead of four, and cam 182g has a secondary rise (somewhat later than in FIG. 110) but no secondary dip such as that in FIG. 110 between 310° and 350°.

UNLOADING STATION L

When the stem block reaches station L, the mount is complete, very nearly in the form delivered by the assembling machine. It is a rigid unit, with the electrodes, the micas and the stem accurately and permanently united. Several operations must still be done before this mount can be enclosed in its envelope, namely the grids are to be joined to stem wires and a cathode is to be inserted and connected in place. With other forms of electrode and mounts, the concepts in the foregoing disclosure can readily be adapted to fabricate a technically complete mount. In the present machine, the long wires #6 and #7 are to be cut shorter, and the mount is to be withdrawn from the stem block. The stem wires #6 and #7 were deliberately made longer than required in the finished stem, for their functional contribution in the assembling process. In station L, a mechanical pair of cutters trims those wires, and a pair of jaws appropriately formed and operated like jaw mechanism 170 in station G (FIGS. 66–68) are provided to grip and withdraw the mount from stem block 10. As seen in FIGS. 1A, 2 and 5 one of the cam-operated stem block mechanisms 38, 40 previously described releases the mount for unloading. In the event of misoperation resulting in a mount remaining in a stem block after leaving station L, an operator can still clear the stem block during the next machine cycle and before the stem block enters the loading station A.

The mechanism of station L is not separately illustrated and described in detail because its nature will be clear from the foregoing description to those skilled in the art.

CONCLUSION

The various features of the invention are believed amply shown and described, to the extent that recapitulation might serve to confuse rather than to clarify. It should be noted that the total result of the operation of the properly adjusted apparatus is represented in the integral mount delivered which is of such excellence that rejection of a finished tube because of an electrode assembly defect is rare. This is a prominent advantage of the mechanically assembled mount over a manually assembled product.

The organized apparatus may be modified in innumerable respects. For example, the conveyor 12, while of unique construction adapted to the machine disclosed, might be dispensed with entirely in an evasive effort, and in its place manual attendants might physically move stem blocks 10 from each assembly unit to the next. Furthermore, in assembling like products of modified designs, portions of the assembling apparatus and method may be omitted or adapted to meet requirements. Consequently the appended claims should be broadly construed, consistent with the spirit and scope of the invention.

What I claim is:

1. A multiple-station mount machine for assembling tube components to a stem having plural leads molded in a base, including a stem block movable into multiple work stations and releasably supporting a stem with the plural leads initially oriented in the stem block, a first station including means for cutting leads into a group of short lengths and another group of medium-length and leaving a further long group uncut, a second station including means for swaging leads of said medium-length group in the plane of the cut ends of said short group to define an abutment against which a bottom mica is to be disposed, a third station including die means for piercing a supported bottom mica with an apertured pattern corresponding to the pattern of the leads immediately adjacent said base, means supporting said bottom mica during piercing and advancing said pierced bottom mica along a predetermined thrust path to an intermediate assembled position on said long lead group, and means for releasing said bottom mica from the supporting and advancing means in said intermediate assembled position, a fourth station including means for advancing a first grid along a predetermined thrust path to intermediate assembled position with first grid side rods projecting through holes in said bottom mica pierced in said third station, and means for fixing a grid stop to one of said first-grid projecting side rods, a fifth station including means for advancing a second grid along a predetermined thrust path to an intermediate assembled position encircling said first and with second grid side rods extending through said bottom mica, the advancing means being arranged to drive said bottom mica and said assembled grids to a final assembly position with said bottom mica against said abutment, sixth and seventh stations including means for applying anode parts to said medium-length lead group on opposite sides of the assembled grids, an eighth station including die means for piercing a supported top mica with an apertured pattern corresponding to said bottom mica, and unitary means constantly supporting said top mica while piercing said top mica and advancing it along a predetermined thrust path to an assembled position penetrated by said long lead group and by the side rods of said grids and against the ends of said anode parts, and ninth and tenth stations including means for inserting multi-legged connectors fixing said top mica in said assembled position and electrically and mechanically interconnecting said anode parts.

2. A mount machine according to claim 1 including respective gathering means at several of said stations engageable about said leads and having camming surfaces for patterning at least the long lead group prior to effecting the respective stated operations at said several stations.

3. A mount machine according to claim 1, including conveyor means carrying said stem block and adapted to be intermittently indexed to advance said stem block into successive work positions, said conveyor means including first and second end sprockets and a chain having only a few large links per work station trained about said end sprockets, there being an odd number of links in the chain.

4. A mount machine according to claim 1, wherein said first and second stations include a tool advanced through a forward stroke along selected leads of said several groups, and means coordinated to the forward stroke of said respective tools for temporarily releasing said stem from support by said stem block toward the end of the respective forward strokes.

5. A mount machine according to claim 1 wherein the means for fixing said grid stop to said one of said first grid side rods includes a grid-stop former at said fourth station having a movable male die member operative on strip stock, movable welding means having opposed welding tips operated and effective as a transfer member for a formed grid stop, and means for mounting said welding means for movement from a loading position wherein said opposed welding tips receive a formed grid stop from said male die member to a welding position wherein the transfer grid stop encircles said one of said first grid side rods.

6. A mount machine according to claim 1 wherein the means at each of said ninth and tenth stations include a former operative on strip stock to form a U-shaped connector, and transfer means for driving the legs of said U-shaped connector through apertures in said top mica and into tab sleeves on said anode parts aligned with said apertures.

7. A mount machine including a holder for gripping a stem having plural leads extending from a header in an arbitrary pattern, gathering and combing means including jaws engageable about said leads adjacent said header and defining a predetermined pattern for said leads, a die spaced from said jaws and having a pattern of apertures engageable over the ends of said leads when brought into said predetermined pattern, means for moving said gathering and combing means away from said stem holder along a prescribed path toward said die for patterning the ends of said leads, and means operable thereafter for advancing said die along said prescribed path and through a limited stroke toward said holder.

8. A mount machine including a support having movable jaws releasably gripping a stem having plural leads to be worked on extending from a base, combing means engageable about said leads adjacent said base and defining a predetermined pattern for said leads, a die spaced from said support and engageable about said leads when the leads are brought into said predetermined pattern, means for retracting said combing means away from said jaws and along a prescribed path for patterning the ends of said leads, means operable in timed relation to advancing of said die for retracting said combing means from said prescribed path, means operable upon advance of said die for moving said jaws relative to each other to release said stem for a predetermined interval during which said die is enabled to perfect the orientation of said stem, and means for thereafter closing the jaws on the stem.

9. A mount machine including a holder for gripping a stem having leads extending from a header in an arbitrary pattern, gathering and combining means engageable about said leads adjacent said header and defining a predetermined pattern for said leads, a die spaced from said gathering and combining means and having a pattern of apertures engageable over the ends of said leads when brought into said predetermined pattern, means for moving said gathering and combining means away from said stem holder along a prescribed path toward said die for patterning the ends of said leads, means operable thereafter for advancing said die along said prescribed path and through a limited stroke toward said holder, and means operable in timed relation to advancing of said die for retracting said gathering and combing means from said prescribed path.

10. A work processing machine including a stepwise conveyer, a work holder carried loosely by said conveyer and including a pair of jaws biased toward each other, a work-holder gripping mechanism at a work station for seizing and locating said work holder, and a jaw-opening mechanism operable in time with said conveyer and said work-holder gripping mechanism and including means for spreading the jaws while the work holder is at rest, said work-holder including a seat and said jaws including surfaces diverging in the direction of said seat effective to seize an inserted object and bias the object against the seat, and mechanism operable in successive stations on the inserted object as it advances stepwise for effecting progressive related operations on the object as determined by the location of the work holder in the respective stations.

11. In a mount machine including a work-holder supporting a stem having one group of projecting leads to be worked on and a further group of leads longer than said one group and serving as reference wires, a lead-working station comprising a pair of gathering tools, means operating said tools to close on said further group of leads at a location spaced outwardly from the projecting ends of said one group of leads and to advance on said one group of leads while closed, said gathering tools being formed with guide holes patterned to register with the projecting ends of said one group of leads upon movement of said gathering tools through a forward stroke toward said work holder, a pair of normally spread lead-working tools arranged to engage selected leads of said one group, and respective operating means operable in timed relation to the means operating said gathering tools for moving said lead-working tools through a forward stroke approaching the work holder, and for thereafter operating said lead-working tools to engage and withdraw from said selected leads while said selected leads are accurately constrained by said gathering tools.

12. Apparatus including a work holder supporting a stem having one group of projecting leads to be worked on, a lead-working station comprising a pair of gathering tools arranged to close on a further group of leads at a location spaced outwardly from the projecting ends of said one group of leads, said gathering tools being formed to constrain and pattern said one group of leads upon movement of said gathering tools through a predetermined stroke, a pair of normally spread lead-working tools engageable with selected leads of said one group, and respective operating means for moving said gathering tools through said predetermined stroke and for operating said lead-working tools against said selected leads while said leads are accurately constrained by said gathering tools.

13. In a mount machine including a work holder having jaws releasably supporting a stem having one group of projecting leads to be worked on, said stem having a further group of leads which are longer in length than said one group, a lead-working station comprising a pair of gathering tools arranged to close on said further group of leads at a location spaced outwardly from the projecting ends of said one group of leads, said gathering tools being formed to constrain and pattern said one group of leads upon movement of said gathering tools through a predetermined stroke, a pair of normally spread lead-working tools engageable with selected leads of said one group, respective operating means for moving said gathering tools through said predetermined stroke and for driving said lead-working tools against said selected leads in timed relation whereby said selected leads are accurately constrained by said gathering tools during engagement by said lead-working tools, and further operating means coordinated to the respective operating means for said gathering and lead-working tools for spreading the jaws of said work holder when said lead-working tools engage said lead whereby said stem is supported by said gathering tools during working of said leads.

14. Apparatus for assembling the legs of a part, such as a No. 1 or No. 2 grid or an anode connector, to a mica having holes for receiving such legs, including means for supporting a mount with such mica carried by multiple wires projecting through the mica, locating tools having sloping faces, means operating said tools into slantwise locating engagement with such projecting wires thereby to carry the mica into critically oriented position, and a part support having operating means effective to carry a part to be inserted with forward-projecting legs along a critical insertion path in relation to the oriented holes in the mica.

15. Apparatus for assembling the legs of a part, such as a No. 1 or No. 2 grid or an anode connector, to a mica having holes for receiving such legs, including means for supporting a mount with such mica carried by multiple wires projecting therethrough, locating tools having slant camming faces, means interposing thrust-resisting support at one face of such mica, means operating said tools into slantwise locating engagement with such projecting wires thereby to adjust said mica into critical oriented position, and a part gripper having operating means effective to carry a part with projecting legs along a critical insertion path in relation to the oriented holes in the mica at the side of the mica opposite the thrust-resisting support.

16. Apparatus for assembling an anode connector to a partial mount having stem wires and grid side rods projecting through a top mica, including means supporting the partial stem, tools having operating means and having slant surfaces progressively engageable with the grid side rods and effective to carry the grid and thereby the mica into preliminary orientation, additional cam-faced locating means engageable with the projecting wires effective to locate the wires precisely and thereby to perfect the orientation of the mica, and an inserter having operating means effective to drive the legs of a wire insert along a predetermined path in relation to the mica and into the oriented holes therein.

17. Apparatus in accordance with claim 16, including additionally a split-funnel tool fixed in relation to said additional cam-faced locating tool and having openings opposite the intended locations of respective holes in the oriented mica that are to receive said legs, and means to spread the parts of the split-funnel tool during advance of the anode connector into place as constrained by said inserter.

18. In a mount machine, a stem block receiving a partial mount having leads supporting a mica, a station for assembling a grid having side rods on said mount comprising a cradle for said grid arranged along a thrust path toward said stem block, a grid inserter movable from the side of said cradle opposite said stem block and toward said stem block along said thrust path and through a forward stroke, respective operating means for said cradle and grid inserter arranged to move said cradle from said thrust path during the first part of said forward stroke after said grid inserter is in supporting relation to said grid, and means interposed along said thrust path and operative to orient side-rod apertures in said mica for registry with the side rods of said grid for assembly during the last part of said forward stroke.

19. A mount assembling machine including a stem block, means effective to insert a stem therein and to apply a pierced mica on wires projecting from the stem, an inserter for an electrode having projecting legs, means engaging said wires effective to orient the wires and the mica therewith for insertion of legs of said electrode through holes in the mica, and a mobile set of welding tips having actuating means to carry the tips into operation on the portions of the electrode legs projecting through the mica.

20. Apparatus in accordance with claim 19 including means for forming and inserting into said welding tips a U-shaped electrode stop, and wherein said welding tip actuating means is coordinated with the electrode inserter to advance with the open top of the U-shaped stop moving across the insertion path of the leg and after the inserter has advanced the electrode into a rest position with the leg projecting through the mica.

21. Apparatus in accordance with claim 20, wherein said welding tip actuating means and said inserter are coordinated so that the welding tips are disposed behind the mica before the inserter has advanced sufficiently to drive the electrode legs into the mica.

22. Assembling apparatus including means supporting at least one projecting wire and a mica or the like on the wire, an inserter effective to carry an electrode having at least one leg with the leg foremost and to drive the leg through the mica, and a pair of welding tips having supporting and actuating means to transfer the tips transverse of the wire and on the side of the mica opposite the electrode inserter while a stop to be attached to the electrode is carried between the welding tips.

23. Apparatus in accordance with claim 22 wherein the welding-tip actuating means and the inserter have coordinating drive means operable to dispose the welding tips behind the mica before the inserter has advanced the electrode leg to the mica without bearing the stop into the path of the leg, and the drive being further operable to advance the welding tips to position the stop on the leg only after penetration of the mica by the leg.

24. Apparatus in accordance with claim 22 wherein means is included engaging the edge of the mica on the side opposite the approach of the welding tips for resisting shifting of the mica during application of the stop to the electrode leg.

25. Apparatus of the type described including means supporting a wire or the like having a projection, a pair of welding tips having actuating means movable to embrace the projection and for welding a further part thereon, said actuating means being thereafter effective to withdraw the welding tips, and a stripper stationary during at least part of the withdrawal of the welding tips and interposed in the path of the welding tip faces for clearing the welding tips of adherent material.

26. A mount machine including a stem block supporting a partial mount having leads extending through and supporting a mica, and a station for assembling a grid having side rods to said mount with said side rods extending through preformed apertures in said mica and adapted to be fixed in position by a grid stop to be assembled in said station and welded to one of said side rods, said station including a grid inserter movable through a forward stroke along a thrust path toward said stem block, split jaws having orienting recesses to receive said leads for imparting a final orientation to the mica of said mount, said jaws defining a passageway in an operative position for guiding the side rods of said grid into registry with the preformed apertures in said oriented mica, and respective operating means for said grid inserter and said jaws for advancing said grid inserter into a cooperating position with said jaws during the last part of its insertion stroke, and for thereafter spreading said split jaws.

27. A mount machine according to claim 26 including a transfer member effective to support a grid in the insertion path of said inserter and including a stop operative while said transfer member is in electrode-delivering position to preclude displacement of the grid toward said stem block during pick-up by the advancing grid inserter, and including a resilient support for said grid inserter absorbing shocks incident to pick-up of a grid from said transfer member.

28. A mount machine including means supporting a partial mount for assembly thereto of a further electrode, an inserter having actuating means for moving an electrode toward said mount, a carrier supporting an electrode in the insertion path of the inserter and including a stop arresting the electrode during the operation of the inserter actuating means in the forward direction, said actuating means including a resilient member accommodating drive of the inserter against an electrode that is restrained by said stop.

29. A mount machine including a stem block supporting a mount having leads extending through and supporting a mica, and a station for assembling a grid having side rods to the mount with the side rods extending through preformed apertures in said mica, said station including a grid inserter movable through a forward stroke along a thrust path toward said stem block, split jaws in advance of said grid inserter and movable along said thrust path and having forward flared openings to receive said leads for imparting a final orientation to the mica of said mount, said jaws defining therebetween a rearward flared passage in an operative position for guiding the side rods of said grid into registry with said preformed apertures in said oriented mica, respective operating means for said grid inserter and said jaws for advancing said jaws along the thrust path into lead-orienting position and for advancing said grid inserter into a cooperating position with said jaws during the last part of said forward stroke for driving the side rods through said passage and into the registering apertures, said jaws bearing against the adjacent face of said bottom mica during said last part of said forward stroke, and abutment means bearing against the opposite face of said mica whereby the mica is longitudinally confined during driving of the grid side rods into said mica.

30. A mount machine according to claim 29, wherein the abutment means includes a pair of welding tips movable toward and away from each other and adapted to receive a grid stop to be fixed about an interposed side rod of the grid contiguous to and projecting from said opposite face of said mica.

31. A mount machine according to claim 30 including means for moving said welding tips from the operative position abutting said mica to an offset position for receiving a grid stop, and forming and delivering means operative on strip stock to periodically insert a grid stop in said welding tips at said offset position.

32. A mount machine according to claim 31, additionally including a stripper body movable with said welding trips, and arresting means operative during movement of said welding tips into said offset position for holding said stripper body stationary whereby continued movement of said welding tips causes said stripper body to pass between said welding tips.

33. A mount machine in accordance with claim 32 wherein said jaws embody an abutment engaging an edge of said mica and wherein said welding tips are actuated to advance with a grid stop across a face of the mica and toward said lateral mica abutment.

34. In a mount machine including a stem block receiving a mount having leads supporting a mica, a station for assembling a grid having side rods on said mount, comprising a grid inserter movable toward said stem block along a thrust path, operating means effective to move said grid inserter toward said stem block in a grid-inserting stroke, means interposed along said thrust path and operative to orient side-rod apertures in said mica in relation to the grid side rods for receiving the side rods of said grid carried by said inserter, and stripper means operative during the return stroke of said grid inserter and having operating means to hold an inserted grid in position during the withdrawing operation of said inserter.

35. A mount machine according to claim 34, wherein said stripper means includes a member mounted for limited linear displacement relative to said grid inserter, and drag-applying means constraining said member into a lagging and retracted position relative to the operative strokes of said grid inserter, whereby said member is rendered operative to clear said grid inserter and thereafter to withdraw and free the inserter to receive a grid.

36. Apparatus in accordance with claim 34 wherein said interposed orienting means includes actuating mechanism effective to withdraw the orienting means in the direction opposite that of grid insertion and the orienting means and actuating mechanism is coordinated with said inserter and said stripper so as to withdraw during engagement of the stripper with the grid.

37. In a mount machine, a stem block adapted to receive a partially completed mount having projecting leads, a lead-supporting mica and a first grid projecting from said mica, a station for assembling to the partially completed mount a second grid which is to encircle said first grid, comprising a grid inserter movable toward said stem block and along a thrust path through a forward stroke, operating means for said grid inserter arranged to move toward said mica and gathering means including portions engageable with said first grid and said leads and further portions interposed along said thrust path and operative to orient side-rod apertures in said mica for registry with side rods of said second grid and to further orient said first grid to be received within said second grid.

38. In a mount machine including a stem block receiving a partially completed mount having projecting leads, a lead-supporting mica and a first grid projecting from said mica, a station for assembling to the partially completed mount a second grid which is to encircle said first grid, comprising a grid inserter movable toward said stem block and along said thrust path through a forward stroke, operating means for actuating said grid inserter, and guide means interposed along said thrust path and operative to orient side-rod apertures in said mica for registry with side rods of said second grid and to further orient said first grid to be received within said second grid, said guide means including a first set of jaws movable into lead- and mica-orienting position at the side of the mica remote from the grid inserter, and a second set of jaws movable into a preliminary orienting position relative to the first grid and thereafter movable into a final orienting position relative to said opposite free end of the second grid upon movement of said inserter toward said mica.

39. A mount assembling machine including a stem block bearing a stem having short, medium and long leads and a mica on the long leads but clear of the other leads, means orienting the mica by direct engagement with its supporting leads, electrode supporting means effective to insert an electrode into holes in the oriented mica, and means to advance the mica toward and on the medium leads and against the short leads, said means including split gathering tools in operation being interposed between the mica and the medium leads and having flared openings to receive the ends of the medium leads and direct same to holes in the mica.

40. A mount assembling machine including a stem block bearing a stem having short, medium and long leads and a mica on the long leads but clear of the other leads, multiple tools when in operation being laterally movable toward each other and the long leads between the mica and the stem block and having long-lead receiving recesses to orient said mica, said tools having passages flared toward the stem block for receiving said medium leads and directing them toward the holes in the mica to receive such leads, and actuating means advancing the mica toward the stem block and withdrawing said tools from the advancing path of the mica.

41. In a mount machine, a stem block adapted to bear a partially completed mount having short, medium and long leads, a bottom mica supported on said long leads and having holes adapting the mica to be thrust over said medium leads to lie against said short leads, and a first grid supported on said bottom mica and projecting forwardly therefrom, a station for assembling to the partially completed mount a second grid which is to encircle said first grid and for displacing said bottom mica to lie against said short lead group, said station including a grid inserter movable toward said stem block and along said thrust path through a forward stroke, first orienting means engageable about said long lead group between said bottom mica and said medium leads, thereby to orient said mica, second orienting means engageable about said first grid adjacent the projecting end to impart an initial orientation to said first grid, and a rod penetrating the second grid and actuated to enter and orient the first grid during the advance of the second grid, said second orienting means being actuated to receive the second grid after engagement of the first grid by said rod.

42. A mount machine according to claim 41 wherein said first orienting means in said engaged position has actuating means rendering same effective as an abutment for said bottom mica, and including means for advancing second orienting means along said thrust path adjacent the bottom mica to guide the side rods of the second grid into the oriented holes of the mica.

43. A mount machine according to claim 41 including respective operating mechanisms connected to the respective orienting means for retracting same from said thrust path in proper timed relation to advance of said grid inserter, whereby after proper orientation of said bottom mica and first grid relative to said second grid, and after insertion of the second grid, said grid inserter may advance to drive said bottom mica onto the medium leads and against said short leads.

44. A mount machine in accordance with claim 43 wherein tool portions are provided and actuated transversely of the part-assembling path effective to shift projecting portions of the partial mount out of the advancing path of said part.

45. In a mount machine, a pair of gathering tools for seizing and orienting the projecting side rods of a pair of nested grids or the like, each grid having a pair of projecting side rods, said tools embodying two pairs of notches, the outer notches for receiving the side rods of the outer grid and the inner notches for receiving the side rods of the inner grid, the outer notches being separated from the inner notches by respective teeth having steep sides leading into the outer notches and gradually slanting sides leading into the inner notches, and a pair of outward-slanting edges leading into the outer sides of the outer notches and projecting forward of said teeth in the closing direction of the tools, and means for closing said tools to bring the respective notches in cooperating relation.

46. Apparatus for orienting the ends of paired side rods of a pair of nested grids or the like in a required pattern, including first tool portions engaged with the side rod ends of one of the grids and effective to adjust such ends through a wide range into the required positions in the pattern, second tool portions engageable with the side rod ends of the other of the grids and effective to adjust such grid through a limited range, and means operating said tool portions successively into engagement with the side rod ends in the order named, whereby the first grid adjusted will carry with it any badly misadjusted second grid.

47. In a mount assembling machine, a stem block having means effective when in use to hold a partial mount with a pattern of oriented projecting wires of different lengths, wire-aligning means including operating mechanism and an operated tool movable toward and away from the stem block and having formed therein a plurality of passages for receiving certain stem wires, said passages being of progressively larger cross-section toward their openings facing the stem block, said tool being of multi-part form and being split at a parting surface that divides said passages lengthwise, and wherein said operating mechanism includes means to close the tool parts on each other before moving the tool to its limit nearest the stem block and to separate the tool parts before withdrawing same from said limit.

48. In a mount assembling machine, a stem block having means effective when in use to hold a partial stem with a pattern of oriented projecting wires of different lengths, wire-aligning means including operating mechanism and an operated tool movable toward and away from the stem block and having formed therein a plurality of passages for receiving long stem wires and additional passages for receiving shorter stem wires, said additional passages being of progressively larger cross-section toward their openings facing the stem block, said tool being of multi-part form and being split at a parting surface that divides said passages and said additional passages lengthwise, and wherein said operating mechanism includes means to close the tool parts on each other before moving the tool toward the stem block sufficiently to receive the shorter stem wires.

49. In apparatus of the class described, a set of combing tools having projecting fingers, means actuating said tools to approach each other to the extent that the fingers of one tool overlie fingers of another, and means to move said tools while in the crossed-finger position in the direction generally normal to the plane of their line of approach.

50. Apparatus for operating on stems, including a conveyor having holders for stems having projecting wires, a loading station having a loading tool embodying a blade arranged to extend between certain stem wires and to load stems individually into the workholder with preliminary orientation, further orienting means including apertured tools engageable with the wires at another station to improve the stem orientation, and tools actuable in other stations to work and to assemble parts to the thus oriented stem wires.

51. In a mount assembling machine, a stem conveyor having a holder embodying a seat to support the header of a stem with the stem wires projecting freely, means actuating the conveyor into multiple stations successively, wire-cutting tools coacting with the stem holder in one station to establish sets of wire ends at different planes spaced from said seat, and gathering and assembling tools in other stations operable into respective predetermined planes relative to said seat for coacting with certain wires to the exclusion of others.

52. Apparatus in accordance with claim 51, including wire-gathering and assembling tools at one station effective to load a mica to an intermediate position on long wires, and include assembling tools at a second station coacting on opposite sides of the mica to assemble an electrode to the mica.

53. Apparatus in accordance with claim 52 including tools thereafter effective to align the shorter wires with holes in the mica and to advance the mica onto those wires.

54. Apparatus for welding a hollow part to a work projection in a predetermined location, comprising a welding mechanism including a pair of welding tips, means for forming a part to be welded and inserting the part between the welding tips, said welding tips having a common supporting frame and being relatively movable to and from the part forming means thereon, said frame having actuating mechanism to carry the welding tips and the part carried thereby to the projection to which the part is to be welded, said frame retaining alignment of the part forming means and the welding during the actuation of the welding mechanism toward the work projection.

55. Apparatus for welding a part to a projection in a support, including mechanism for forming a hollow part, a welding mechanism including a pair of welding tips, means to bring said part forming mechanism and said welding mechanism into coaction and effective to transfer a formed part from the former to the welding tips, and means for moving said projection support and the welding tips relative to each other for causing the welding tips to apply the hollow part to the projection.

56. Apparatus for joining a hollow part to an article having a projection, including a support for the article, a welding mechanism including a pair of welding tips movable into cooperation with the article projection, means effective to deposit a hollow article to be affixed to the projection between the welding tips, and a welding power supply for the welding tips actuable after said tips have assembled the hollow part to the projection.

57. In a mount machine, a stem block adapted to carry a stem including projecting wires supporting a mica having apertures for receiving legs of a part to be assembled therewith, locating tools, means mounting said locating tools for movement toward and away from the stem axis, actuating means operatively connected to said locating tools for moving said locating tools into engagement with said wires in immediate proximity to one face of said mica whereby adjustment of said wires perfects the orientation of the apertures in said mica to receive the legs of said part, means interposing thrust-resisting support at the other face of said mica, a carrier for said part, and means operatively connected to said carrier for advancing said carrier toward said stem block with said legs along prescribed insertion paths in relation to the oriented apertures in said mica for assembling therewith.

58. In a mount machine, a stem block adapted to receive a partial mount having leads supporting a mica, a station for assembling a grid having side rods on said mount comprising a cradle for said grid, means mounting said cradle for movement along a thrust path toward said stem block, a grid inserter having means for supporting said grid, means mounting said grid inserter for movement from the side of said cradle opposite said stem block and toward said stem block along said thrust path and through a forward stroke, respective operating means for said cradle and grid inserter arranged to move said cradle from said thrust path during the first part of said forward stroke and after said grid inserter is in supporting relation to said grid, and a guide along said thrust path operative to orient side-rod apertures in said mica for registry with the side rods of said grid for assembly during the last part of said forward stroke.

59. A mount machine including a stem block supporting a mount having leads extending through and supporting a mica, and a station for assembling a grid having side rods to the mount with the side rods extending through preformed apertures in said mica, said station including a grid inserter movable through a forward stroke along a thrust path toward said stem block, jaws in advance of said grid inserter along said thrust path having openings to receive said leads for imparting a final orientation to the mica of said mount, said jaws being arranged to define a rearward flared passage in an operative position for guiding the side rods of said grid into registry with said preformed apertures in said oriented mica, respective operating means for said grid inserter and said jaws for advancing said jaws along the thrust path into lead-orienting position and for advancing said grid inserter into a cooperating position with said jaws during the last part of said forward stroke for driving the side rods through said passage and into the registering apertures.

60. A mount machine including a stem block supporting a mount having leads extending through and supporting a mica, and a station for assembling a grid having side rods to the mount with the side rods extending through preformed apertures in said mica, said station including a grid inserter, operating means for moving said grid inserter through a forward stroke along a thrust path toward said stem block, split guiding jaws in advance of said grid inserter, operating means for moving said guiding jaws along said thrust path, said guiding jaws having forward flared openings to receive said leads for imparting a final orientation to the mica of said mount, said jaws being formed to define therebetween a passage in an operative position for guiding the side rods of said grid into registry with said preformed apertures in said oriented mica, the respective operating means for said grid inserter and said guiding jaws being arranged to advance said jaws along the thrust path into lead-orienting position and to advance said grid inserter into a cooperating position with said jaws during the last part of said forward stroke for driving the side rods through said passage and into the registering apertures of said mica, said jaws bearing against the adjacent face of said bottom mica during said last part of said forward stroke, and an abutment bearing against the opposite face of said mica whereby the mica is longitudinally confined during driving of the grid side rods into said mica.

61. In a mount machine, a stem block adapted to support a partialy completed mount having short, medium and long leads, a bottom mica supported on said long leads and having holes adapting the mica to be thrust over said medium leads to lie against said short leads, and a first grid supported on said bottom mica and projecting forwardly therefrom, a station for assembling to the partially completed mount a second grid which is to encircle said first grid and for displacing said bottom mica to lie against said short lead group, said station including a grid inserter adapted to receive said second grid, means mounting said grid inserter for movement toward said stem block and along said thrust path through a forward stroke, first orienting jaws, means for actuating said first orienting jaws to be engaged about said long lead group between said bottom mica and said medium leads thereby to orient said mica, second orienting jaws adapted to be engaged about said first grid adjacent the projecting end to impart an initial orientation to said first grid, a rod adapted to penetrate the second grid, and means for actuating said rod to enter and orient the first grid during the advance of the second grid.

62. In a mount machine, a stem block for supporting a partial mount having multiple projecting leads supporting a mica provided with holes therein, an inserter formed to carry a grid or like electrode with projecting legs toward the mica, and mica-orienting means engaging said mica-supporting leads to thereby orient said mica and said holes to receive the projecting legs of the electrode to be inserted, said mica-orienting means being interposed along the thrust path of the inserter and including tools formed with flared orienting holes opening into the leading face of said tools for initially receiving the mica-supporting leads, said tools being formed with a through passageway between said trailing and leading faces for guiding said electrode relative to said holes in said mica, and means operable in timed relation to the operating means for said inserter for bringing said tools into position to receive said mica-supporting leads prior to said electrode being thrust through said passageway whereby said tools serve as a common aligning means for said electrode and for said mica via said mica-supporting leads.

63. In a mount machine, a stem block for supporting a partial mount having multiple projecting leads supporting a mica provided with holes therein, an inserter formed to carry a grid or like electrode with projecting legs toward the mica, and mica-orienting means engaging said mica-supporting leads to thereby orient said mica and said holes to receive the projecting legs of the electrode to be inserted, said mica-orienting means being interposed along the thrust path of the inserter and including tools formed with flared orienting holes opening into the leading face of said tools for initially receiving the mica-supporting leads, said tools being formed with a through passageway between said trailing and leading faces for guiding said electrode relative to said holes, means operable in timed relation to the operating means for said inserter for bringing said tools into position to receive said mica-supporting leads prior to said electrode being thrust through said passageway whereby said tools serve as a common aligning means for said electrode and for said mica via said mica-supporting leads, means for operating said tools in a forward stroke until the leading face of said tools bears against the adjacent face of said mica, and abutment means including a thrust-resisting element operatively bearing against the opposite face of said mica whereby said mica is constrained against longitudinal displacement during insertion of the projecting legs of the electrode through said holes.

64. In a mount machine, a stem block for supporting a partial mount having multiple projecting leads supporting a mica provided with holes therein, an inserter formed to carry a grid or like electrode with projecting legs toward the mica, and mica-orienting means engaging said mica-supporting leads to thereby orient said mica and said holes to receive the projecting legs of the electrode to be inserted, said mica-orienting means being interposed along the thrust path of the inserter and including tools formed with flared orienting holes opening into the leading face of said tools for initially receiving the mica-supporting leads, said tools being formed with a through passageway between said trailing and leading faces for guiding said electrode relative to said holes in said mica, means operable in timed relation to the operating means for said inserter for bringing said tool into position to receive said mica-supporting leads prior to said electrode being thrust through said passageway whereby said tools serve as a common aligning means for said electrode and for said mica via said mica-supporting leads, means for operating said tools in a forward stroke until the leading face of said tools bears against the adjacent face of said mica, and abutment means including a thrust-resisting element operatively bearing against the opposite face of said mica whereby said mica is constrained against longitudinal displacement during insertion of the projecting legs of the electrode through said holes, said abutment means including a pair of welding tips movable from an offset position wherein said welding tips receive a stop to an operative position wherein said welding tips serve as the abutment and additionally support said stop for assembly about a projecting leg of the electrode after extension through said mica.

References Cited in the file of this patent

UNITED STATES PATENTS

| Number | Name | Date |
|---|---|---|
| 1,508,708 | McBride | Sept. 16, 1924 |
| 1,612,537 | Schroeder | Dec. 28, 1926 |
| 1,620,523 | De Jong et al. | Mar. 8, 1927 |
| 1,626,410 | Halstead | Apr. 26, 1927 |
| 1,730,479 | Scranton | Oct. 8, 1929 |
| 1,751,410 | Koning | Mar. 18, 1930 |
| 1,751,419 | Phelps | Mar. 18, 1930 |
| 1,760,629 | Brindle | May 27, 1930 |
| 1,786,609 | Halstead | Dec. 30, 1930 |
| 1,817,746 | Gooskens et al. | Aug. 4, 1931 |
| 1,821,894 | Ataka | Sept. 1, 1931 |
| 1,880,112 | Shmyroff et al. | Sept. 27, 1932 |
| 1,901,087 | Dalheimer | Mar. 14, 1933 |
| 1,920,630 | Conn | Aug. 1, 1933 |
| 2,004,464 | Clarkson | June 11, 1935 |
| 2,013,858 | Lawlor | Sept. 10, 1935 |
| 2,120,877 | Uber | June 14, 1938 |
| 2,357,683 | Nelson et al. | Sept. 5, 1944 |
| 2,392,523 | Cramer | Jan. 8, 1946 |
| 2,392,799 | Scholes et al. | Jan. 8, 1946 |
| 2,407,742 | Harries | Sept. 17, 1946 |
| 2,409,968 | Welsch | Oct. 22, 1946 |
| 2,411,184 | Beggs | Nov. 19, 1946 |
| 2,571,579 | Jones | Oct. 16, 1951 |
| 2,571,594 | McKinsey | Oct. 16, 1951 |
| 2,677,291 | Rundblad et al. | May 4, 1954 |
| 2,711,791 | Berhard et al. | June 28, 1955 |
| 2,720,690 | Mullan et al. | Oct. 18, 1955 |
| 2,721,373 | Midgley et al. | Oct. 25, 1955 |
| 2,744,574 | Fulger | May 8, 1956 |
| 2,760,254 | Wolke et al. | Aug. 18, 1956 |
| 2,807,866 | Gartner | Oct. 1, 1957 |